US008870166B2

(12) United States Patent
Shepherd et al.

(10) Patent No.: US 8,870,166 B2
(45) Date of Patent: *Oct. 28, 2014

(54) MISTING ARRAY ASSEMBLY OF AN ABATEMENT SYSTEM

(75) Inventors: Donald W. Shepherd, Shelbyville, KY (US); Mark Ammons, New Albany, IN (US)

(73) Assignee: Caldwell Tanks, Inc., Louisville, KY (US)

(*) Notice: Subject to any disclaimer, the term of this patent is extended or adjusted under 35 U.S.C. 154(b) by 713 days.

This patent is subject to a terminal disclaimer.

(21) Appl. No.: 12/959,962

(22) Filed: Dec. 3, 2010

(65) Prior Publication Data
US 2011/0291308 A1  Dec. 1, 2011

Related U.S. Application Data

(63) Continuation-in-part of application No. 12/787,243, filed on May 25, 2010, now Pat. No. 8,439,333.

(60) Provisional application No. 61/352,785, filed on Jun. 8, 2010.

(51) Int. Cl.
| B01F 3/04 | (2006.01) |
| B01D 47/06 | (2006.01) |
| B01D 53/78 | (2006.01) |
| B01D 53/38 | (2006.01) |

(52) U.S. Cl.
CPC ............ *B01D 47/06* (2013.01); *B01D 2247/14* (2013.01); *B01D 2221/08* (2013.01); *B01D 2259/124* (2013.01); *B01D 2258/0283* (2013.01); *B01D 53/78* (2013.01); *B01D 53/38* (2013.01)

USPC .......................... 261/78.2; 261/115; 261/117

(58) Field of Classification Search
CPC .... B01D 47/06; B01D 53/78; B01D 2247/14; B01D 2257/302; B01D 2257/404; B01D 2257/502; B01D 2257/504; B01D 2257/602; B01D 2257/702; B01D 2258/0283; B05B 15/066; B05B 15/069; F23J 15/04; F23J 15/06
USPC ................... 261/37, 78.2, 115, 116, 117, 118
See application file for complete search history.

(56) References Cited

U.S. PATENT DOCUMENTS

| 2,648,409 A | 8/1953 | Daugherty et al. |
| 2,802,543 A | 8/1957 | Clark |

(Continued)

FOREIGN PATENT DOCUMENTS

WO   9847604   10/1998

OTHER PUBLICATIONS

Shepherd, Donald W.; Fraser, Donald; Impact of Heat Rate, Emissions and Reliability from the Application of Wet Compression on Combustion Turbines; 2005; pp. 1-6; US.

(Continued)

*Primary Examiner* — Charles Bushey
(74) *Attorney, Agent, or Firm* — Robert H. Eichenberger; Scott W. Higdon; Middleton Reutlinger

(57) ABSTRACT

Various methods and apparatus are disclosed that relate to one or more aspects of an abatement system that removes heat and/or one or more byproducts of combustion from a gas flow. In various aspects a misting array assembly is provided that includes at least one nozzle tubing having at least one nozzle coupled thereto.

16 Claims, 45 Drawing Sheets

(56) References Cited

U.S. PATENT DOCUMENTS

| | | | |
|---|---|---|---|
| 2,941,632 | A | 6/1960 | Rankin |
| 2,956,705 | A | 10/1960 | Clingman |
| 3,419,251 | A | 12/1968 | Eckert |
| 3,461,633 | A | 8/1969 | Ziegelman et al. |
| 3,522,000 | A | 7/1970 | Kinney |
| 3,675,379 | A | 7/1972 | Lambert et al. |
| 3,896,830 | A | 7/1975 | Sharick |
| 3,925,679 | A | 12/1975 | Berman et al. |
| 4,211,735 | A | 7/1980 | Berlin |
| 4,247,308 | A | 1/1981 | Calvert et al. |
| 4,258,511 | A | 3/1981 | Strain |
| 4,343,771 | A | 8/1982 | Edwards et al. |
| 4,430,835 | A | 2/1984 | Ericson |
| 4,441,286 | A | 4/1984 | Skvaril |
| 4,462,193 | A | 7/1984 | Ericson |
| 4,470,647 | A | 9/1984 | Bishoff et al. |
| 4,599,829 | A | 7/1986 | DiMartino, Sr. |
| 4,638,607 | A | 1/1987 | Hadjiiski et al. |
| 4,644,708 | A | 2/1987 | Baudot et al. |
| 4,756,413 | A | 7/1988 | Gits |
| 4,758,111 | A | 7/1988 | Vitta |
| 4,768,845 | A | 9/1988 | Yeh |
| 4,854,094 | A | 8/1989 | Clark |
| 4,882,883 | A | 11/1989 | Horn |
| D310,860 | S | 9/1990 | Delepine |
| D311,053 | S | 10/1990 | Delepine |
| D311,054 | S | 10/1990 | Delepine |
| 4,980,099 | A | 12/1990 | Myers et al. |
| 5,022,555 | A | 6/1991 | Greenbaum |
| 5,065,944 | A | 11/1991 | D'Amato |
| 5,069,691 | A | 12/1991 | Travis et al. |
| 5,298,681 | A | 3/1994 | Swift et al. |
| D353,873 | S | 12/1994 | Schoeneman |
| 5,387,376 | A | 2/1995 | Gasser |
| 5,402,608 | A | 4/1995 | Chu |
| 5,403,063 | A | 4/1995 | Sjostedt et al. |
| 5,429,650 | A * | 7/1995 | Hoffmann et al. ............... 96/263 |
| 5,433,763 | A | 7/1995 | Shagott et al. |
| 5,465,537 | A | 11/1995 | Fullwodd |
| 5,516,466 | A * | 5/1996 | Schlesch et al. ............... 261/117 |
| 5,523,028 | A | 6/1996 | Reens et al. |
| 5,570,644 | A | 11/1996 | Cheng |
| 5,648,048 | A | 7/1997 | Kuroda et al. |
| 5,651,502 | A | 7/1997 | Edwards |
| 5,735,639 | A | 4/1998 | Payne et al. |
| 5,741,042 | A | 4/1998 | Livingston et al. |
| 5,867,977 | A | 2/1999 | Zachary et al. |
| 5,930,990 | A | 8/1999 | Zachary et al. |
| 6,007,604 | A | 12/1999 | Risse |
| 6,016,634 | A | 1/2000 | Sayer |
| 6,038,824 | A | 3/2000 | Hamrick, Sr. |
| 6,051,055 | A | 4/2000 | Ukawa et al. |
| 6,076,739 | A | 6/2000 | Littleford et al. |
| 6,095,715 | A | 8/2000 | Hulls |
| 6,230,091 | B1 | 5/2001 | McQuinn |
| 6,344,177 | B1 | 2/2002 | Littleford |
| 6,415,557 | B1 | 7/2002 | McCalley |
| 6,415,558 | B1 | 7/2002 | Cherry |
| 6,460,297 | B1 | 10/2002 | Bonds et al. |
| 6,550,216 | B1 | 4/2003 | Ohanesian |
| 6,613,133 | B2 | 9/2003 | Piaskowski et al. |
| 6,675,540 | B1 | 1/2004 | Rokes |
| 6,719,829 | B1 | 4/2004 | Schwab |
| 6,843,025 | B2 | 1/2005 | Paz |
| 6,857,268 | B2 | 2/2005 | Stinger et al. |
| D503,772 | S | 4/2005 | Mody et al. |
| 6,886,895 | B2 | 5/2005 | Previte |
| 6,946,021 | B2 | 9/2005 | Aoyagi |
| 7,048,346 | B2 | 5/2006 | Saravis |
| 7,096,665 | B2 | 8/2006 | Stinger et al. |
| 7,472,969 | B2 | 1/2009 | Saravis |
| D588,711 | S | 3/2009 | Ryba |
| D616,110 | S | 5/2010 | Rimsky |
| 7,827,738 | B2 | 11/2010 | Abrams et al. |
| 7,836,660 | B2 | 11/2010 | Gharibeh et al. |
| 7,926,226 | B2 | 4/2011 | Pope |
| 7,937,895 | B2 | 5/2011 | Janka et al. |
| 7,959,721 | B2 * | 6/2011 | Crews et al. ............... 96/243 |
| 7,971,859 | B1 | 7/2011 | Shepherd et al. |
| 7,971,860 | B1 | 7/2011 | Shepherd et al. |
| 7,975,990 | B1 | 7/2011 | Shepherd et al. |
| 8,001,730 | B2 | 8/2011 | Wallance |
| 8,147,009 | B1 | 4/2012 | Rider |
| 8,439,333 | B2 * | 5/2013 | Shepherd et al. ............ 261/78.2 |
| 8,484,929 | B1 | 7/2013 | Begdouri |
| 2003/0024174 | A1 | 2/2003 | Bonds et al. |
| 2004/0187402 | A1 | 9/2004 | Moon et al. |
| 2005/0138869 | A1 | 6/2005 | Porter |
| 2005/0210762 | A1 | 9/2005 | Broberg |
| 2005/0217026 | A1 | 10/2005 | Ramirez |
| 2006/0087092 | A1 | 4/2006 | Chubb |
| 2006/0185266 | A1 | 8/2006 | O'Callaghan et al. |
| 2007/0074465 | A1 | 4/2007 | Kuan |
| 2007/0084135 | A1 | 4/2007 | Ritter et al. |
| 2007/0163196 | A1 | 7/2007 | Barrow |
| 2007/0245638 | A1 | 10/2007 | Lai |
| 2008/0098663 | A1 | 5/2008 | Seel |
| 2008/0134589 | A1 | 6/2008 | Abrams et al. |
| 2008/0222970 | A1 | 9/2008 | Gustavsson |
| 2008/0256878 | A1 | 10/2008 | Berns et al. |
| 2008/0263968 | A1 | 10/2008 | Day |
| 2009/0223144 | A1 | 9/2009 | Leahy |
| 2009/0282749 | A1 | 11/2009 | Warminsky |
| 2009/0320440 | A1 | 12/2009 | Erickson et al. |
| 2010/0287848 | A1 | 11/2010 | Pepin |
| 2011/0239548 | A1 | 10/2011 | Laurent |
| 2011/0296675 | A1 | 12/2011 | Roopnarine et al. |
| 2013/0232886 | A1 | 9/2013 | Yoder et al. |

OTHER PUBLICATIONS

Jolly, Sanjeev; Wet Compression—A Powerful Means of Enhancing Combustion Turbine Capacity; Presented at Power-Gen International; Dec. 2002; pp. 1-12; Florida, US.

Gajjar, Hemant; Chaker, Mustapha; Dighe, Ajay; Meher-Homji, Cyrus B.; Proceedings of ASME Turbo Expo 2003; Inlet Fogging for a 655 MW Combined Cycle Power Plant-Design, Implementation and Operation Experience; Jun. 2003; pp. 1-9; Georgia, US.

* cited by examiner

MISTING ARRAY ASSEMBLY OF AN ABATEMENT SYSTEM

CROSS-REFERENCE TO RELATED DOCUMENTS

This application is a continuation-in part of application Ser. No. 12/787,243, now U.S. Pat. No. 8,439,333, filed May 25, 2010 and entitled Removable Misting Array Assembly for an Abatement System, which is hereby incorporated by reference in its entirety. This Application also claims priority to, and benefit from, Provisional Application Ser. No. 61/352,785, filed Jun. 8, 2010 and entitled Field Erectable Abatement System, which is hereby incorporated by reference in its entirety. This application is related to the following co-pending Applications: application Ser. No. 12/787,372, filed May 25, 2010 and entitled Misting Array Assembly Having Adjustable Nozzles; application Ser. No. 12/787,374, filed May 25, 2010 and entitled System and Method for Repairing or Servicing a Misting Array Assembly of an Abatement System; application Ser. No. 12/787,373, filed May 25, 2010 and entitled Misting Array Assembly Having Upwardly and Downwardly Disposed Nozzles; application Ser. No. 12/959,947, filed Dec. 3, 2010 and entitled Field Erectable Abatement System; application Ser. No. 12/959,955, filed Dec. 3, 2010 and entitled Field Erectable Abatement System Method; Application Serial No. 29/362,440, filed May 25, 2010 and entitled Nozzle Tubing Having Offset Nozzles; Application Serial No. 29/362,443, filed May 25, 2010 and also entitled Nozzle Tubing Having Offset Nozzles; Application Serial No. 29/362,444, filed May 25, 2010 and entitled Misting Array Frame Structure; and Application Serial No. 29/362,442, filed May 25, 2010 and entitled Sealing Structure for Blocking an Opening.

TECHNICAL FIELD

The present invention is directed generally to aspects of an abatement system. More particularly, various inventive methods and apparatus disclosed herein relate to one or more aspects of an abatement system such as, for example, a pollution abatement system or a system which removes heat and/or one or more byproducts of combustion from a gas flow.

BACKGROUND

Abatement systems function, generally, to remove heat and/or one or more pollutants from a stream of flue gas that is created by the combustion of one or more fuels. For example, a heat abatement system may remove, and optionally recover, heat from a stream of flue gas that is created by the combustion of a hydrocarbon fuel. Also, for example, a pollution abatement system may remove one or more pollutants from a stream of flue gas that is created by the combustion of a hydrocarbon fuel. Byproducts of hydrocarbon fuel combustion include one or more of nitrogen, carbon dioxide, water, carbon monoxide, unburned hydrocarbons, oxides of sulfur, mercury, particulates (e.g., soot) and oxides of nitrogen. The carbon monoxide, unburned hydrocarbons, oxides of sulfur, mercury, particulates, and oxides of nitrogen are often classified as pollutants and may be subject to one or more governmental guidelines that regulate their control.

Many abatement systems make use of one or more misting arrays, optionally in combination with one or more condensing coils, to effect the removal of heat and/or at least one targeted pollutant. One such pollution abatement system is described in U.S. Pat. No. 6,344,177, which is hereby incorporated by reference in its entirety.

Generally speaking, the technology of U.S. Pat. No. 6,344,177 involves removing contaminants from flue gas by flowing the flue gas through a first misting array, a first condensing coil, a second misting array, and a second condensing coil. Other abatement systems may utilize different apparatus and methods for pollution abatement and/or heat recovery or abatement.

Although current abatement systems allow for the removal of heat and/or one or more pollutants from a contaminated gas flow, many suffer from one or more drawbacks. For example, abatement systems which employ one or more misting arrays may not obtain desired coverage characteristics from the misting array, may not employ misting arrays whose nozzle output is directionally adjustable, and/or may not employ misting arrays that may be conveniently serviced or replaced. Moreover, other aspects of the abatement system such as, for example, the intake and exhaust system, any condensing coil section present, and other structural aspects of and methods related to the abatement system, may suffer from one or more drawbacks. Thus, applicants have recognized and appreciated the need to improve various aspects of an abatement system.

SUMMARY

The present disclosure is directed to inventive methods and apparatus for aspects of an abatement system, and, more specifically, one or more aspects of an abatement system which removes heat and/or one or more byproducts of combustion from a contaminated gas flow. For example, some aspects of the present disclosure are directed to a misting array of an abatement system, some aspects are directed toward a condensing coil of an abatement system, some aspects are directed toward the intake and/or exhaust system of an abatement system, and other aspects are directed to other structural aspects of and methods related to an abatement system.

Generally, in one aspect an abatement system is provided that includes a gas flow inlet, an abatement chamber, and a gas flow outlet. The abatement chamber is downstream of the gas flow inlet and has an abatement chamber misting section. The abatement chamber gas flow outlet is downstream of the abatement chamber misting section. The abatement chamber has a gas flow extending from the gas flow inlet to the gas flow outlet. The abatement system also includes a misting array assembly received in the abatement chamber misting section. The misting array assembly includes a nozzle tubing and a plurality of nozzles coupled to the nozzle tubing. The nozzle tubing sealingly extends from exterior of the abatement chamber into the abatement chamber misting section. At least a portion of the nozzle tubing is fixedly rotationally adjustable from exteriorly of the abatement system to a plurality of positions. Adjusting the nozzle tubing correspondingly adjusts the nozzles coupled thereto.

In some embodiments the nozzle tubing is rotationally adjustable to a plurality of fixed preselected positions.

In some embodiments the nozzle tubing is linearly extending.

In some embodiments the nozzle tubing is rotationally adjustable between at least a first position and a second position that are rotationally offset at least ten degrees from one another.

In some embodiments the misting array assembly comprises a second nozzle tubing and a plurality of second nozzles coupled to the second nozzle tubing. The second nozzle tubing may sealingly extend from exterior of the abatement chamber and into the abatement chamber misting section. In some versions of those embodiments the nozzle tubing and the second nozzle tubing are removably received in the abatement chamber misting section. The nozzle tubing and the second nozzle tubing may optionally be monolithically removably received in the abatement chamber misting section or may alternatively optionally be independently removably received in the abatement chamber misting section.

In some embodiments the first nozzle tubing extends through a first sealing plate sealingly engaged over a first opening through the abatement chamber and a second nozzle tubing extends through a second sealing plate sealingly engaged over a second opening through the abatement chamber.

In some embodiments the first nozzle tubing extends through a first sealing plate sealingly engaged over a first opening through the abatement chamber and a second nozzle tubing also extends through the first sealing plate.

In some embodiments some of the nozzles are upwardly extending and some of the nozzles are downwardly extending.

Generally, in another aspect an abatement system is provided that includes a gas flow inlet, an abatement chamber, and a gas flow outlet. The abatement chamber is downstream of the gas flow inlet and has an abatement chamber misting section having at least one opening therethrough. The at least one opening extends through the abatement chamber and into the abatement chamber misting section. The abatement chamber gas flow outlet is downstream of the abatement chamber misting section. The abatement chamber has a gas flow extending from the gas flow inlet to the gas flow outlet. The abatement system also includes a misting array assembly received in the abatement chamber misting section. The misting array assembly includes a sealing plate blocking the opening, a nozzle tubing extending through the sealing plate and into the abatement chamber misting section, and at least one nozzle coupled to the nozzle tubing. At least a portion of the nozzle tubing is fixedly rotationally adjustable from exteriorly of the abatement system to a plurality of positions. Adjusting the nozzle tubing correspondingly adjusts the nozzles.

In some embodiments the misting array assembly further includes a second nozzle tubing and a plurality of second nozzles coupled to the second nozzle tubing. The second nozzle tubing may sealingly extend from exterior of the abatement chamber and into the abatement chamber misting section. In some versions of those embodiments the second nozzle tubing extends through a second sealing plate covering a second opening of the at least one opening through the abatement chamber. In other versions of those embodiments the second nozzle tubing also extends through the sealing plate.

In some embodiments the nozzle tubing is rotationally adjustable between at least a first position and a second position that are rotationally offset at least five degrees from one another.

In some embodiments the misting array assembly further includes at least one first stop protrusion rotationally fixed to the nozzle tubing within the abatement chamber mixing section. The first stop protrusion is at a first rotational orientation with respect to the nozzle tubing. In some versions of those embodiments the misting array assembly further includes at least one second stop protrusion rotationally fixed to the nozzle tubing within the abatement chamber mixing section. The second stop protrusion is at a second rotational orientation with respect to the nozzle tubing. The second rotational orientation is offset from the first rotational orientation at least five degrees.

In some embodiments the abatement system further includes structure located peripherally of the nozzle tubing within the abatement chamber, the structure having a first edge selectively contacting the first stop and a second edge selectively contacting the second stop.

Generally, in another aspect a misting array assembly disposed across an abatement chamber of an abatement system is provided. The abatement chamber has a gas flow extending therethrough. The misting array assembly includes a sealing piece, a nozzle tubing, and a plurality of tubing nozzles. The sealing piece has a first side and a second side. The nozzle tubing extends through the sealing piece and has a liquid source coupling on the first side of the sealing piece and a nozzle section on the second side of the sealing piece. The tubing nozzles are coupled to the nozzle section. The sealing piece, the nozzle tubing, and the tubing nozzles are movable between an inserted position and a removed position from exteriorly of the abatement system. In the inserted position the tubing nozzles are in the abatement chamber and in the removed position at least some of the tubing nozzles are removed from the abatement chamber.

In some embodiments the nozzle section is independently fixedly rotationally adjustable to a plurality of nozzle section positions. Adjusting the nozzle section correspondingly adjusts the first tubing nozzles.

In some embodiments a plurality of the tubing nozzles are upwardly disposed nozzles and a plurality of the tubing nozzles are downwardly disposed tubing nozzles.

In some embodiments the misting array assembly further includes at least one flange extending from the nozzle section.

In some versions of those embodiments the misting array assembly further includes a support trough within the abatement chamber contacting and supporting the flange. Optionally, the flange is rotationally fixed to the nozzle section and includes first and second flange contact surfaces. In some versions of those embodiments the misting array assembly further includes first and second stop contact surfaces within the abatement chamber selectively contacting respective of the first and second flange contact surfaces.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

When reference is made herein to all or a portion of nozzle output being directed "counter" to the direction of a gas flow, it is intended only that the cited portion of nozzle output have a component of its velocity that is directed counter to the gas flow. For example, if the gas flow is moving in a first direction along a first axis, it is intended that nozzle output moving "counter" thereto have a component of its velocity that is directed in a second direction (opposite the first direction) along the first axis. Accordingly, a portion of nozzle output that has a velocity component only in the second direction along the first axis would be directed counter to the gas flow. Likewise, a portion of nozzle output that has a velocity component in the second direction along the first axis and also has a velocity component along a second axis that is perpendicular the first axis would also be directed counter to the gas flow.

Similarly, when reference is made herein to all or a portion of nozzle output being directed "with" the direction of a gas flow, it is intended only that the cited portion of nozzle output have a component of its velocity that is directed with the gas flow. For example, if the gas glow is moving in a first direction along a first axis, it is intended that nozzle output moving "with" the gas flow have a component of its velocity that is directed in the first direction along the first axis.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
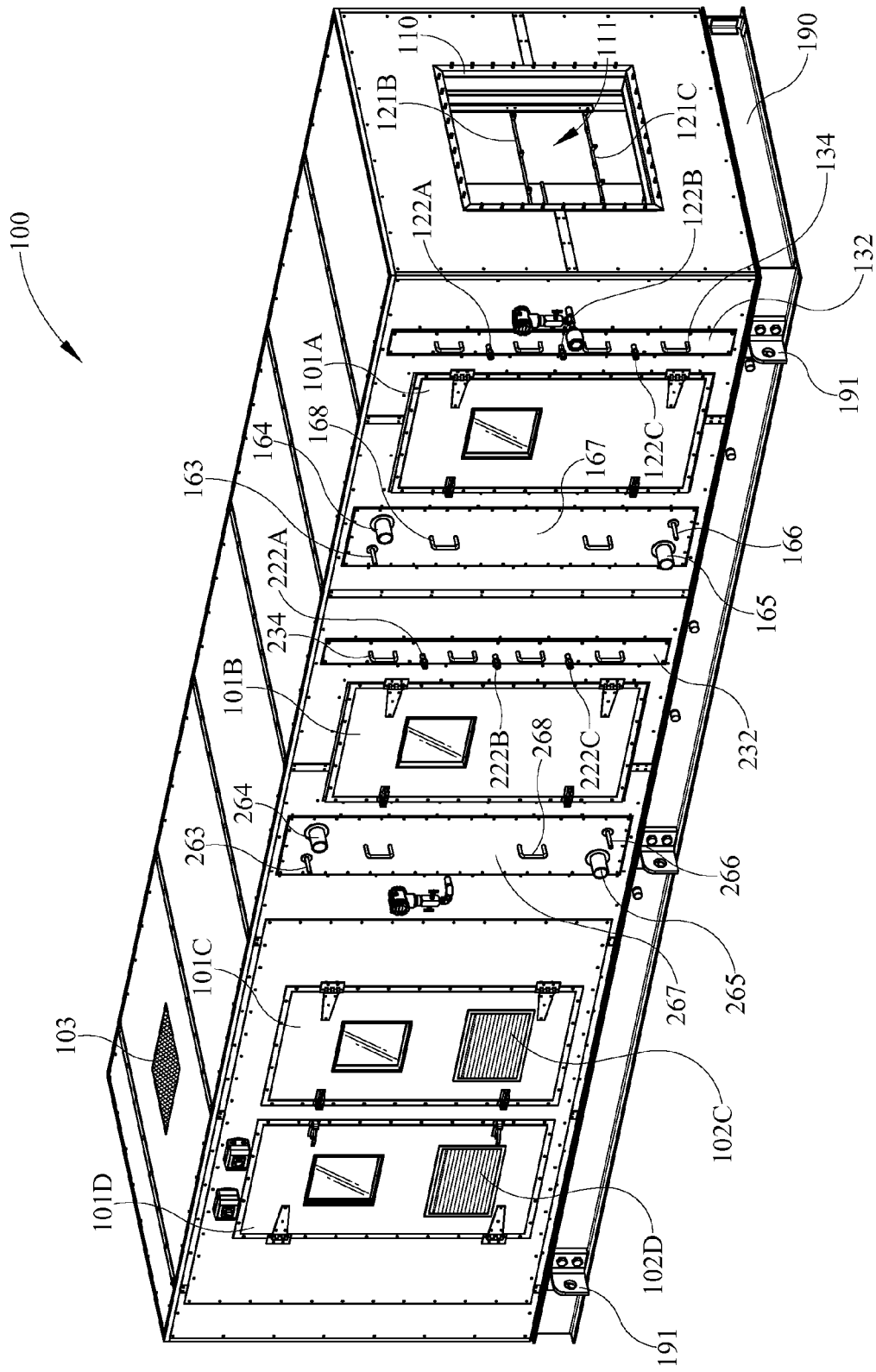
FIG. 1 illustrates an upper access side and intake side perspective view of a first embodiment of an abatement system.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the claimed invention. For example, the aspects of an abatement system disclosed herein are described in conjunction with an abatement system having a first misting array disposed in an abatement chamber, a first condensing coil downstream from the first misting array, a second misting array downstream from the first condensing coil, and a second condensing coil downstream from the second misting array. However, one or more aspects of an abatement system described herein may be implemented in abatement systems having other configurations and implementation of the one or more aspects described herein in alternatively configured abatement systems is contemplated without deviating from the scope or spirit of the claimed invention. Also, for example, many aspects of an abatement system disclosed herein are described in conjunction with an abatement system that abates both heat and pollution from a gas stream. However, such aspects of an abatement system described herein may be implemented in abatement systems that abate only heat or abate only pollution or any other desired component.

In FIG. 1 through FIG. 15 various aspects of a first embodiment of an abatement system 100 are shown. Referring initially to FIG. 1 through FIG. 4, it is illustrated that the abatement system 100 includes a support base 190 supporting a structure having a generally longitudinally extending and generally rectangular shape. The support base 190 includes a plurality of lifting lugs 191 around the periphery thereof that may be utilized in lifting and placing the abatement system 100 in a desired installation spot. The lifting lugs 191 may optionally be removed once the abatement system 100 is placed in a desired location.

The abatement system 100 also includes an air inlet opening 110 that defines an air inlet 111. The air inlet 111 generally defines the beginning of an abatement chamber that extends interiorly through a portion of abatement system 100 and that will be described in additional detail herein. Air inlet 111 may be placed in communication with a polluted gas stream such as, for example, a flue gas stream containing at least one pollutant. For example, in some embodiments duct work may be sealingly coupled to air inlet opening 110 and may carry a polluted gas stream from a location remote from the abatement system 100 to the air inlet 111. The depicted abatement system 100 may, in some embodiments, be utilized to remove pollutants from a flue gas stream created by the combustion of natural gas.

An upper nozzle section 121A of an upper nozzle tubing, a middle nozzle section 121B of a middle nozzle tubing, and a lower nozzle section 121C of a lower nozzle tubing are provided adjacent the air inlet 111. The upper, middle, and lower nozzle section 121A, 121B, and 121C form part of a first misting array 120, are provided in a downstream direction from the air inlet 111, and are disposed in a first misting section of the abatement chamber. The upper, middle, and lower nozzle tubing include, respectively, liquid source couplings 122A, 122B, and 122C, which are provided exteriorly of the abatement system 100. The liquid source couplings 122A, 122B, and 122C may be coupled to tubing that is in communication with a water source, a water based solution source, or other liquid source. In some embodiments the liquid source couplings 122A, 122B, and 122C may be half inch female tube fittings. In some embodiments the liquid source couplings 122A, 122B, and 122C may be coupled to tubing that is in communication with a liquid source comprising water and/or hydrogen peroxide. In some embodiments the first misting array 120 may increase the relative humidity of gas flow moving through the first misting section to sixty to approximately one hundred percent relative humidity.

Referring now to FIG. 5 through FIG. 10, various aspects of the first misting array 120 are illustrated and will be described in additional detail. The first misting array 120 includes a sealing piece 130 having a sealing plate 132. The sealing piece 130 also optionally includes a first sealing piece extension 135 extending rearwardly from the sealing plate 132. Vertically aligned handles 134 are coupled to the sealing piece 130 and extend from a front face thereof. As will be described in additional detail herein, the handles 134 may aid in the removal of the first misting array 120 from the abatement chamber.

A frame structure is coupled to the first sealing piece 130 and includes an upper frame structure member 141 having an upper frame structure rim portion 142 (shown in FIG. 6), a side frame structure member 145 having a side frame structure rim portion 146, and a lower frame structure member 143 having a lower frame structure rim portion 144. A middle support bar 148 of the frame structure extends vertically between the upper frame structure rim portion 142 and the lower frame structure rim portion 144. A side support bar 147 of the frame structure extends from the side frame structure rim portion 146 inwardly toward the middle support bar 148. The depicted frame structure is geometrically similar to the interior of the misting section of the abatement chamber. Also, as will be described herein in conjunction with a second misting array 220, the upper frame structure member 141, the lower frame structure member 143, and the side frame structure member 145 are configured to slidingly engage a corresponding track extending from portions of the abatement chamber when the misting array 120 is installed.

The upper nozzle section 121A of the upper nozzle tubing is coupled to the sealing piece 130, is coupled to the middle support bar 148 via a U clamp 149A (FIG. 6), and is coupled to the side support bar 147 by a U clamp (not shown). The upper nozzle section 121A also extends through an aperture provided through the side frame structure rim portion 146. The upper nozzle section 121A is coupled to the sealing piece 130 via a female tube fitting 124A that is coupled to a pipe nipple 123A on an abatement chamber side of the sealing piece 130. The pipe nipple 123A extends through and is coupled to the sealing piece extension 135 and the sealing plate 132 of the sealing piece 130. The pipe nipple 123A is also coupled to the liquid source coupling 122A provided on an exterior side of the sealing piece 130. A plug is provided at the end of upper nozzle section 121A distal its coupling with female tube fitting 124A.

In a similar manner as the upper nozzle section 121A, the middle nozzle section 121B is coupled to the middle support bar 148 via a U clamp 149B (FIG. 6), is coupled to the side support bar 147 by a U clamp (not shown), and extends through an aperture provided through the side frame structure rim portion 146. The middle nozzle section 121B is coupled to the sealing piece 130 via a female tube fitting 124B that is coupled to a pipe nipple 123B on an abatement chamber side of the sealing piece 130. The pipe nipple 123B extends through and is coupled to the sealing piece extension 135 and the sealing plate 132 of the sealing piece 130. The pipe nipple 123B is also coupled to the liquid source coupling 122B provided on an exterior side of the sealing piece 130. A plug is provided at the end of middle nozzle section 121B distal its coupling with female tube fitting 124B.

In a similar manner as the upper nozzle section 121A and the middle nozzle section 121C, the lower nozzle section 121C is coupled to the middle support bar 148 via a U clamp 149C (FIG. 6), is coupled to the side support bar 147 by a U clamp (not shown), and extends through an aperture provided through the side frame structure rim portion 146. The middle nozzle section 121C is coupled to the sealing piece 130 via a female tube fitting 124C that is coupled to a pipe nipple 123C on an abatement chamber side of the sealing piece 130. The pipe nipple 123C extends through and is coupled to the sealing piece extension 135 and the sealing plate 132 of the sealing piece 130. The pipe nipple 123C is also coupled to the liquid source coupling 122C provided on an exterior side of the sealing piece 130. A plug is provided at the end of the lower nozzle section 121C distal its coupling with female tube fitting 124C. The use of caulking, gaskets, and/or welding may optionally be utilized at the juncture between the pipe nipples 123A, 123B, 123C, and the openings through sealing piece 135 and/or the openings through sealing plate 132 in order to ensure a satisfactory seal and/or to prevent rotational movement of the of the pipe nipples 123A, 123B, and 123C.

The upper nozzle section 121A includes six upwardly disposed upper tubing nozzles 126A and six downwardly disposed upper tubing nozzles 128A. The upwardly disposed upper tubing nozzles 126A and the downwardly disposed upper tubing nozzles 128A are alternately provided on the upper nozzle section 121A. Each of the upwardly disposed upper tubing nozzles 126A and each of the downwardly disposed upper tubing nozzles 128A is in flow communication with a liquid pathway extending through the interior of upper nozzle section 121A, female tube fitting 124A, pipe nipple 123A, and liquid source coupling 122A. Optionally, each of the upwardly disposed upper tubing nozzles 126A and each of the downwardly disposed upper tubing nozzles 128A may be coupled to the liquid pathway within upper nozzle tubing 121A using a full penetration weld.

Each of the upwardly disposed upper tubing nozzles 126A and each of the downwardly disposed upper tubing nozzles 128A has a nozzle output central axis that is directed counter to the direction of gas flow through the abatement chamber when the first misting array 120 is installed therein. In alternative embodiments one or more of the upwardly disposed upper tubing nozzles 126A and/or one or more of the downwardly disposed upper tubing nozzles 128A may be positioned such that the nozzle output central axis thereof is directed with the direction of the gas flow. The nozzle output central axis is an axis that generally corresponds to the center of the nozzle output. For example, if the nozzle output was generally conical, the nozzle output central axis would extend centrally from the tip of the cone to the center of the base of the cone. In the depicted embodiment, the nozzle output central axis of each upwardly disposed upper tubing nozzle 126A is at approximately a forty degree angle with respect to a central output axis of each of the downwardly disposed upper tubing nozzles 128A.

When the female tube fitting 124A is sufficiently tightened, it compresses against upper nozzle section 121A and thereby causes upper nozzle section 121A to be fixed at a given rotational orientation. Accordingly, the rotational orientation of the upper nozzle section 121A may be fixed at a desired rotational orientation when tightening female tube fitting 124A. Moreover, the female tube fitting 124A may be subsequently loosened, the rotational orientation of the upper nozzle tubing adjusted, and the female tube fitting 124A retightened to thereby readjust the rotational orientation of the upper nozzle section 121A. Adjusting the rotational orientation of the first nozzle section 121A also correspondingly adjusts the orientation of the upwardly disposed upper tubing nozzles 126A and the downwardly disposed upper tubing nozzles 128A with respect to the gas flow moving through the abatement chamber. Adjusting the rotational orientation of the upper nozzle section 121A may allow for tuning of the misting output emitted from the nozzles 126A and 128A thereof in order to produce desired misting quantity and/or saturation in one or more parts of the misting section of the abatement chamber. Also, the female tube fitting 124A may be loosened and upper nozzle section 121A removed to allow for cleaning and/or replacement of upper nozzle section 121A and/or nozzles 126A and 128A thereof.

Figure 8A:
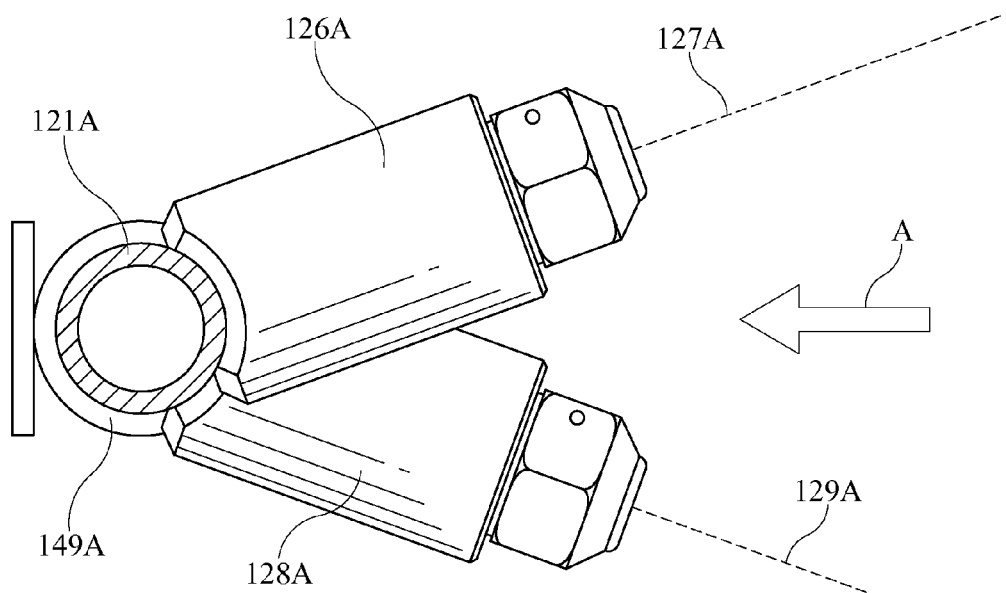
FIG. 8A illustrates a section view taken along the section line 8A-8A of FIG. 5 showing an upper nozzle tubing fixedly rotationally adjusted to a first position.

Referring to FIG. 8A, the upper nozzle section 121A is illustrated adjusted to a first rotational orientation. A central output axis 127A of the visible upwardly disposed upper tubing nozzle 126A is at approximately a forty degree angle with respect to a central output axis 129A of the visible downwardly disposed upper tubing nozzle 128A. The central output axis 127A is at approximately a twenty degree angle with respect to the gas flow direction A and the central output axis 129A is likewise at an approximately twenty degree angle with respect to the gas flow direction A. The gas flow direction A is generally indicative of the direction of gas flow moving through abatement chamber when misting array 120 is in the installed position.

Figure 8B:
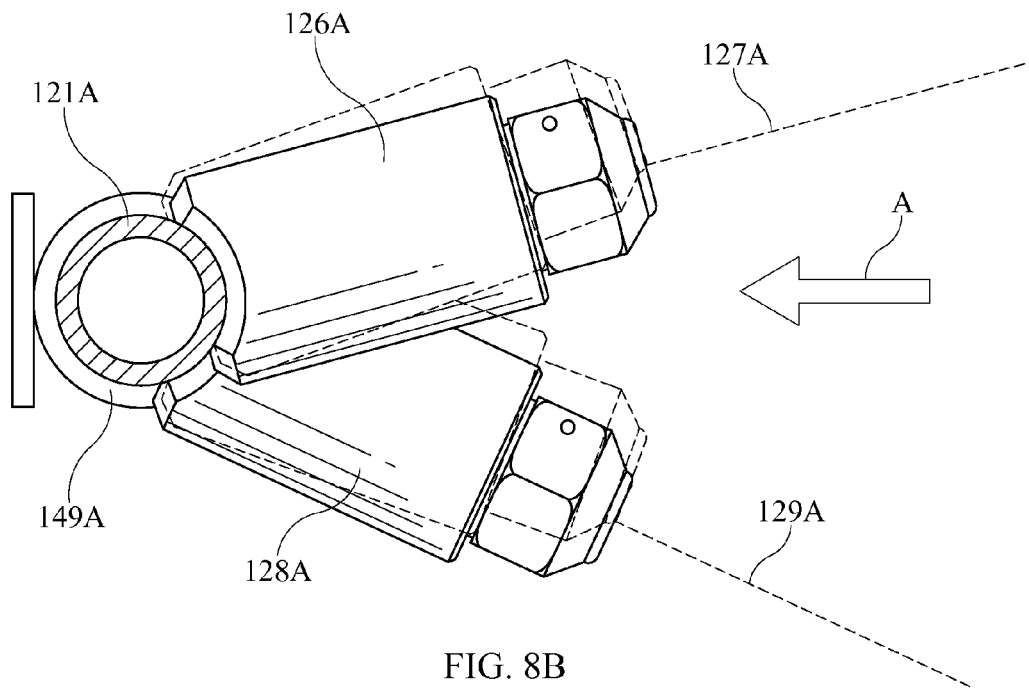
FIG. 8B illustrates a section view similar to FIG. 8A, but showing the upper nozzle tubing fixedly rotationally adjusted to a second position; phantom lines of FIG. 8B depict nozzles of the upper nozzle tubing in the first position of FIG. 8A.
Figure 9:
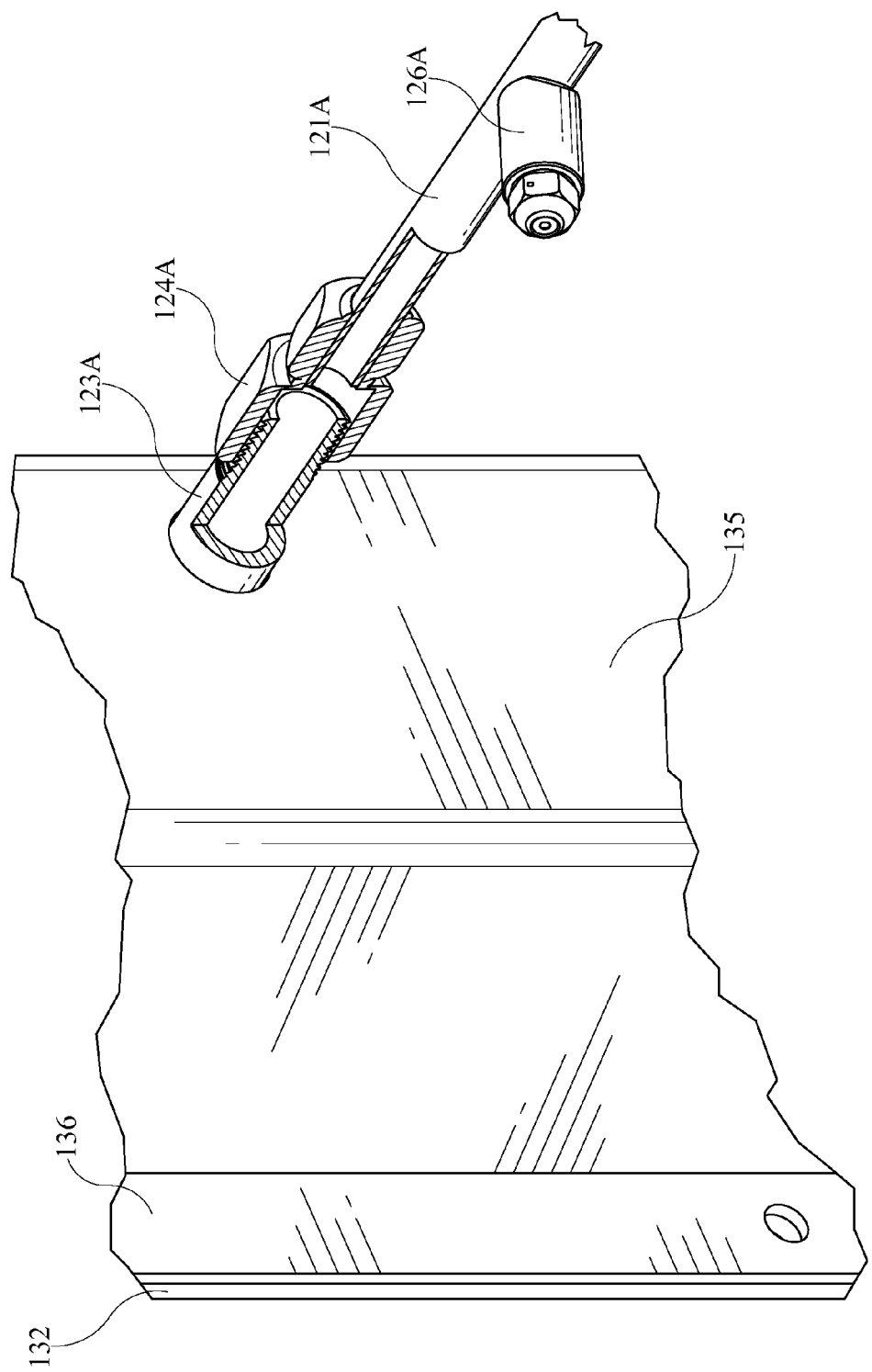
FIG. 9 illustrates a close-up view showing a portion of a sealing piece and a pipe nipple, a female tube fitting, and a nozzle section of an upper nozzle tubing of the first misting array of the first embodiment of the abatement system; portions of the pipe nipple, the female tube fitting, and the nozzle section of the nozzle tubing are shown in section.

Referring to FIG. 8B, the upper nozzle section 121A is illustrated adjusted to a second rotational orientation. The phantom lines in FIG. 8B depict the first rotational orientation of the upwardly disposed upper tubing nozzle 126A and the downwardly disposed upper tubing nozzle 128A. In the second rotational orientation of FIG. 8B a central output axis 127A of the visible upwardly disposed upper tubing nozzle 126A is still at approximately a forty degree angle with respect to a central output axis 129A of the visible downwardly disposed upper tubing nozzle 128A. The central output axis 127A is at approximately a fifteen degree angle with respect to the gas flow direction A and the central output axis 129A is approximately at a twenty-five degree angle with respect to the gas flow direction A. Accordingly, the second rotational orientation of the upper nozzle section 121A is offset approximately five degrees with respect to the first rotational orientation. In alternative embodiments the upper nozzle section 121A may optionally be fixed at a non-rotationally adjustable orientation.

Figure 5:
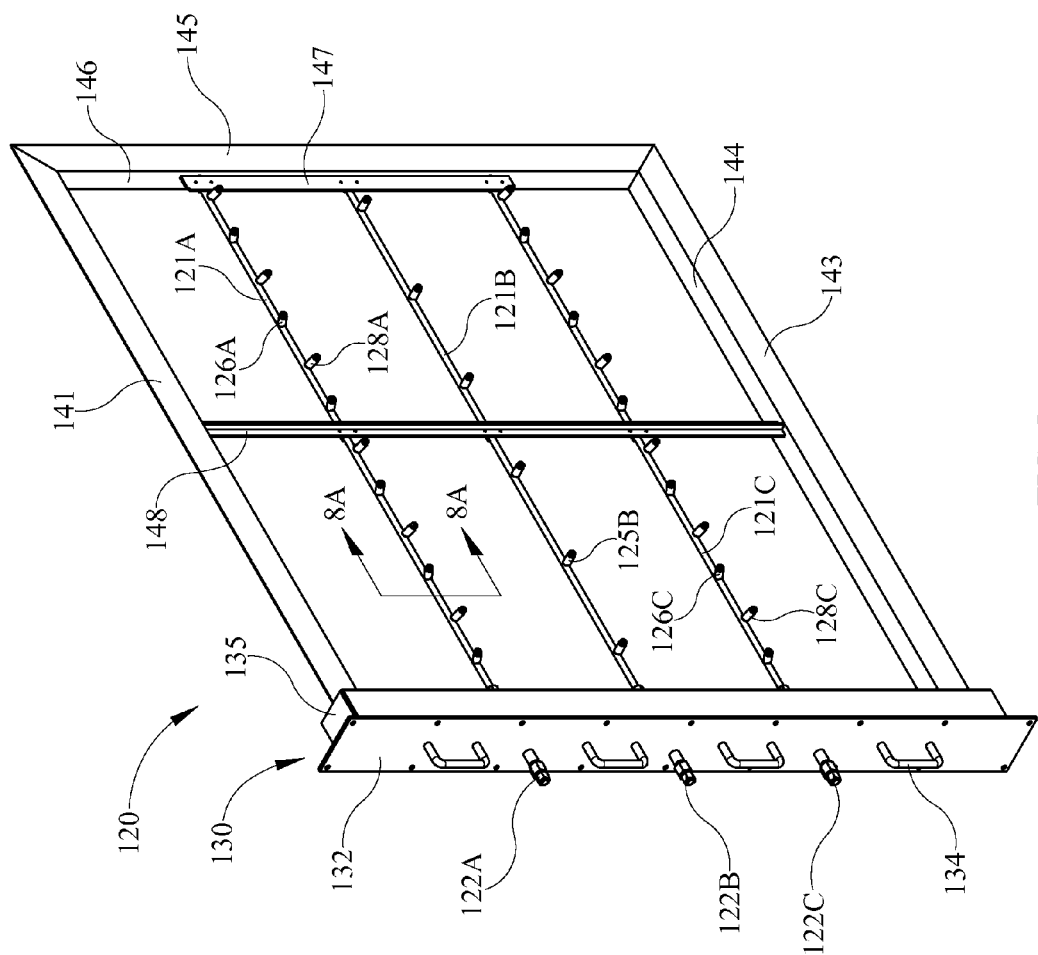
FIG. 5 illustrates a perspective view of a first misting array of the abatement system of FIG. 1.
Figure 6:
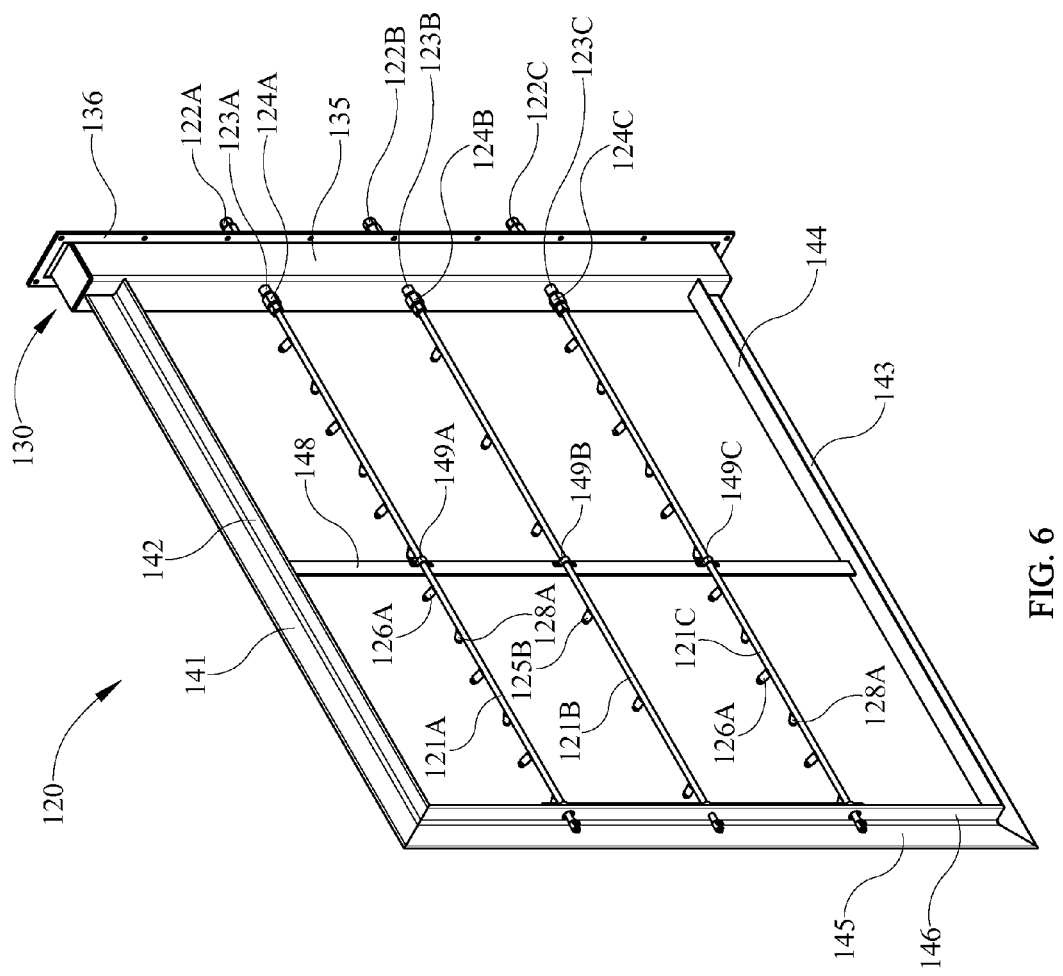
FIG. 6 illustrates an additional perspective view of the misting array of FIG. 5.
Figure 7:
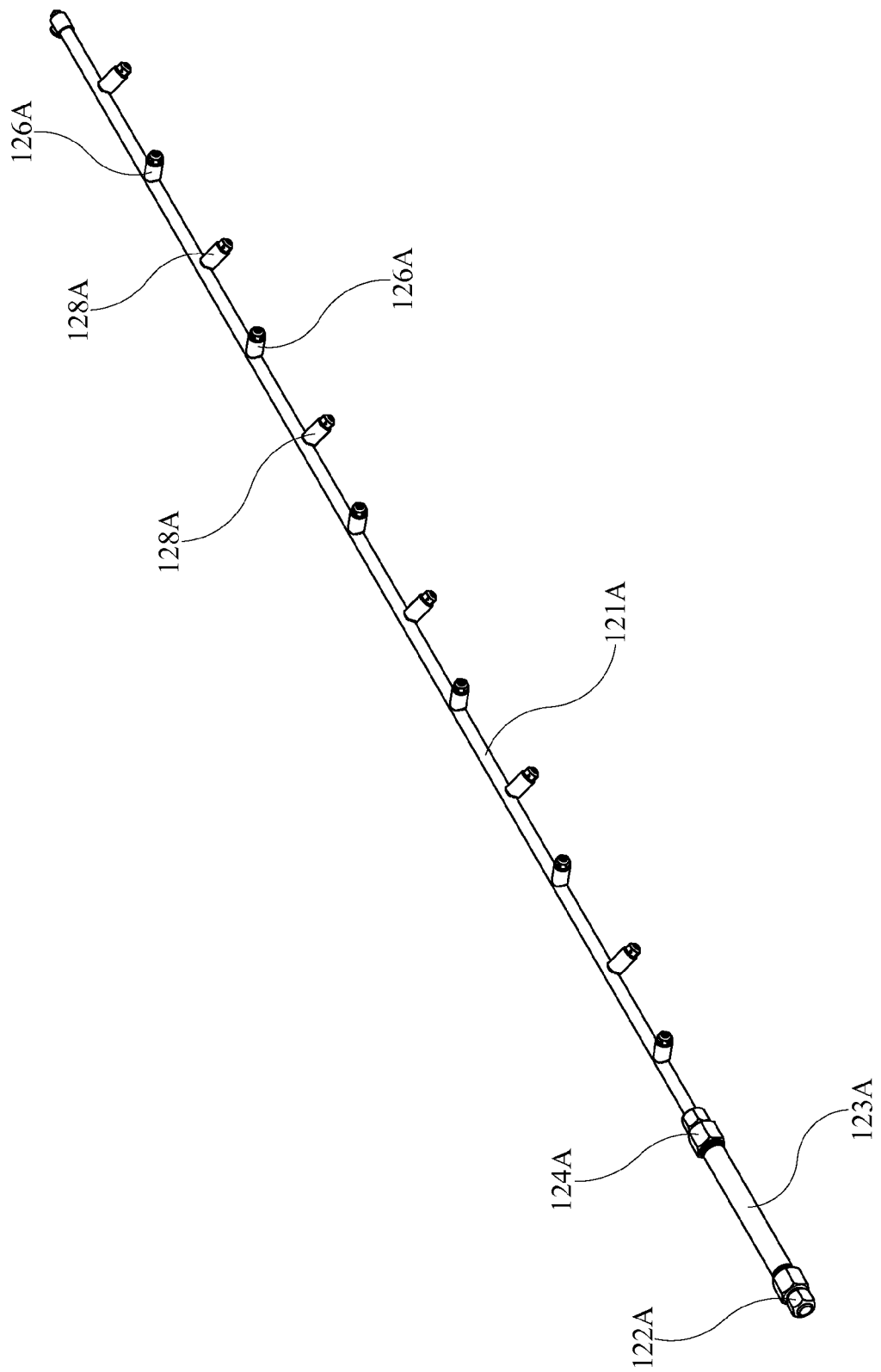
FIG. 7 illustrates an upper nozzle row of the misting array of FIG. 5.

Referring to FIG. 5 and FIG. 6, the middle nozzle section 121B includes six commonly oriented nozzles 125B. The commonly oriented nozzles 125B are shown fixed at a rotational orientation such that the central output axes thereof are directed substantially directly counter to the direction of gas flow within the abatement chamber when the misting array 120 is in the installed position. In alternative embodiments one or more of the nozzles 125B may be positioned such that the nozzle output central axis thereof is directed with the direction of the gas flow. The rotational orientation of the middle nozzle section 121B (and, resultantly the commonly oriented nozzles 125B) may be adjusted in a similar manner as described with respect to upper nozzle section 121A through loosening and tightening of female tube fitting 124B. In alternative embodiments the middle nozzle section 121B may optionally be fixed at a non-rotationally adjustable orientation.

The lower nozzle section 121C includes six upwardly disposed lower tubing nozzles 126C and six downwardly disposed lower tubing nozzles 128C. The upwardly disposed lower tubing nozzles 126C and the downwardly disposed lower tubing nozzles 128C are alternately provided on the lower nozzle section 121C. Each of the upwardly disposed lower tubing nozzles 126C and each of the downwardly disposed lower tubing nozzles 128C has a nozzle output central axis that is directed counter to the direction of gas flow through the abatement chamber when the first misting array 120 is in the installed position. In alternative embodiments one or more of the upwardly disposed lower tubing nozzles 126C and/or one or more of the downwardly disposed lower tubing nozzles 128C may be positioned such that the nozzle output central axis thereof is directed with the direction of the gas flow. In the depicted embodiment the nozzle output central axis of each upwardly disposed lower tubing nozzle 126C is at approximately a forty degree angle with respect to a central output axis of each downwardly disposed lower tubing nozzle 128C. Also, in the depicted embodiment the central output axis of each upwardly disposed lower tubing nozzle 126C and each downwardly disposed lower tubing nozzle 128C is at approximately a twenty degree angle with respect to the gas flow within the abatement chamber when the misting array 120 is in an installed position. The rotational orientation of the lower nozzle section 121C may be adjusted in a similar manner as described with respect to upper nozzle section 121A through loosening and tightening of female tube fitting 124C. In alternative embodiments the lower nozzle section 121C may optionally be fixed at a non-rotationally adjustable orientation.

Figure 10:
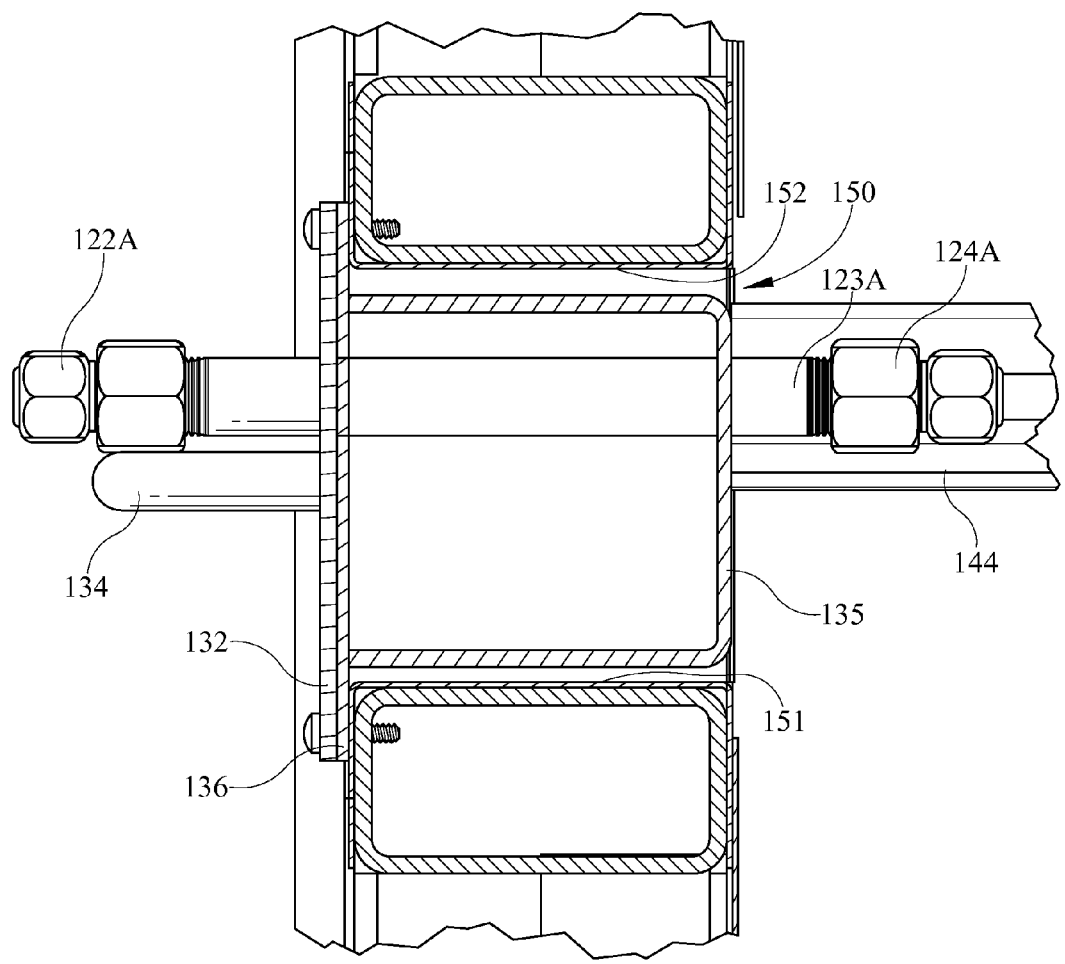
FIG. 10 illustrates a close-up top section view of a portion of the abatement system taken along the section line 10-10 of FIG. 3; portions of the sealing piece of the first misting array, the upper nozzle tubing of the first misting array, and the first misting array opening are shown.

As shown for example in FIG. 5 and FIG. 6, a plurality of fastener apertures are provided along the periphery of the exterior face of the sealing plate 132 and extend through the interior face of the sealing plate 132. The fastener apertures also extend through a gasket 136 (shown in FIG. 5 and FIG. 10) provided along the periphery of the rear face of the sealing plate 132. As shown in FIG. 10, when the misting array 120 is placed in an inserted position, the gasket 136 abuts a shell of the abatement system 100. Fasteners may be inserted through the fastener apertures of the sealing plate 132 and received in corresponding receiving apertures in the shell of the abatement system 100 to thereby sealingly and securely couple the sealing plate 132 over a first misting array opening 150 of the abatement system 100. The gasket 136 may enhance the seal between the sealing plate 132 and the shell of the abatement system 100.

With continuing reference to FIG. 10, the first misting array opening 150 of the abatement system 100 extends between the abatement chamber and the external environment when the misting array 120 is removed. The first misting array opening 150 includes misting array opening sidewalls 151 and 152. When the misting array assembly 120 is in the inserted position (as depicted in FIG. 10) the sealing piece extension 135 is in substantial conforming fit with the misting array opening 150. In particular, the sealing piece extension 135 is adjacent sidewalls 151 and 152 and is substantially planar with a surface of the abatement chamber. Having the sealing piece extension 135 be in substantial conforming fit may prevent air from leaking in from and/or out through the first misting array opening 150 and/or may minimize turbulence in gas flow in the abatement chamber as it moves by the first misting array opening 150.

In some embodiments the nozzles 126A, 126C, 128A, 128C, and 125B of misting array 120 may be Model SP 1.0S1J nozzles available from Parker Hannifin Corp. (Cleveland, Ohio) having a flow rate of approximately 0.72 GPM at 2000 PSI and having a solid cone shape distribution. In some embodiments approximately 0.95 to 1.58 GPM of liquid may be supplied to the misting array 120. Other nozzles may of course be used and, if necessary, appropriate adjustments made to misting array 120 to accommodate such other nozzles. In some embodiments the upper, middle, and lower nozzle sections 121A, 121B, and 121C may be half inch tubing with a 0.065" wall, the female tube fittings 124A, 124B, and 124C may be half inch female tube fittings, and the pipe nipples 123A, 123B, and 123C may be half inch NPT pipe nipples.

Although the first misting array 120 has been described in detail herein, one of ordinary skill in the art, having had the benefit of the present disclosure will recognize that other configurations of the misting array 120 may be utilized in other embodiments. For example, more or fewer nozzles may be provided on one or more of the nozzle sections. Also, for example, one or more portions of nozzle tubing may be non-linear (e.g., curvate, circular, elliptical, curvilinear, rectangular, triangular), non-perpendicular with respect to the gas flow moving through the abatement chamber, and/or may be non-parallel with respect to other nozzle tubing. Also, for example, the angle of one or more nozzles with respect to one or more other nozzles on a given nozzle section may be unique from other nozzles on the nozzle section. Also, for example, if upwardly and downwardly disposed nozzles are provided on a nozzle section they may be non-alternatingly provided, may be provided with some non-upwardly and non-downwardly disposed nozzles, and/or may each be provided at a unique rotational angle about a nozzle section. Also, for example, the frame structure may be modified to interact with an abatement chamber having a different geometric configuration or may have a geometric structure that is non-conforming with an abatement chamber. Also, for example, the sealing piece 130 may be configured to interact with a first misting array opening and/or a shell having a different configuration. For example, the sealing piece 130 may be configured to interact with one or more openings that extend through a side of an abatement system and also through the top of the abatement system. Also, for example, in some embodiments the size of the abatement chamber may be increased or decreased and the amount of nozzle tubing, nozzles, and/or arrangement of the nozzle tubing and/or nozzles may be altered to provide a desired misting coverage. Also, for example, in some embodiments the nozzle tubing may comprise more or fewer pieces. Also, for example, the nozzle output central axis of one or more nozzles may be directed with the direction of gas flow through the abatement chamber when the misting array is inserted therein. Also, for example, the misting array and the abatement system may be configured for insertion of the misting array into an opening through another side (e.g., the top) of the abatement system. Also, for example, in some embodiments the nozzle output central axis of one or more nozzles may be directed with the direction of gas flow and the nozzle output central axis of one or more nozzles may be directed counter to the direction of gas flow. Also, for example, in some embodiments the nozzle output central axis of one or more nozzles on a nozzle tubing may be directed at an intersecting angle with respect to one or more nozzles on the same nozzle tubing.

Figure 3:
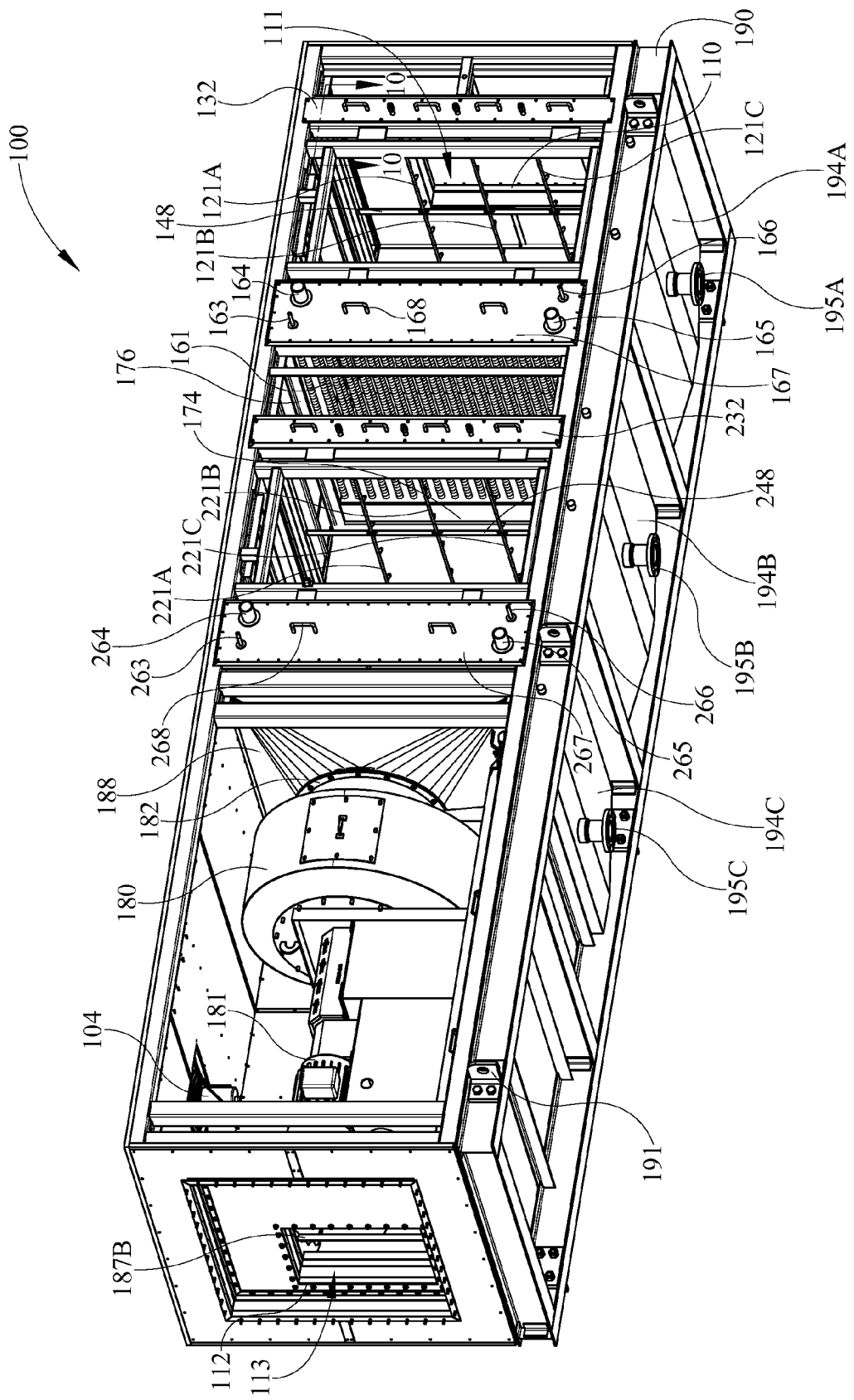
FIG. 3 illustrates a lower access side and exhaust side perspective view of the first embodiment of the abatement system; portions of a shell and portions of an abatement chamber on an access side of the abatement system have been removed therefrom in order to provide a better view of various components of the abatement system.
Figure 4:
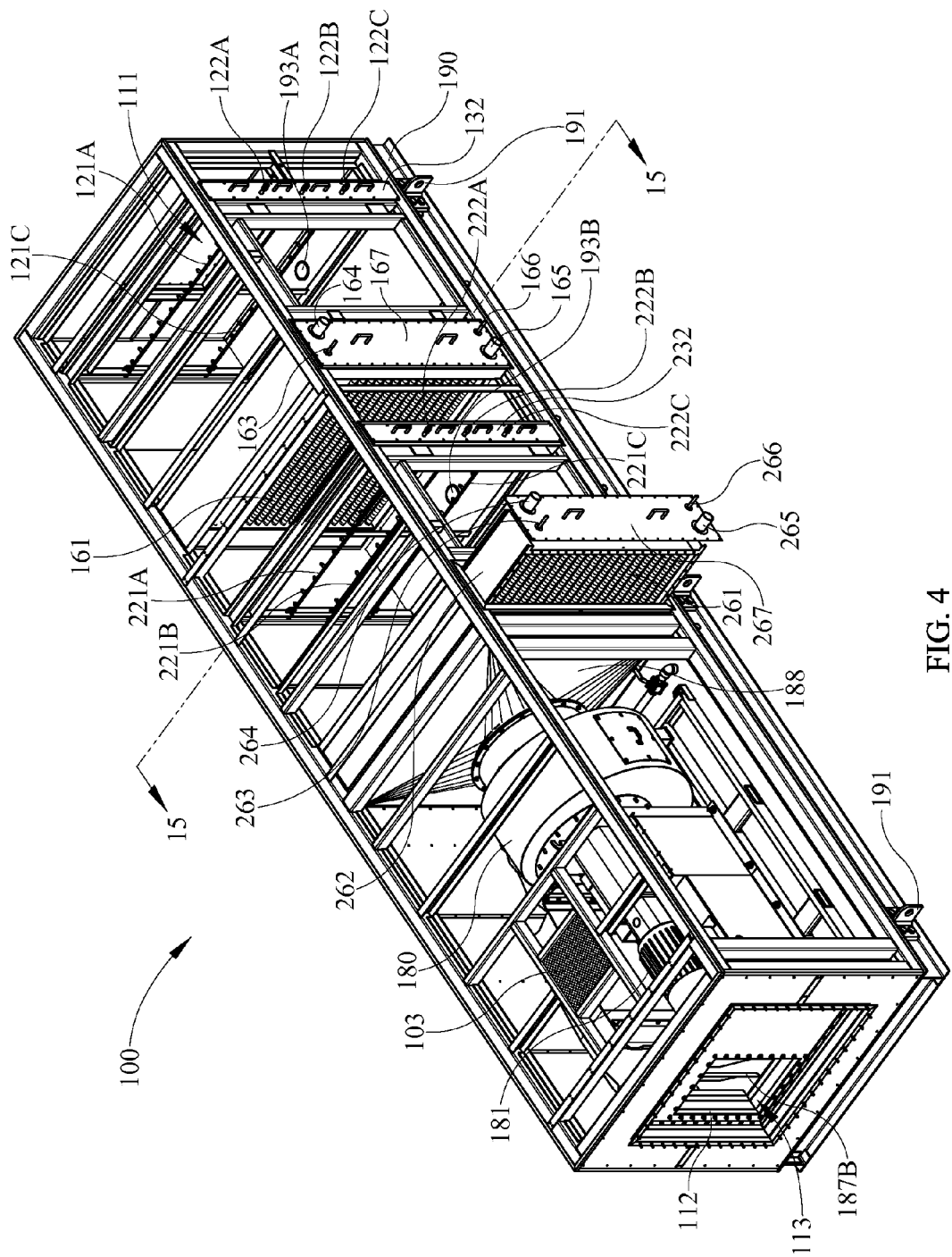
FIG. 4 illustrates an upper access side and exhaust side perspective view of the first embodiment of the abatement system; portions of a shell on an access side and a top of the abatement system have been removed and portions of an abatement chamber on an access side and a top of the abatement system have been removed in order to provide a better view of various components of the abatement system.

Referring again to FIG. 1 through FIG. 4, downstream of the first misting array 120 is a first condensing coil assembly 160, which is shown exploded away from the abatement system 100 in a removed position in FIG. 2. The first condensing coil assembly 160 may remove and/or recover heat from gas flow within the abatement chamber. The first condensing coil assembly 160 includes condensing coils 161 supported by a coil frame 162. The condensing coils 161 are in communication with a vent connection 163, a return connection 164, a supply connection 166, and a drain connection 166, all of which extend through openings in a first condensing coil assembly sealing plate 167. The sealing plate 167 includes vertically aligned handles 168 that, as will be described in additional detail herein, may aid in the removal of the first condensing coil assembly 160 from the abatement chamber. In some embodiments the condensing coil frame 162, the condensing coils 161, and the corresponding connections 163-166 may be Type CP Coils, Model No. CP-AL-36-54-6 Left, available from Aerofin Heat Transfer Products (Lynchburg, Va.). However, one of ordinary skill in the art having had the benefit of the present disclosure will recognize that other condensing coils may be utilized in combination with the abatement system 100 described herein or with other abatement systems. When the condensing coil assembly 160 is in the inserted position, as shown in FIGS. 1, 3, and 4, the condensing coils 161 are situated across the gas flow moving through the abatement chamber in a direction generally perpendicular to the gas flow. The condensing coils 161 are positioned in a first condensing section of the abatement chamber when the condensing coil assembly 160 is in the inserted position.

Figure 14:
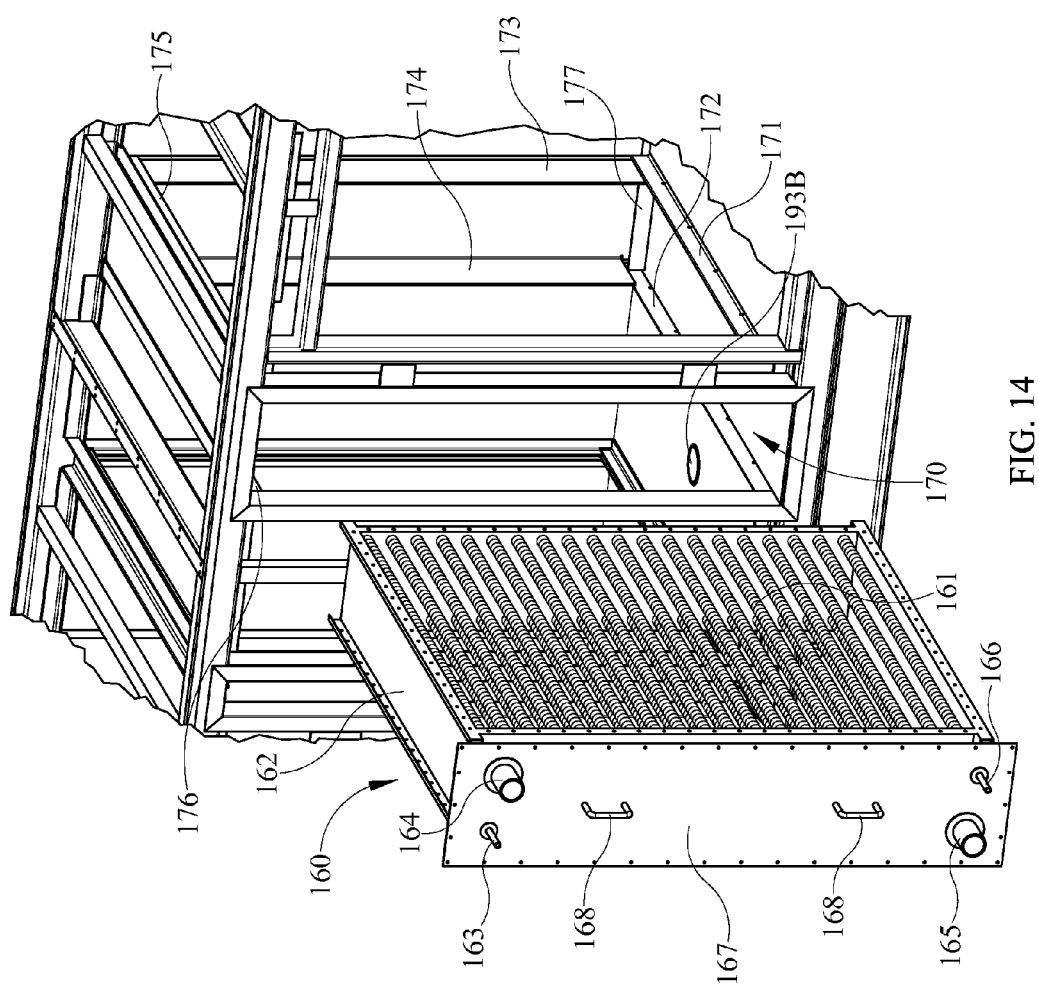
FIG. 14 illustrates a close-up perspective view of the first embodiment of the abatement system showing the first condensing coil assembly exploded away in a removed position; portions of a shell on an access side and a top of the abatement system have been removed and portions of an abatement chamber on an access side and a top of the abatement system have been removed in order to provide a better view of various components of the abatement system.

Referring to FIG. 14, a close-up perspective view of the abatement system 100 shows the first condensing coil assembly 160 in a removed position. Portions of a shell on an access side of the abatement system 100 and a top of the abatement system 100 and portions of the access side and top side of the abatement chamber have been removed in order to provide a better view of a condensing coil track structure within the abatement chamber. The track structure is accessible through a first condensing coil opening 170 that extends from the abatement chamber to the external environment. The track structure includes a lower track front flange 171 and an opposed lower track rear flange 172; a side track front flange 173 and an opposed side track rear flange 174; and an upper track front flange 175 and an opposed upper track rear flange 176. When the first condensing coil assembly 160 is inserted into the first condensing coil opening 170, the frame structure member 162 is guided by the track structure. A stop plate 177 is optionally provided interposed between the lower track front flange 171 and the lower track rear flange 172 to prevent the condensing coil assembly 160 from being inserted into the abatement chamber beyond a certain depth.

Figure 15:
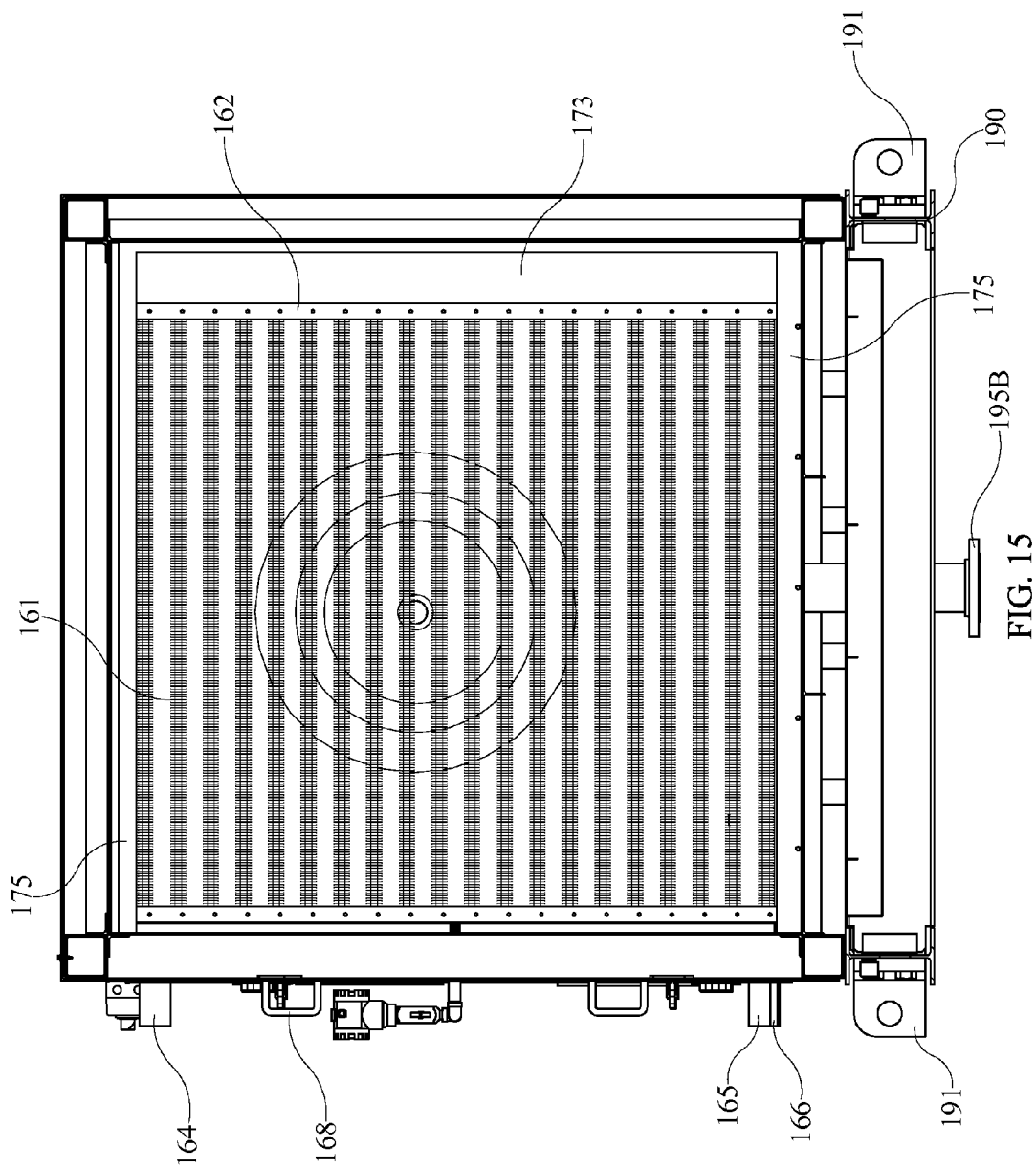
FIG. 15 illustrates a section view of the first embodiment of the abatement system taken along the section line 15-15 of FIG. 4.

As shown in FIG. 15, which shows the first condensing coil assembly 160 in the inserted position, it can be seen that the track structure abuts and/or overlaps the frame structure member 162, thereby forcing a substantial majority of the gas flow through the condensing coils 161. In other embodiments alternative track structure may be provided in the abatement chamber and configured to interact with coil frame 162 or a coil frame having an alternative construction than coil frame 162. Also, in some embodiments track structure may be integrated into the coil frame 162 and interact with a corresponding extension/blade or other structure extending from the abatement chamber.

As shown for example in FIG. 14, a plurality of fastener apertures are provided along the periphery of the front face of the sealing plate 167 and extend through the rear face of the sealing plate 167. The fastener apertures also optionally extend through a gasket that may be provided along the periphery of the rear face of the sealing plate 167. When the condensing coil 160 is placed in an inserted position in the abatement chamber, the sealing plate 167 abuts a shell of the abatement system 100. Fasteners may be inserted through the fastener apertures of the sealing plate 167 and received in corresponding receiving apertures in the shell of the abatement system 100 to thereby sealingly and securely couple the sealing plate 167 over the first condensing coil opening 170. The optional gasket may enhance the seal between the sealing plate 167 and the shell of the abatement system 100.

Referring again to FIG. 1 and FIG. 2, interposed between the first misting array 120 and the first condensing coil assembly 160 is a first access door 101A that enables access to portions of the abatement chamber between the first misting array 120 and the first condensing coil assembly 160. In its closed position, the first access door 101A creates a substantially sealed barrier between the abatement chamber and the exterior environment. The first access door 101A may optionally be omitted in some embodiments. The first access door 101A and other portions of the shell of the abatement system 100 are shown omitted from FIG. 3 and FIG. 4 in order to provide a better view of internal components of the abatement system 100 and their positioning within the abatement chamber. Portions of the abatement chamber are also omitted from FIG. 3 and FIG. 4.

Referring again to FIG. 1 through FIG. 4, downstream from the first condensing coil assembly 160 is a second misting array 220, which is shown exploded away from the abatement system 100 in a removed position in FIG. 2. When a misting array (or one or more components of a misting array) is described herein as being in a removed position or being removed or removable from the abatement chamber, it does not require (but can include) that the misting array (or one or more components) actually be separated from the abatement system. Moreover, being in a removed position or being removed or removable from the abatement chamber does not require (but can include) that the misting array (or one or more components) be completely removed from the abatement chamber. Rather, being in a removed position or being removed or removable from the abatement chamber only requires that at least some of the misting array that is within the abatement chamber and in contact with the gas flow of the abatement chamber when the misting array is in the inserted position is at least partially removed from the gas flow within the abatement chamber. In the depicted embodiment the second misting array 220 shares the same configuration with misting array 120, but is simply in a different position within abatement system 100. Accordingly, description concerning many aspects of misting array 220 is omitted herein for purpose of conciseness. However, it is understood that those aspects of misting array 220 having numbering of 2XX share a common configuration with those aspects of misting array 120 having numbering of 1XX. For example, sealing plate 232 has a common configuration as sealing plate 132.

Although the first misting array 120 and second misting array 220 are depicted and described herein as having a common configuration, it is understood that in alternative embodiments an abatement system may be provided wherein a plurality of misting arrays are provided, and one or more of the misting arrays may have a configuration that is distinct in one or more aspects from one or more other misting arrays of the abatement system. For example, one or more misting arrays may have more or fewer nozzles than one or more other misting arrays, may have a different nozzle arrangement than one or more other misting arrays and/or may have a different frame structure than one or more other misting arrays.

Figure 11:
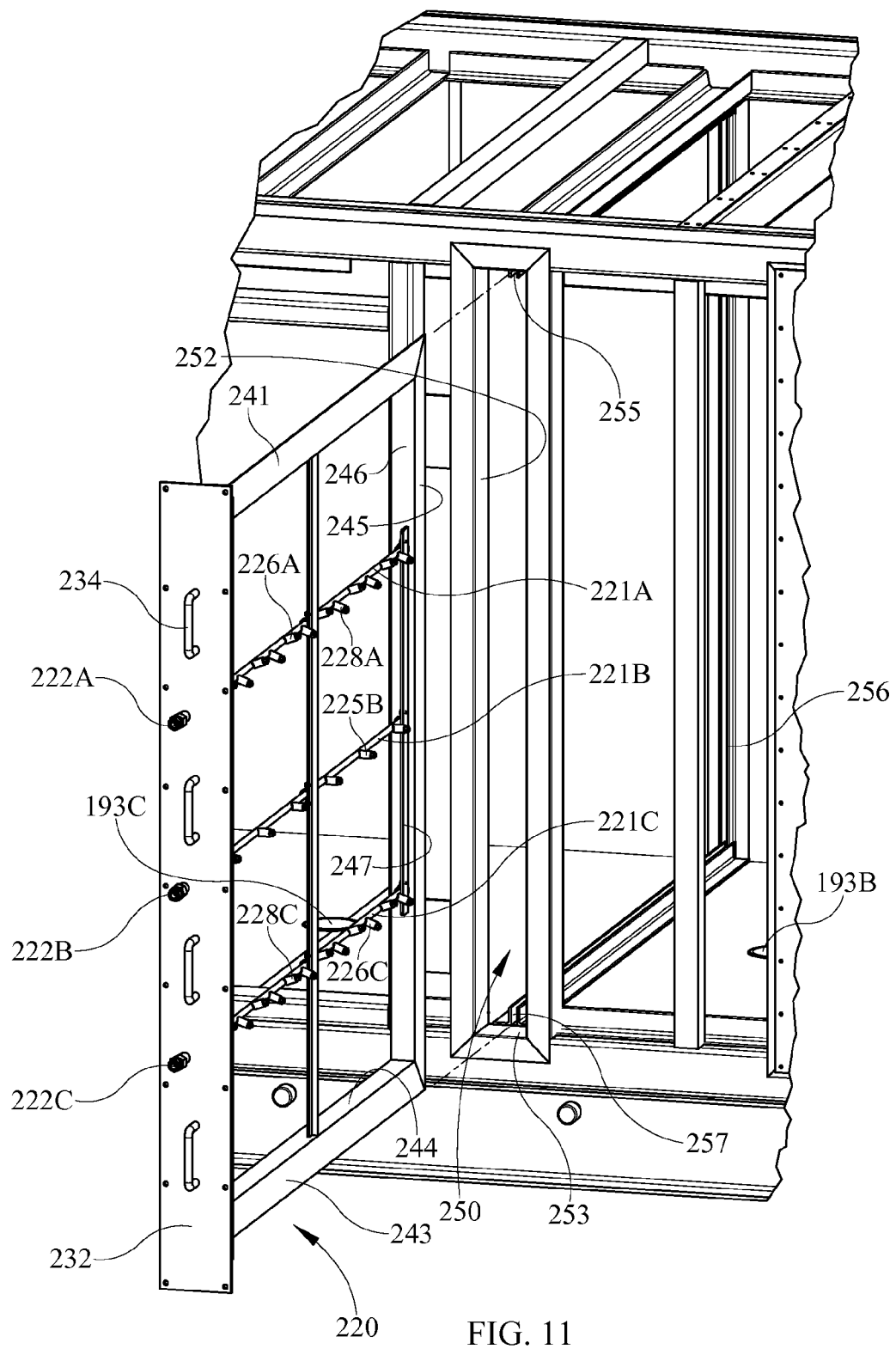
FIG. 11 illustrates a close-up perspective view of the first embodiment of the abatement system showing the second misting array assembly exploded away in a removed position; portions of a shell on an access side and a top of the abatement system have been removed and portions of an abatement chamber on an access side and a top of the abatement system have been removed in order to provide a better view of various components of the abatement system.

Referring now to FIG. 11, a close-up perspective view of the abatement system 100 shows the second misting array 220 in a removed position. Portions of a shell on an access side of the abatement system 100 and a top of the abatement system 100 and portions of an access and top side of an abatement chamber have been removed in order to provide a better view of a second misting array track structure within the abatement chamber. The second misting array track structure is accessible through a second misting array opening 250 that extends from the abatement chamber to the external environment when second misting array 220 is in the removed position. The misting array opening 250 includes a first sidewall 251 and opposed second sidewall 252, and a lower wall 253 and opposed upper wall 254. The misting array track structure includes a lower track 257 having a lower track front flange and an opposed lower track rear flange; a side track 256 having a side track front flange and an opposed side track rear flange; and an upper track 255 having an upper track front flange and an opposed upper track rear flange. When the second misting array 220 is inserted into the second misting array opening 250, the frame structure thereof is guided by the track structure extending from the abatement chamber. In particular, the upper frame structure member 241 is guided by the upper track 255, the lower frame structure member 243 is guided by the lower track 257, and the side frame structure member 245 is engaged within the side track 256 when the second misting array 220 is in the inserted position.

When the second misting array 220 is fully inserted, the upper track 255 will overlap the upper frame structure member 241, the lower track 257 will overlap the lower frame structure member 243, and the side track 256 will overlap the side frame structure member 245. Accordingly, the second misting array 220 may be securely maintained in position and a majority of the gas flow through the second misting section the abatement chamber may be directed within the frame structure of the second misting array 220. In a similar manner as described with respect to the first misting array 120, when the second misting array 220 is placed in an inserted position in the abatement chamber, the sealing plate 232 will abut a shell of the abatement system 100. Fasteners may be inserted through the fastener apertures of the sealing plate 232 and received in corresponding receiving apertures in the shell of the abatement system 100 to thereby sealingly and securely couple the sealing plate 232 over the second misting array opening 250. A gasket may optionally be interposed between the sealing plate 232 and the shell of the abatement system 100 to enhance the seal.

In the abatement system 100, first misting array track structure that interacts with frame structure of the first misting array 120 is also provided in the abatement chamber. The first misting array track structure is accessible through the first misting array opening 150. Optionally, the first misting array track structure may include a lower track having a lower track front flange and an opposed lower track rear flange; a side track having a side track front flange and an opposed side track rear flange; and an upper track having an upper track front flange and an opposed upper track rear flange. When the first misting array 120 is inserted into the first misting array opening 150, the frame structure thereof may be guided by the track structure extending from the abatement chamber. Accordingly, in some embodiments both the first misting array 120 and the second misting array 220 may be slidably removable from the abatement system 100.

Although the track structures accessible through first misting array opening 150 and second misting array opening 250 have been described in detail herein and the frame structures of first and second misting arrays 120 and 220 have also been described, one of ordinary skill in the art, having had the benefit of the present disclosure will recognize that other configurations of the track structure and/or frame structure may be utilized. For example, in some embodiments alternative track structure may be provided through first misting array opening 150 and configured to interact with the same or alternative frame structure of first misting array 120. Similarly, in some embodiments alternative track structure may be provided through second misting array opening 250 and configured to interact with the same or alternative frame structure of second misting array 220. Also, for example, in some embodiments track structure may be integrated into the frame of first misting array 120 and/or second misting array 220 and interact with a corresponding blade or other structure extending from the abatement chamber and accessible through first misting array opening 150 and/or second misting array opening 250. Also, for example, the frame structure may be modified to interact with an abatement chamber and/or track structure having a different geometric configuration. Also, for example, in some embodiments side track structure may be omitted.

Referring again to FIG. 1 through FIG. 4, downstream of the second misting array 220 is a second condensing coil assembly 260, which is shown partially exploded away from the abatement system 100 in a partially removed position in FIG. 2. In the depicted embodiment the second condensing coil assembly 260 shares a similar configuration with first condensing coil 160, but is simply in a different position within abatement system 100. Accordingly, description concerning many aspects of second condensing coil assembly 260 is omitted herein for the purpose of conciseness. However, it is understood that those aspects of second condensing coil assembly 260 having numbering of 2XX share a common configuration with those aspects of first condensing coil assembly 160 having numbering of 1XX. For example, sealing plate 267 has a common configuration as sealing plate 167. Although first condensing coil assembly 160 and second condensing coil assembly 260 are depicted and described herein as having a common configuration, it is understood that in alternative embodiments an abatement system may be provided wherein a plurality of condensing coil assemblies are provided, and one or more of the condensing coil assemblies may have a configuration that is distinct in one or more aspects from one or more other condensing coil assemblies of the abatement system.

In the abatement system 100, second condensing coil track structure is provided in the abatement chamber and is accessible through second condensing coil opening 270 (FIG. 4). Optionally, the second condensing coil track structure may include a lower track front flange and an opposed lower track rear flange; a side track front flange and an opposed side track rear flange; and an upper track front flange and an opposed upper track rear flange. When the second condensing coil assembly 260 is inserted into the second condensing coil opening 270, the coil frame 262 thereof may be guided along the track structure extending from the abatement chamber. Accordingly, in some embodiments both the first condensing coil assembly 160 and the second condensing coil assembly 260 may be slidably removable from the abatement system 100.

When inserted in the abatement system 100, the second condensing coil assembly 260 is in a second condensing section of the abatement chamber. Moreover, the downstream side of the second condensing coil assembly 260 is generally at the end of the abatement chamber. Referring to FIG. 3 and FIG. 4, it is illustrated that a large opening end of a transition piece 188 is coupled to the end of the abatement chamber and a small opening end of the transition piece 188 is coupled a fan entrance 182 of a fan 180. The transition piece 188 acts as an intermediary structure between the larger abatement chamber and the smaller fan entrance 182.

Figure 2:
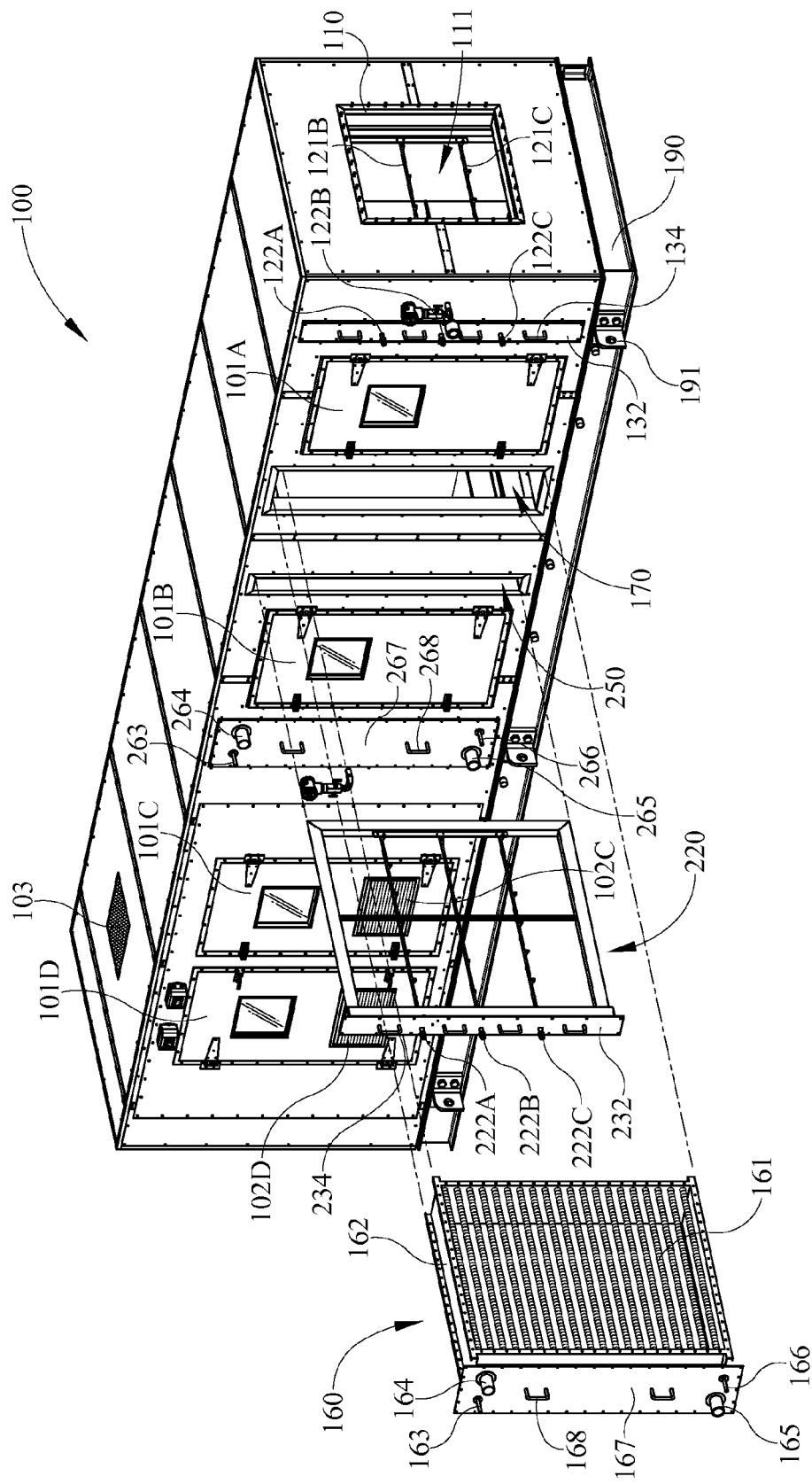
FIG. 2 illustrates an upper access side and intake side perspective view of the first embodiment of the abatement system with a first condensing coil assembly and a second misting array assembly shown exploded away from the abatement system in removed positions.

As shown in FIG. 1 and FIG. 2, interposed between the second misting array 220 and the second condensing coil assembly 260 is a second access door 101B that enables access to portions of the abatement chamber between the second misting array 220 and the second condensing coil assembly 260. In its closed position, second access door 101B creates a substantially sealed barrier between the abatement chamber and the exterior environment. The second access door 101B may optionally be omitted in some embodiments. The second access door 101B and other portions of the shell of the abatement system 100 portions of the abatement chamber are shown omitted from FIG. 3 and FIG. 4 in order to provide a better view of internal components of the abatement system 100 and their positioning within the abatement chamber.

Figure 12:
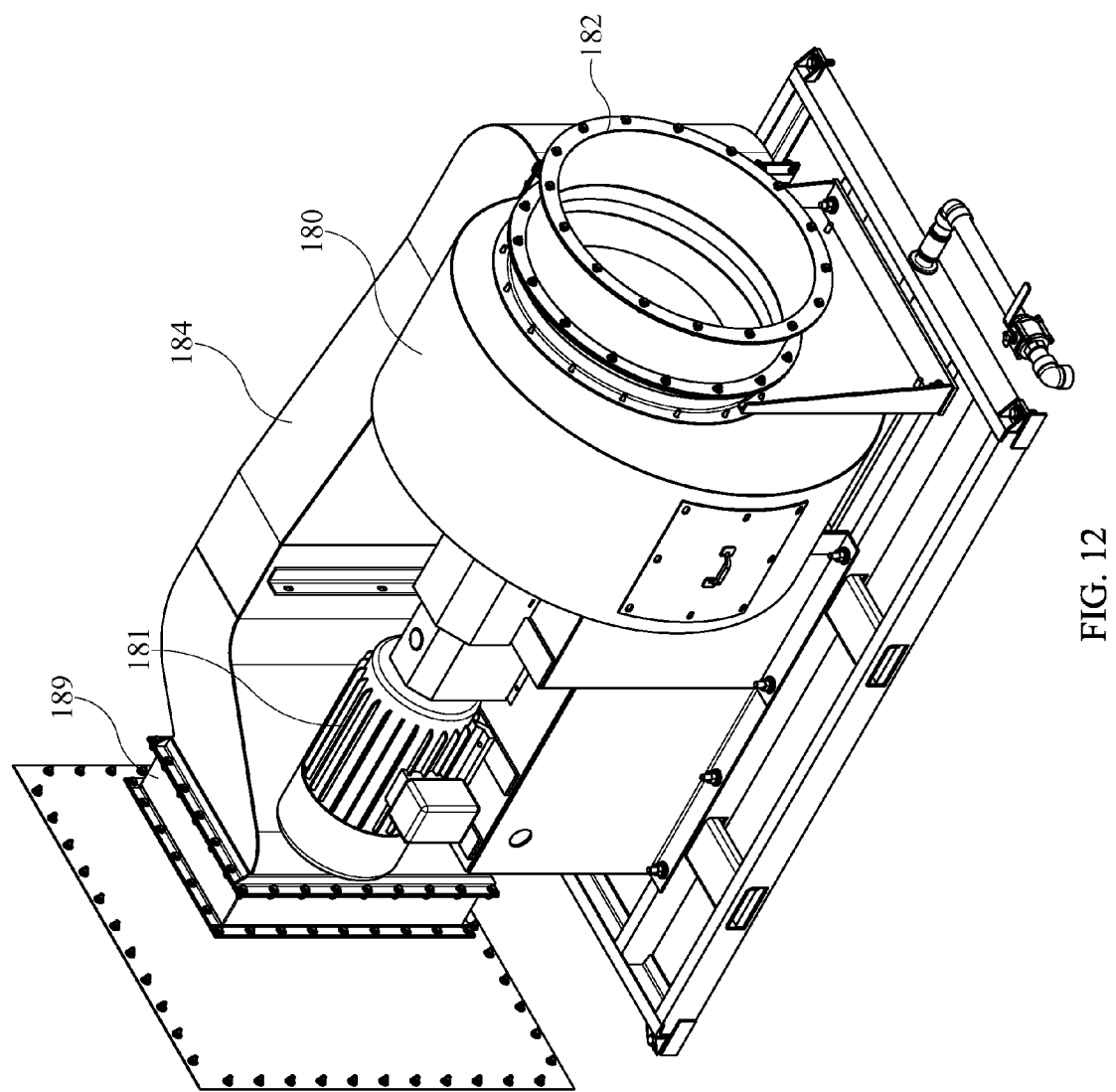
FIG. 12 illustrates a top perspective view of a fan and exhaust assembly of the first embodiment of the abatement system.
Figure 13:
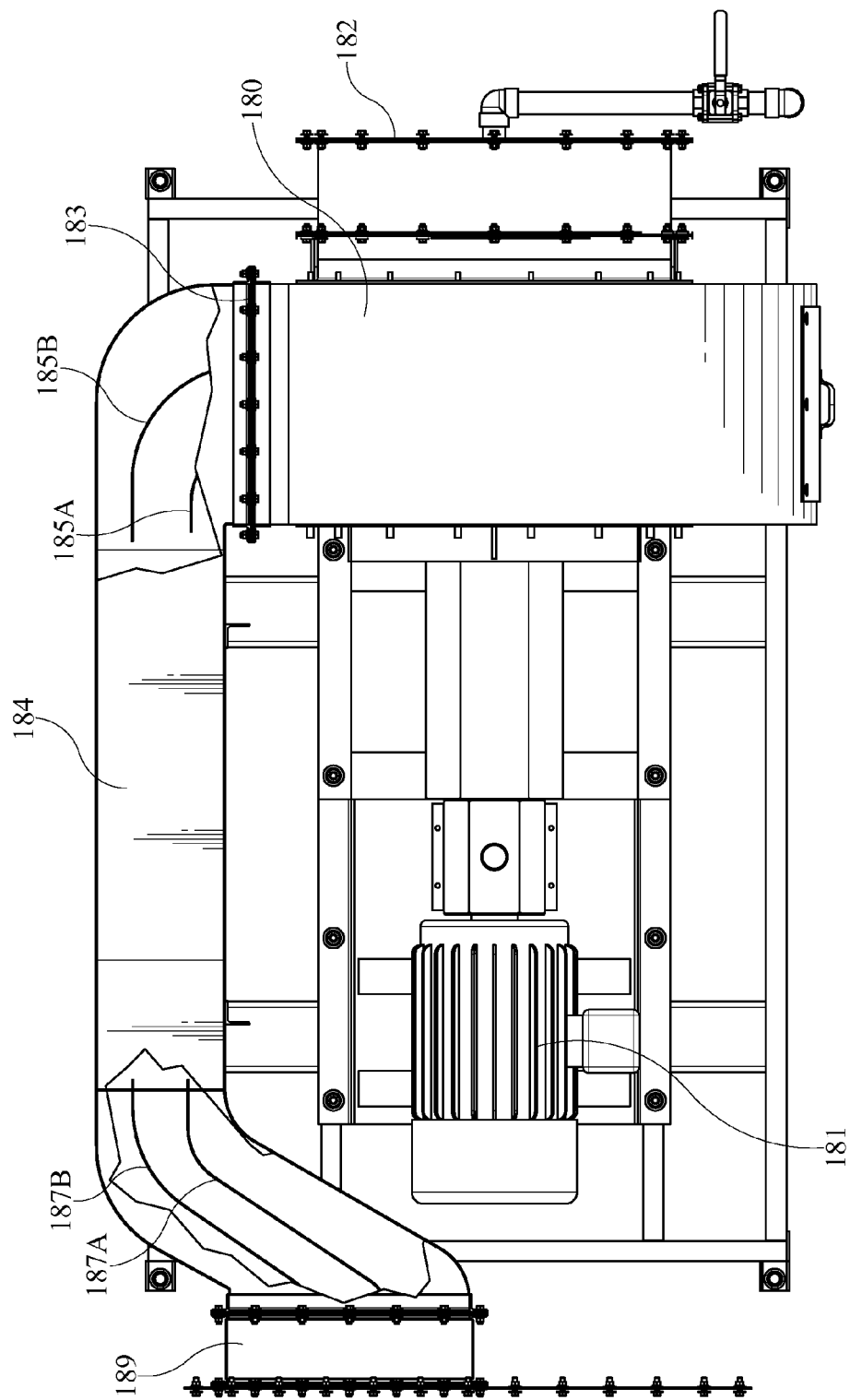
FIG. 13 illustrates a top view of the fan and exhaust assembly of FIG. 12; portions of an exhaust duct are broken away showing internal components thereof.

With continuing reference to FIG. 1 through FIG. 4, and additionally to FIGS. 12 and 13, various aspects of the fan 180 and the exhaust assembly of the abatement system 100 are described. The fan 180 is driven by a motor 181 and draws gas through air inlet 111 and through the abatement chamber when in operation. In some embodiments the fan 180 may be a Size 271 ACF, Class 3, Arrangement-8SW, CCW BH fan available from The New York Blower Company (Willowbrook, Ill.) that operates at approximately 13,500 CFM. One of ordinary skill in the art, having had the benefit of the present disclosure will recognize that other fans may be utilized and that in other embodiments fans may be utilized that have a higher or lower CFM capability. For example, in some embodiments the abatement chamber may be increased in size and a fan having larger CFM capability may be utilized.

The fan 180 also has a fan exhaust 183 that is coupled to an exhaust duct 184 and feeds gas flow received through fan entrance 182 to the exhaust duct 184. The fan 180, fan motor 181, and exhaust duct 184 are situated in a fan and exhaust chamber of the abatement system 100. The exhaust duct 184 is coupled to a transition piece 189 that defines an air outlet opening 112 (FIG. 3 and FIG. 4), which in turn defines an air outlet 113 (FIG. 3 and FIG. 4). Referring to FIG. 13, the exhaust duct 184 includes turning vanes 185A and 185B proximal its coupling with the fan exhaust 183. The turning vanes 185A and 185B extend from adjacent the fan exhaust 183 to adjacent a straight portion of the exhaust duct 184. The turning vanes 185A and 185B may help to transition exhaust from the fan to the straight portion of exhaust duct 184 and may prevent excess backpressure on the fan 180 and/or excess pressure on the exhaust duct 184. With continuing reference to FIG. 13 and additional reference to FIG. 3 and FIG. 4, the exhaust duct 184 also includes turning vanes 187A and 187B that extend from the end of the straight section of exhaust duct 184 to the transition piece 189. The turning vanes 185A and 185B may help to transition exhaust from the straight portion of exhaust duct 184 to the air outlet 113 and may prevent excess backpressure on the fan 180 and/or prevent excess pressure on the exhaust duct 184. The arrangement of the fan 180 and the exhaust duct 184 may enable the abatement system 100 to be constructed in a generally linearly extending fashion.

Heat generated by the fan 180 and fan motor 181 is vented through a fan outlet vent 103 (FIG. 1 through FIG. 4) provided between the fan and exhaust chamber and the exterior environment and is provided at the top of the abatement system 100. An outlet vent fan 104 (FIG. 3) is also included adjacent the fan outlet vent 103 to aid in the removal of heat from within the fan and exhaust chamber.

As shown in FIG. 1 and FIG. 2, third and fourth access doors 101C and 101D enable access to the fan and exhaust chamber. The third access door 101C includes an inlet vent 101C and the fourth access door 104D includes an inlet vent 101D to allow for external air to enter the fan and exhaust chamber. The third and fourth access doors 101C and 101D may optionally be omitted in some embodiments. The third and fourth access doors 101C and 101D, other portions of the shell, and portions of the abatement chamber of the abatement system 100 are shown omitted from FIG. 3 and FIG. 4 in order to provide a better view of internal components of the abatement system 100 and their positioning within the abatement chamber.

Referring to FIG. 4, FIG. 11, and FIG. 14, various drain inlets 193A-C are provided on the floor of the abatement chamber. A similar drain inlet is provided adjacent the second condensing coil assembly 260, but is not shown in the figures. The floor of the abatement chamber is sloped such that liquid is directed toward drain inlets 193A-C. Accordingly, liquid output from misting arrays 120 and 220 and/or liquid output from condensation on condensing coils 160 and 260 is directed toward drain inlets 193A-C. The liquid may contain one or more pollutants captured therein from a flue gas stream moving through the abatement chamber. Referring to FIG. 3, tanks 194A-C are visible on the base of the abatement system 100 surrounded by the support base 190. The tanks 194A-C are in flow communication with respective of the drain inlets 193A-C and collect liquid via the drain inlets 193A-C. Drain outlets 195A-C extend from the tanks 194A-C and may be coupled to piping that leads to external tanks, external treatment areas, or elsewhere in order to drain the tanks 194A-C. In some embodiments the tanks 194A-C may be omitted and the drain inlets 193A-C may be directly coupled to one or more piping that leads to external tanks, external treatment areas, or elsewhere.

Optionally, one or more components within the abatement chamber of the abatement system 100 (e.g., the condensing coil assemblies 160/260, the misting arrays 120/220) and/or the abatement chamber itself may be coated with one or more coatings to protect from corrosion. For example, one or more components may be coated with one or more coatings available from Heresite Protective Coatings (Manitowoc, Wis.).

Figure 16:
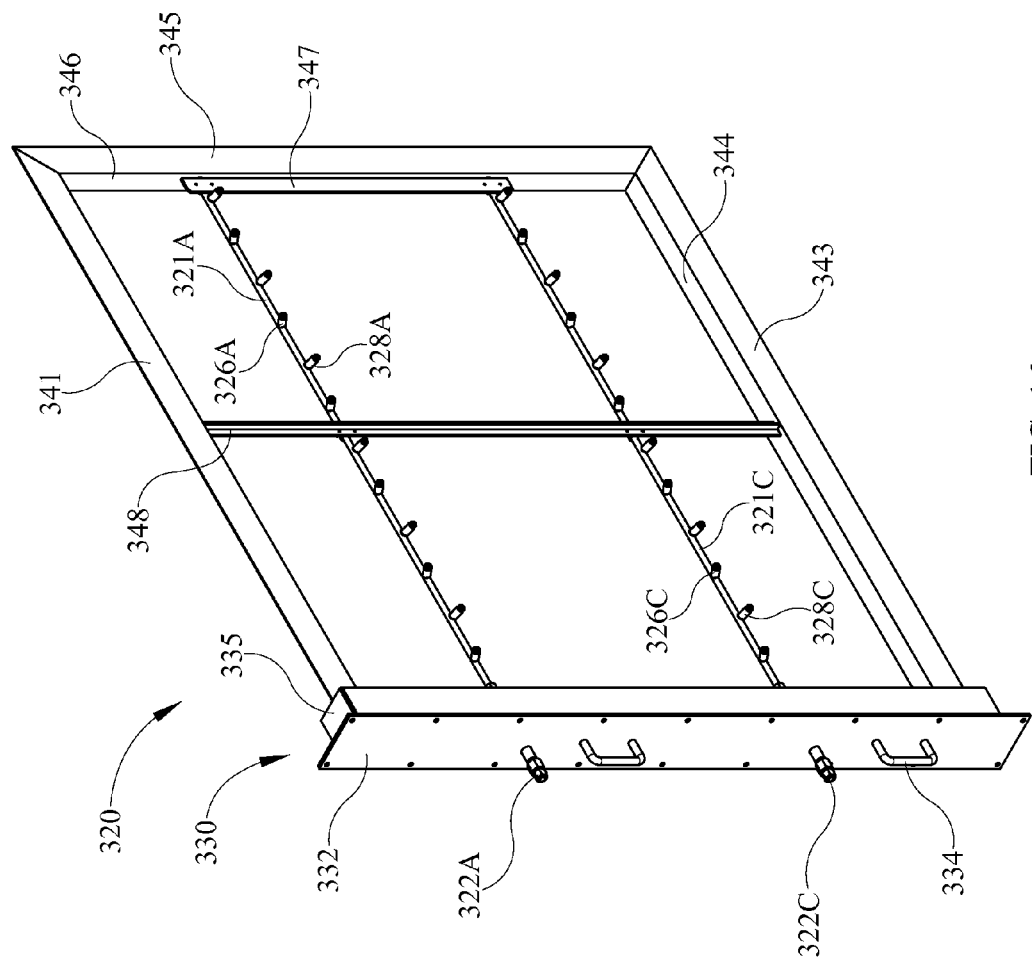
FIG. 16 illustrates a second embodiment of a misting array for use in an abatement system.

Referring now to FIG. 16, a second embodiment of a misting array 320 for use in an abatement system is illustrated. In some embodiments the misting array 320 may be utilized in an abatement system that removes pollutants from a flue gas created by the combustion of coal. The misting array 320 is similar to the first misting array 120 and the second misting array 220, but does not include a middle nozzle row. The misting array 320 includes a sealing piece 330 having a sealing plate 332 and a sealing plate extension 335. Two handles 334 are provided on an exterior face of the sealing plate 332. A frame structure is coupled to and extends from the sealing piece 330 and includes an upper frame structure member 341 having an upper frame structure rim portion (not shown), a side frame structure member 345 having a side frame structure rim portion 346, and a lower frame structure member 343 having a lower frame structure rim portion 344. The frame structure also includes a middle support bar 348 and a side support bar 347.

An upper nozzle tubing of the misting array 320 has an upper liquid source coupling 322A on the exterior side of the sealing piece 330, extends through the sealing piece 330, and has an upper nozzle section 321A on an interior side of the sealing piece 330. The upper nozzle section 321A has a plurality of upwardly disposed nozzles 326A and downwardly disposed nozzles 328A coupled thereto. The upwardly and downwardly disposed nozzles 326A and 328A are alternatingly provided on the upper nozzle section 321A and are offset approximately forty degrees from one another. Similarly, a lower nozzle tubing of the misting array 320 has a lower liquid source coupling 322C on the exterior of the sealing piece 330, extends through the sealing piece 330, and has a lower nozzle section 321C on an interior side of the sealing piece 330. The lower nozzle section 321C has alternatingly provided upwardly and downwardly disposed nozzles 326A and 328A that are offset approximately forty degrees from one another.

Figure 17:
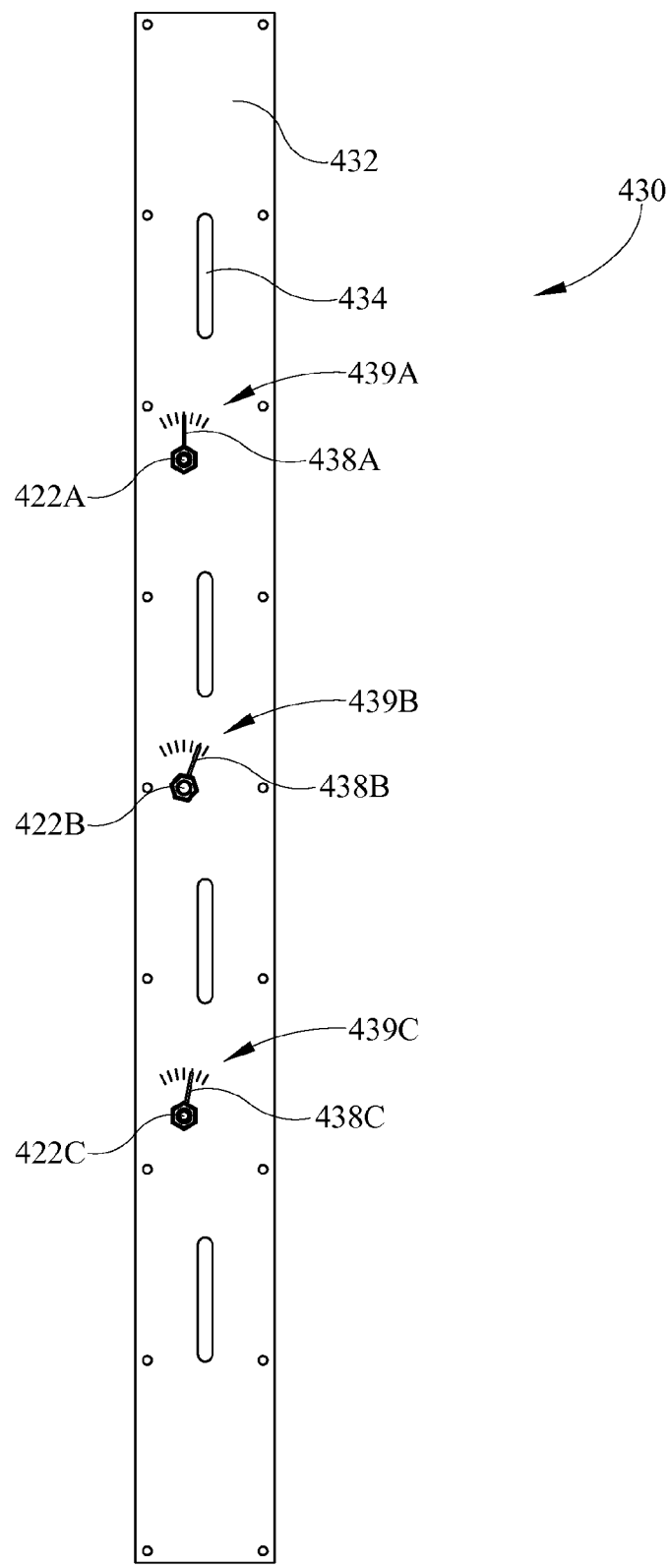
FIG. 17 illustrates a portion of a third embodiment of a misting array for use in an abatement system.
Figure 18A:
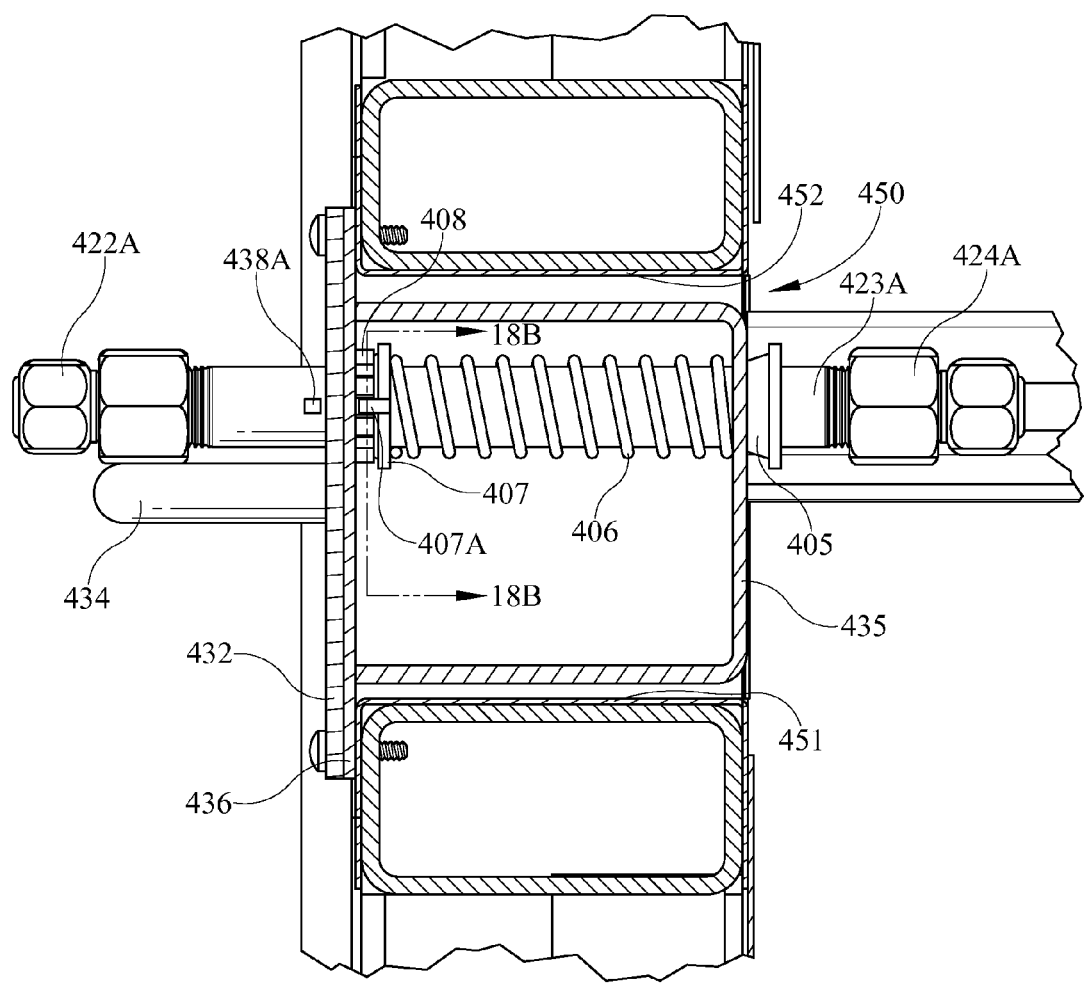
FIG. 18A illustrates a top section view of a portion of the third embodiment of the misting array of FIG. 17 shown inserted in a misting array opening.
Figure 18B:
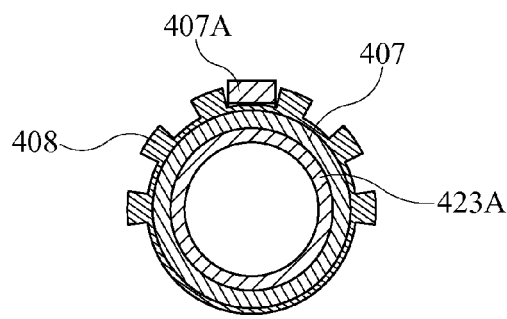
FIG. 18B illustrates a section view of a portion of the third embodiment of the misting array of FIG. 17 taken along the section line 18B-18B of FIG. 18A.

Referring now to FIG. 17, FIG. 18A, and FIG. 18B, aspects of a third embodiment of a misting array 420 for use in an abatement system are depicted and described. FIG. 17 depicts portions of the sealing piece 430 of the misting array 420. The sealing piece 430 includes a sealing plate 432 having vertically aligned handles 434 thereon. Liquid source couplings 422A, 422B, and 422C of upper, middle, and lower nozzle tubings, respectively, are provided on an exterior side of sealing plate 432. Indicators 438A, 438B, and 438C are coupled to pipe nipples 423A, 423B, and 423C of upper, middle, and lower nozzle tubing proximal respective of liquid source couplings 422A, 422B, and 422C. Fiducial markings 439A, 439B, and 439C are provided on the sealing plate 432 proximal respective of the indicators 438A, 438B, and 438C. The positioning of the indicators 438A, 438B, and 438C with respect to the fiducial markings 439A, 439B, and 439C is indicative of the rotational orientation of respective nozzle tubing coupled to the indicators 438A, 438B, and 438C. For example, the positioning of the indicator 438A may be indicative that the upper nozzle tubing coupled to the indicator 438A is at a first rotational orientation. The positioning of the indicator 438B may be indicative that the middle nozzle tubing coupled to the indicator 438B is at a second rotational orientation offset approximately twenty-five degrees from the first rotational orientation of the upper nozzle tubing.

In the depicted embodiment, the rotational orientation of respective nozzle tubing coupled to the indicators 438A, 438B, and 438C may be adjusted from exteriorly of the sealing piece 430. Referring to FIG. 18A, a top section view of a portion of the misting array 420 is shown with the misting array 420 inserted into an opening 450 of an abatement system. The opening 450 includes opposed sidewalls 451 and 452 and provides access to an abatement chamber. Portions of the upper nozzle tubing of the misting array 420 are visible in FIG. 18A. The upper nozzle tubing includes a pipe nipple 423A coupled to the liquid source coupling 422A. The pipe nipple 423A extends through the sealing plate 432 and the sealing piece extension 435 of the sealing piece 430. A gasket 405 is provided around pipe nipple 423A and sealingly engages an opening of sealing piece extension 435 through which pipe nipple 423A extends. A portion of the pipe nipple 423A between the sealing piece extension 435 and a female tube fitting 424A of the upper nozzle tubing is sized so as to engage the gasket 405 and thereby cause the gasket 405 to sealingly engage the opening of sealing piece extension 435.

An open coil spring 406 is interposed between an engagement washer 407 and an interior side of an abatement chamber facing wall of the sealing piece extension 435. The open coil spring 406 exerts force on the engagement washer 407 and the interior side of the abatement chamber facing wall of the sealing piece extension 435. The engagement washer 407 is provided around and fixedly coupled to the pipe nipple 423A. The engagement washer 407 includes an engagement protrusion 407A extending therefrom that releasably engages a keyed rotational restraint mechanism 408 that is coupled to an interior wall of the sealing plate 432. A section view of the engagement washer 407, rotational restraint mechanism 408, and pipe nipple 423A along the section line 18B-18B of FIG. 18A is shown in FIG. 18B. The rotational restraint mechanism 408 includes a plurality of notches radially arranged thereon that are sized to receive and substantially lock into place engagement protrusion 407A. Accordingly, engagement protrusion 407A may be locked into a desired of a plurality of preselected positions defined by the notches of restraint mechanism 408. When engagement protrusion 407A is locked into a notch of the restraint mechanism 408, the rotational orientation of the washer 407, the pipe nipple 423A, and the remainder of the nozzle tubing (including attached nozzles) is also locked into place.

In order to adjust the notch of restraint mechanism 408 in which engagement protrusion 407A is locked, a user may first cause force to be applied on pipe nipple 423A from exteriorly of the sealing plate 432 in a direction along the central axis of pipe nipple 423A. The force needs to be of a magnitude sufficient to compress spring 406 enough to cause the protrusion 407A to be disengaged from the restraint mechanism 408. The upper nozzle tubing may be coupled to a frame of misting array assembly 420 in such a manner as to allow sufficient translation thereof to enable the protrusion 407A to be disengaged from the restraint mechanism 408. Once force in a direction along the central axis of pipe nipple 423A is applied, the user may continue to apply such force and cause pipe nipple 423A (and the remainder of the upper nozzle tubing) to be rotated in a desired direction from exteriorly of the sealing plate 432. When the upper nozzle tubing is rotated to a desired orientation, the force in a direction along the central axis of pipe nipple 423A may be released to cause the protrusion 407A to engage a notch of the restraint mechanism 408. The force of the spring 406 will lock the protrusion 407A in place and will also cause a portion of the pipe nipple 423A to reengage the gasket 405 and thereby ensure the gasket 405 sealingly engages the opening through sealing plate extension 435. Slight tuning of the rotational orientation of the upper nozzle tubing may be necessary to cause the protrusion 407A to engage a notch of the restraint mechanism 408 (and not adjacent structure). In some embodiments the structure bordering the notches of restraint mechanism 408 and/or the protrusion 407A may be chamfered to help member protrusion 407A into a proximal adjacent notch. In some embodiments the fiducial markings 439A may be substantially aligned with notches of restraint mechanism 408 to aid in the rotational alignment of the upper nozzle tubing. Middle nozzle tubing and lower nozzle tubing of misting array 420 may optionally employ similar push and turn rotational adjustment structure described with respect to upper nozzle tubing of misting array 420. In some embodiments gasket 405 may be replaced or supplemented with other sealing structure. For example, in some embodiments dual bellows type carbon seals may be utilized. For example, a first bellows type carbon seal may be provided around and coupled to the pipe nipple 423A on an abatement chamber side of sealing piece extension 435 adjacent to sealing piece extension 435. A second bellows type carbon seal may be provided coupled to sealing piece extension 435 around the opening provided through the sealing piece extension 435. The first and second bellows type carbon seals may be in sealing engagement when the protrusion 407A is engaging a notch of the restraint mechanism 408 and may be separated from one another when the spring 406 is sufficiently compressed.

Figure 19:
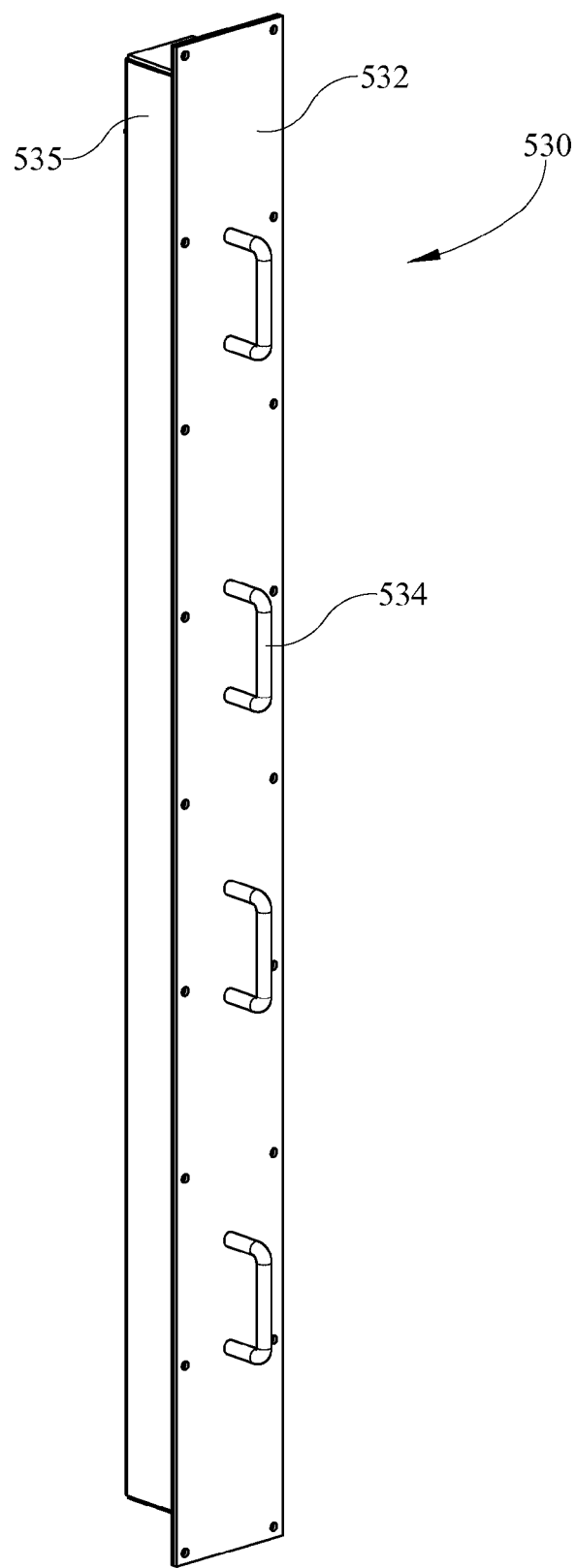
FIG. 19 illustrates a perspective view of a temporary replacement piece.

Referring now to FIG. 19, a perspective view of a temporary replacement piece 530 for use in an abatement system is shown. The temporary replacement piece 530 may be utilized in the first abatement system 100 and may block either of first misting array opening 150 or second misting array opening 250 when respective of first misting array 120 or second misting array 220 is removed therefrom. The temporary replacement piece is structurally similar to sealing pieces 130 and 230 and includes a sealing plate 532, a sealing plate extension 535, and a plurality of handles 534 vertically arranged on an exterior face of the sealing plate 532.

The temporary replacement piece 530 may be utilized when servicing and/or replacing one of the misting arrays 120 and 220. One of the misting arrays 120 or 220 may be removed from the abatement chamber of the abatement system 100, thereby exposing a respective of the misting array openings 150 or 250. One of the misting array openings 150 or 250 may then be covered with the temporary replacement piece 530. The temporary replacement piece 530 will seal the respective array opening 150 or 250. Fasteners may optionally be inserted in fastener apertures through the sealing plate 532 and received in corresponding apertures of the abatement system 100 to securely couple the sealing piece 530 over the misting array opening 150 or 250. While the temporary replacement piece 530 is in place and one of the misting arrays 120 or 220 removed, the abatement system 100 may continue to be operated with only one of the misting arrays 120 or 220 being in operation. Optionally, the amount of fluid input to the remaining of misting arrays 120 or 220 may be increased during such time period. The removed of misting arrays 120 or 220 may optionally be cleaned, repaired, and/or replaced with another misting array. When the cleaned, repaired, or replacement misting array is ready to be reinserted into the abatement chamber the temporary replacement piece 530 may be removed from the opening 150 or 250 to enable reinsertion. Optionally, the abatement chamber 100 may continue to operate during the entire time that one of the misting array openings 150 or 250 is removed or only during portions of such time (e.g., during the time that one of the misting array openings 150 or 250 is removed and temporary replacement piece 530 is in place over a respective of openings 150 or 250).

Figure 23:
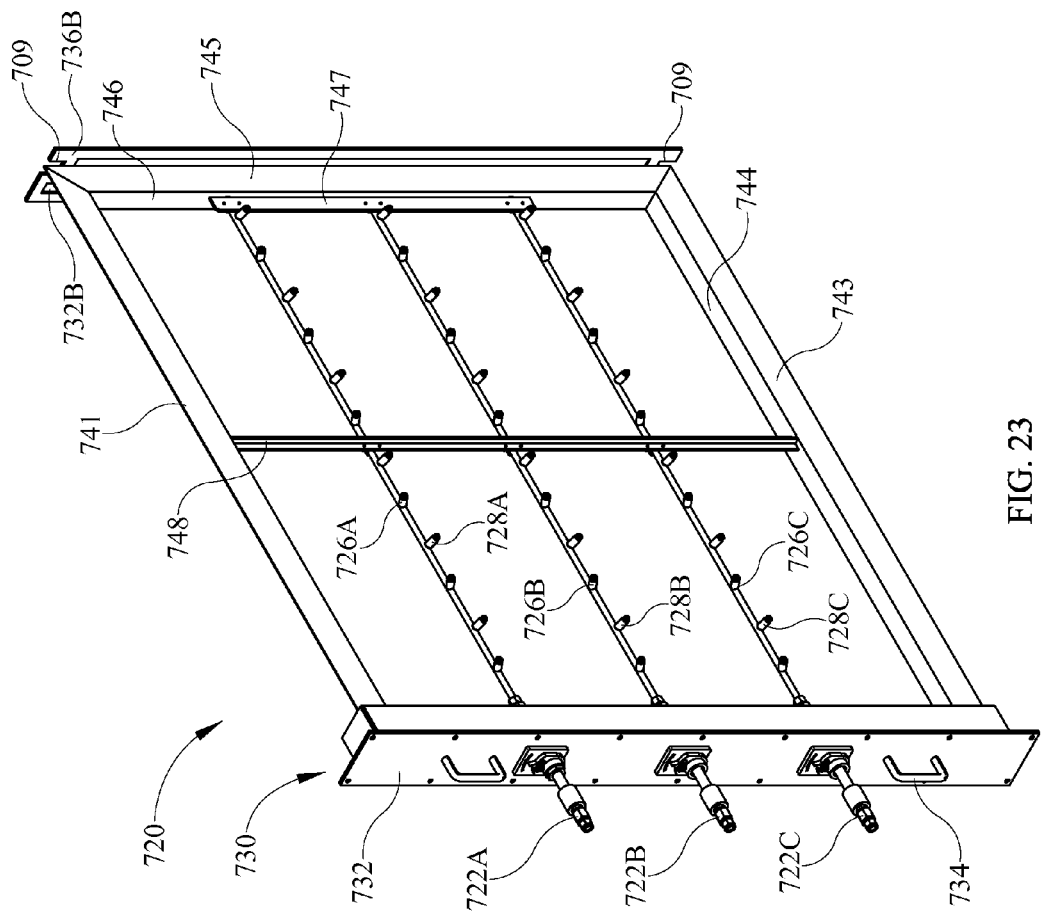
FIG. 23 illustrates a perspective view of a fourth embodiment of a misting array for use in an abatement system.

Referring now to FIG. 23, a fourth embodiment of a misting array 720 for use in an abatement system is depicted and described. The misting array 720 includes a sealing piece 730 having a sealing plate 732 and a sealing plate extension 735. Two handles 734 are provided on an exterior face of the sealing plate 732. A frame structure is coupled to and extends from the sealing piece 730 and includes an upper frame structure member 741 having an upper frame structure rim portion (not shown), a side frame structure member 745 having a side frame structure rim portion 746, and a lower frame structure member 743 having a lower frame structure rim portion 744. The frame structure also includes a middle support bar 748 and a side support bar 747.

An upper nozzle tubing of the misting array 720 has an upper liquid source coupling 722A on the exterior side of the sealing piece 730, extends through the sealing piece 730, and has a plurality of upwardly disposed nozzles 726A and downwardly disposed nozzles 728A coupled thereto. Similarly, a middle nozzle tubing has a middle liquid source coupling 722B on the exterior side of the sealing piece 730, extends through the sealing piece 730, and has a plurality of upwardly disposed nozzles 726B and downwardly disposed nozzles 728B coupled thereto. Similarly, a lower nozzle tubing of the misting array 720 has a lower liquid source coupling 722C on the exterior of the sealing piece 730, extends through the sealing piece 730, and has a plurality of upwardly disposed nozzles 726C and downwardly disposed nozzles 728C coupled thereto.

A temporary replacement piece 732B is coupled to the side frame structure member 745 of the frame structure of the misting array 720. The temporary replacement piece 732B is substantially similar to sealing plate 732 and includes a gasket 736B on an engagement surface thereof. The temporary replacement piece 732B may be coupled to the frame structure member 745 after portions of the misting array 720 have been inserted into an opening of an abatement chamber. When the misting array 720 is fully inserted in the abatement chamber the temporary replacement piece 732B may be proximal a wall of the abatement chamber that is opposite the opening through the abatement chamber. When the misting array 720 is removed from the abatement chamber the temporary replacement piece 732B will sealingly engage the opening through the abatement chamber from inside the abatement chamber. The misting array 720 may be repaired or replaced while the misting array 720 is removed and the temporary replacement piece 732B is covering the opening through the abatement chamber. The temporary replacement piece 732B may optionally include one or more apertures that receive fasteners inserted through apertures through the abatement system 100. The temporary replacement piece 732B may also optionally include one or more notches 709 at the top short end thereof and/or the bottom short end thereof. The one or more notches 709 may be sized to interface with track structure within the abatement chamber to thereby enable the temporary replacement piece 732B to move without substantial interference from the track structure.

Figure 20:
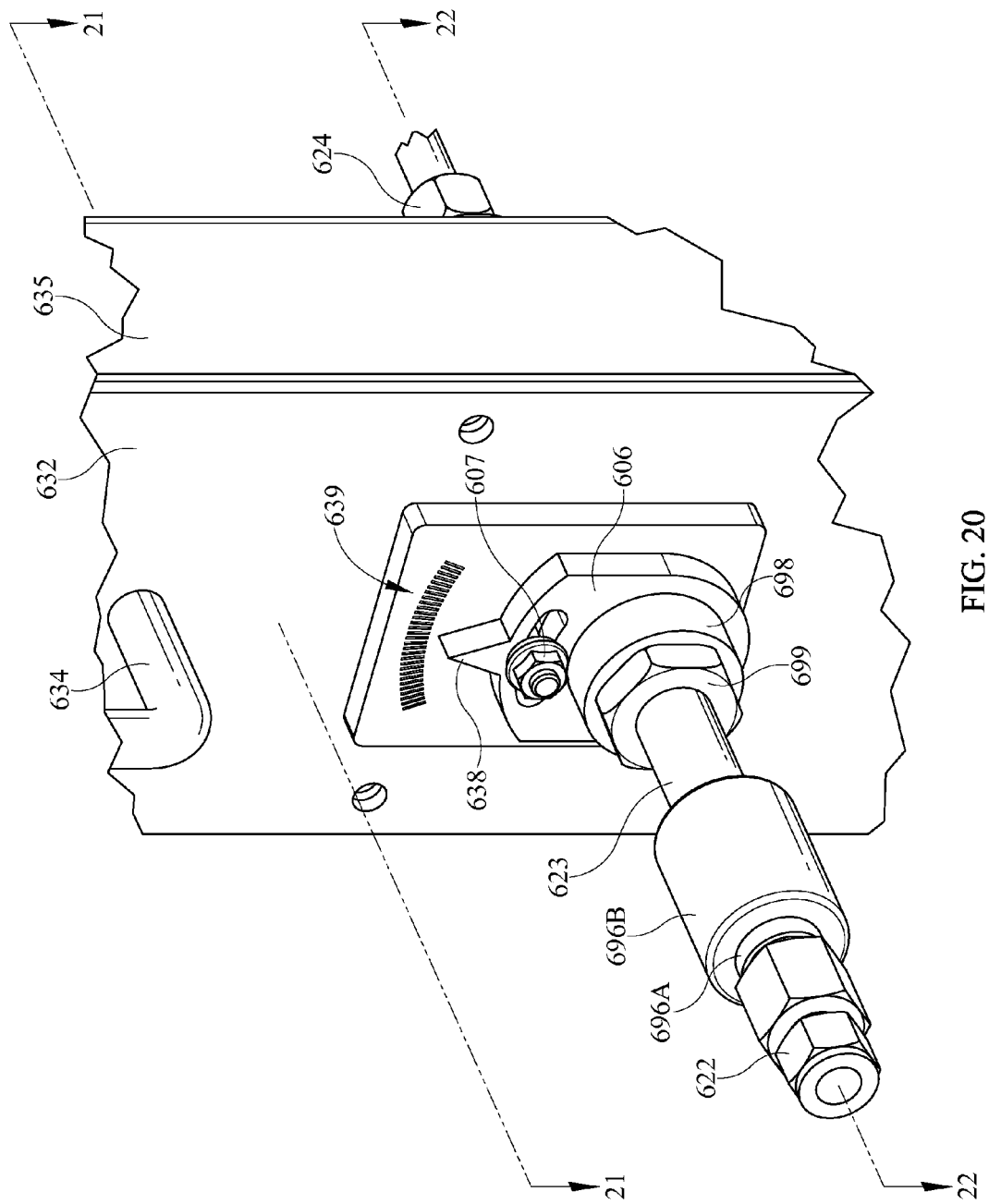
FIG. 20 illustrates a perspective view of a portion of a fifth embodiment of a misting array for use in an abatement system.
Figure 21:
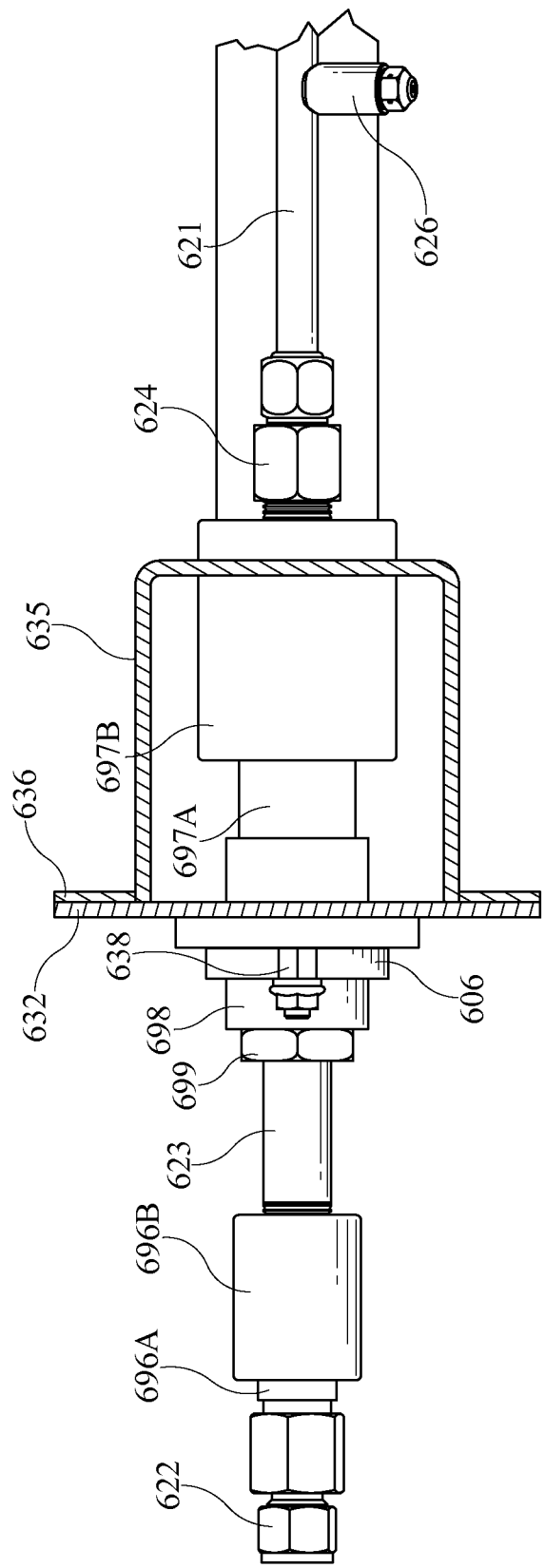
FIG. 21 illustrates a top section view of the fifth embodiment of the misting array of FIG. 20 taken along the section line 21-21 of FIG. 20.
Figure 22:
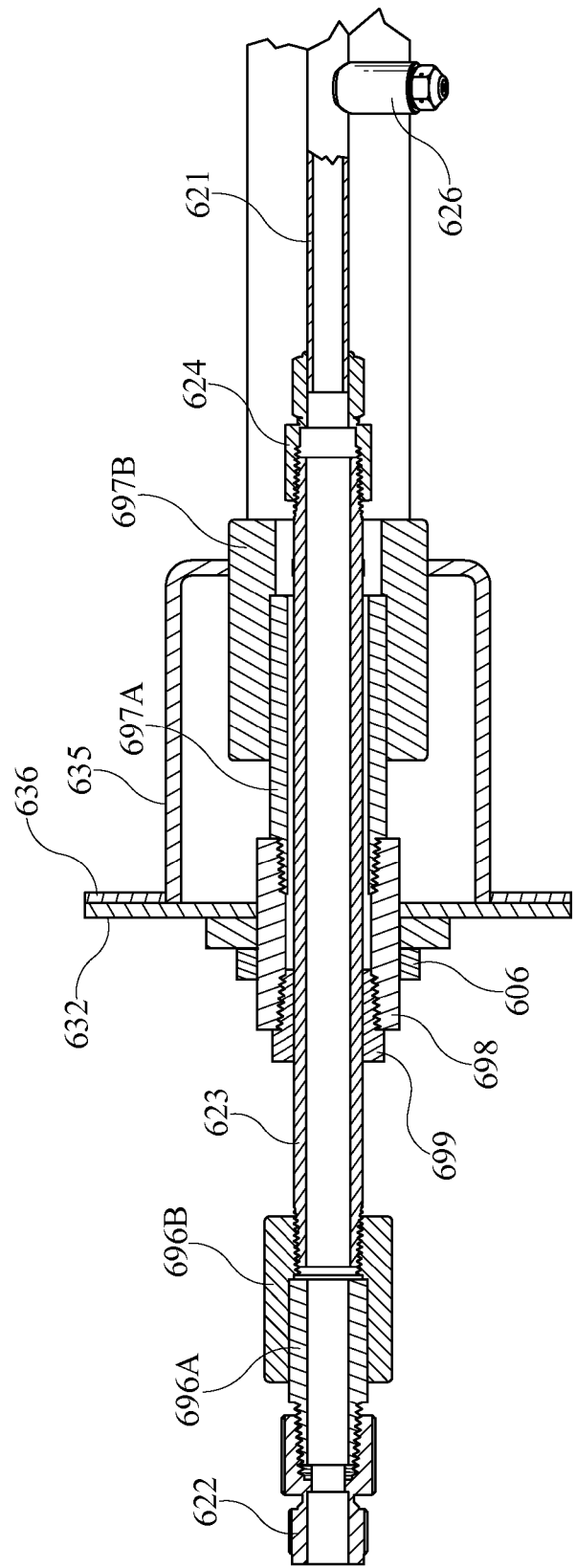
FIG. 22 illustrates a top section view of the fifth embodiment of the misting array of FIG. 20 taken along the section line 22-22 of FIG. 20.

Referring now to FIG. 20 through FIG. 22, aspects of a fifth embodiment of a misting array for use in an abatement system are depicted and described. Portions of a sealing piece 630 of the misting array are illustrated and include a sealing plate 632 having a handle 634 thereon. A sealing piece extension 635 extends rearwardly from the sealing plate 632. Portions of a nozzle tubing of the misting array are also illustrated. The nozzle tubing includes a first inline swivel coupled to the liquid source coupling 622. The first inline swivel includes a first portion 696A and a second portion 696B that are rotationally adjustable and sealed with respect to one another. The first portion 696A includes a male connection threadedly and sealingly coupled to the liquid source coupling 622. The second portion 696B includes a female connection threadedly and sealingly coupled to a pipe nipple 623. The pipe nipple 623 extends through a journal 698 that is extending through an opening in the sealing plate 632. The pipe nipple 623 is sealingly coupled to the journal 698 via a compression nut 699 threadedly received by the journal 698. The journal 698 is sealingly coupled to a first portion 697A of a second inline swivel that is rotationally adjustable with respect to a second portion 697B of the second inline swivel. The second portion 697B of the second inline swivel extends through an opening in the sealing piece extension 635 and is seal welded to the opening through sealing piece extension 635. The pipe nipple 623 extends through the second inline swivel and is coupled to a female tube fitting 624 which, in turn, is coupled to a nozzle section 621. An upwardly disposed nozzle 626 is visible in FIG. 22 extending from the nozzle section 621.

The journal 698 is selectively rotatable within the opening through the sealing plate 632. The journal 698 is coupled to an adjustment plate 606 having an aperture therethrough. The aperture through the adjustment plate 606 has a screw extending therethrough. The screw is coupled to the sealing plate 632 and removably receives an adjustment lock down nut 607. When the adjustment lock down nut 607 is sufficiently tightened, thereby compressing adjustment plate 606, the journal 698 is restrained from rotating within the opening through the sealing plate 632. However, when the adjustment lock down nut 607 is loosened, the journal 698 may rotate freely within the opening through the sealing plate 632. Accordingly, loosening the lock down nut 607 allows the second portion 696B of the first inline swivel, the pipe nipple 623, the compression nut 699, the journal 698, the first portion 697A of the second inline swivel, the female tube fitting 624, and the nozzle section 624 to all rotate in unison. The aforementioned elements will all be rotated in unison since they are all coupled to one another. Moreover, the coupling between the aforementioned elements, along with the seal welding between the second portion 697B of the second inline swivel and the sealing piece extension 635, ensures a seal may be maintained between an abatement chamber and an external environment. The embodiment of FIG. 20 through FIG. 22 enables rotation of the nozzle tubing from exteriorly of an abatement system while maintaining a seal between an abatement chamber and the external environment.

An indicator 638 extends from adjustment plate 606 and is proximal fiducial markings 639 provided on a plate interposed between adjustment plate 606 and sealing plate 632. The positioning of the indicator 638 with respect to the fiducial markings 639 is indicative of the rotational orientation of the nozzle tubing. In some embodiments the inline swivels may be Series 006 Inline Swivels with Bushings available from Rotary Systems, Inc. (Minneapolis, Minn.).

Referring now to FIG. 24 through FIG. 32, several aspects of an apparatus and method related to a field erectable abatement system skeleton are described in detail. As described in additional detail herein, the abatement system skeleton may be covered with an interior skin and optionally an exterior skin to thereby from an abatement system shell. Various components may then be coupled to and/or removably inserted into the abatement system shell to thereby form an abatement system. The modular field erectable abatement system described herein may be manufactured at one or more manufacturing locations and shipped to an erection location where it may be modularly assembled into an abatement system skeleton, an abatement system shell, and an abatement system.

Figure 24:
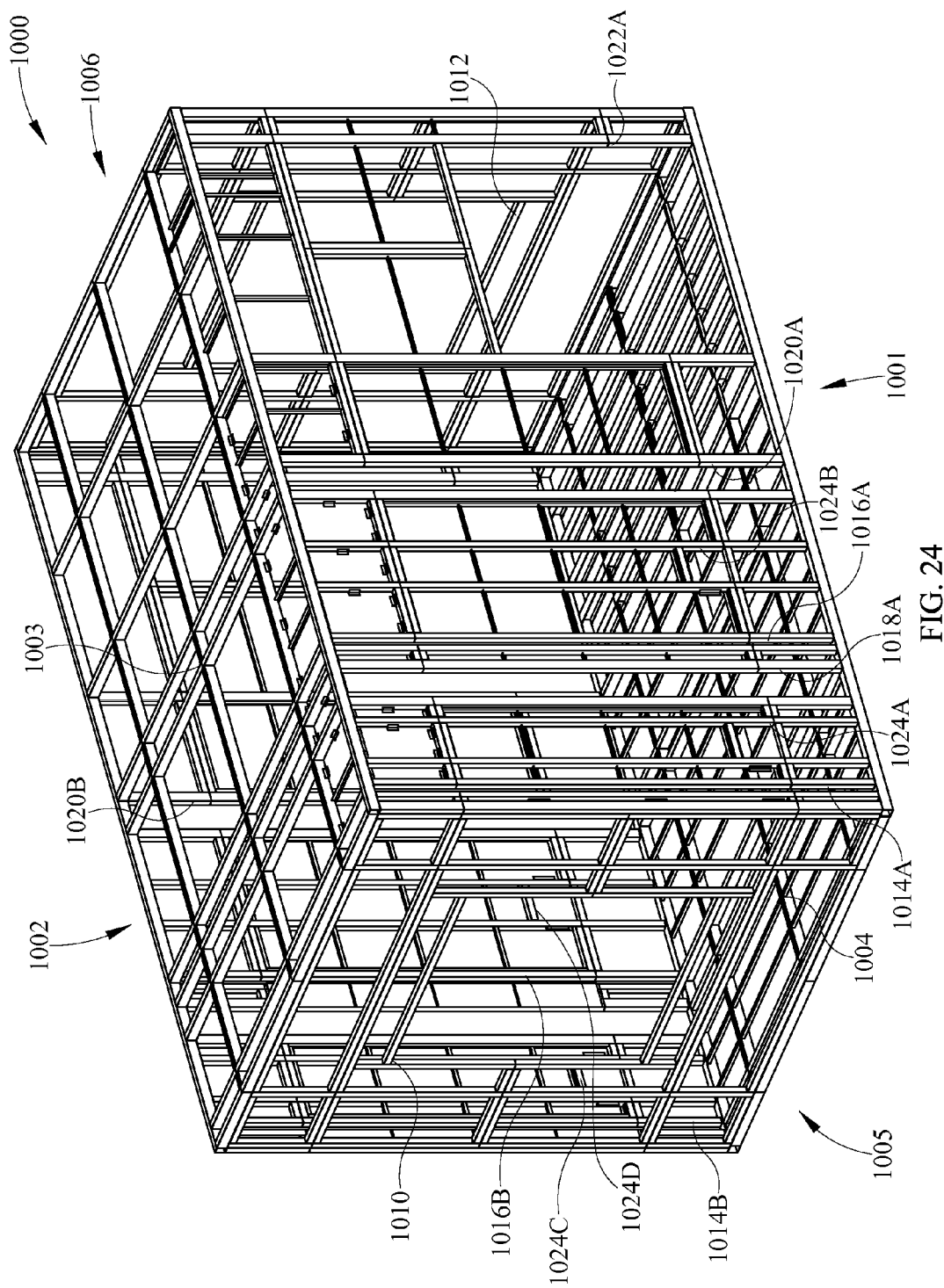
FIG. 24 illustrates an upper first side and intake side perspective view of a first embodiment of a field erectable abatement system skeleton.
Figure 25:
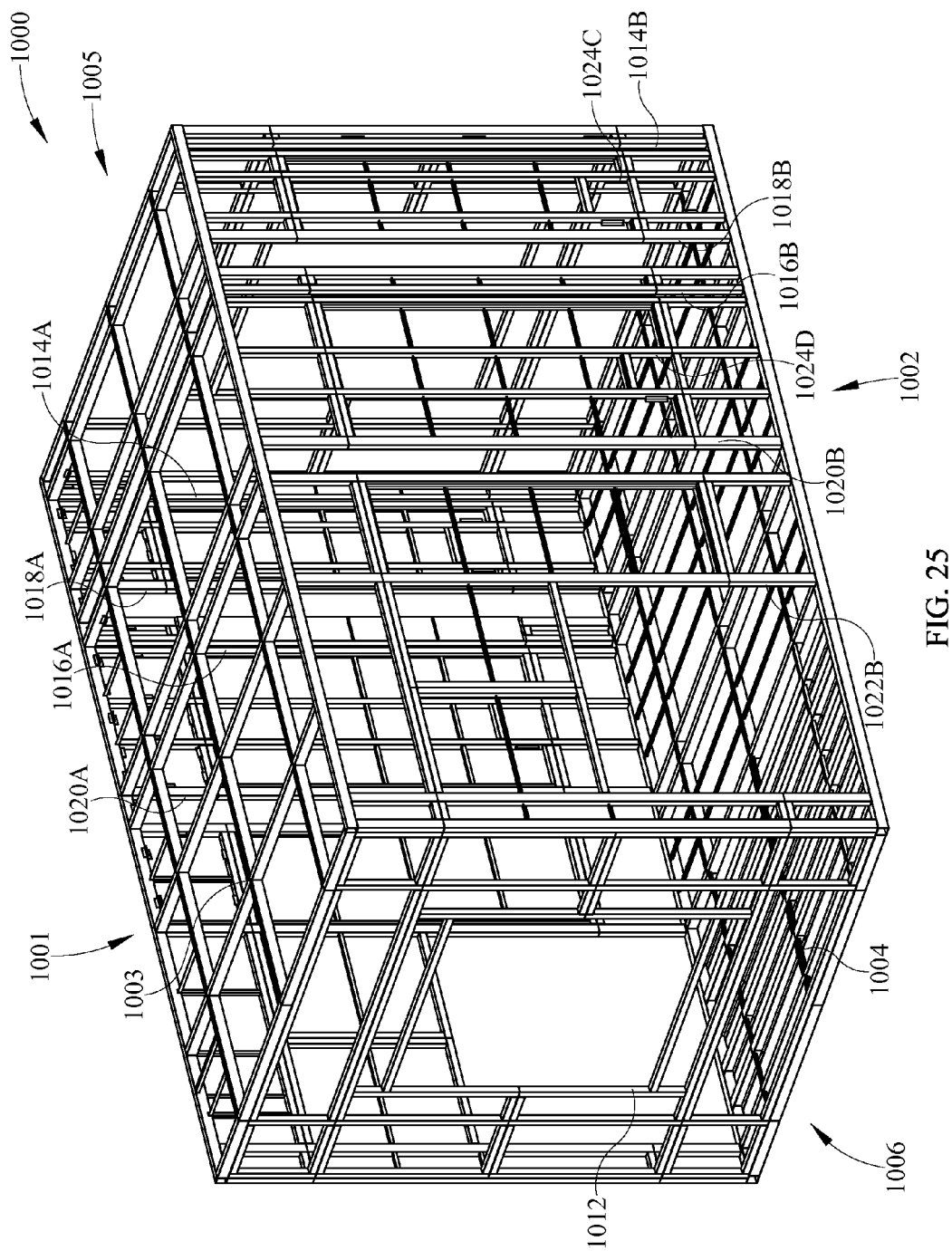
FIG. 25 illustrates an upper second side and exhaust side perspective view of the first embodiment of the field erectable abatement system skeleton.

Referring initially to FIG. 24 and FIG. 25, a first embodiment of a field erected abatement system skeleton 1000 assembled from a modular system is illustrated. The field erected abatement system skeleton 1000 is generally rectangular and includes a top 1003 and opposed bottom 1004, a first side 1001 and opposed second side 1002, and a first end 1005 and opposed second end 1006. The first end 1005 includes an air inlet rough opening 1010 that may be finished to define an air inlet for an abatement system. The second end 1006 includes an air outlet rough opening 1012 that may be finished to define an air outlet for an abatement system.

The first side 1001 includes a first side first misting array opening 1014A proximal the first end 1005. The first side first misting array opening 1014A is generally vertically extending between two opposed series of support structures and extends from proximal the top 1003 to proximal the bottom 1004. A first side first condensing coil opening 1018A is provided in the first side 1001 in a downstream direction from the first misting array opening 1014A. A first manway 1024A is interposed between the first side first misting array opening 1014A and the first side first condensing coil opening 1018A. The first manway 1024A may be finished with a hatch or other sealable and selectively movable barrier thereover to enable selective access to a portion of the abatement chamber when the abatement system skeleton 1000 is supplemented with additional components to form an abatement system.

The first side 1001 also includes a first side second misting array opening 1016A downstream from the first side first condensing coil opening 1018A. The first side second misting array opening 1016A is generally vertically extending between two opposed series of support structures and extends from proximal the top 1003 to proximal the bottom 1004. A first side second condensing coil opening 1020A is provided in the first side 1001 in a downstream direction from the first side second misting array opening 1016A. A second manway 1024B is interposed between the first side second misting array opening 1016A and the first side second condensing coil opening 1020A. The second manway 1024B may also be finished with a selectively movable barrier thereover to enable selective access to a portion of the abatement chamber when the abatement system skeleton 1000 is supplemented with additional components to form an abatement system.

The second side 1002 includes a second side first misting array opening 1014B and a second side first condensing coil opening 1018B. The second side first misting array opening 1014B is generally opposite the first side first misting array opening 1014A and the second side first condensing coil opening 1018B is generally opposite the first side first condensing coil opening 1018A. A third manway 1024C is interposed between the second side first misting array opening 1014B and the second side first condensing coil opening 1018B. The third manway 1024C may also be finished with a selectively movable barrier thereover to enable selective access to a portion of the abatement chamber when the abatement system skeleton 1000 is supplemented with additional components to form an abatement system. The second side 1002 also includes a second side second misting array opening 1016B and a second side second condensing coil opening 1020B. The second side second misting array opening 1016B is generally opposite the first side second misting array opening 1016A and the second side second condensing coil opening 1020B is generally opposite the first side second condensing coil opening 1020A. A fourth manway 1024D is interposed between the second side second misting array opening 1016B and the second side second condensing coil opening 1020B. The fourth manway 1024D may also be finished with a selectively movable barrier thereover to enable selective access to the abatement chamber when the abatement system skeleton 1000 is supplemented with additional components to form an abatement system.

In some embodiments, when the field erected abatement system skeleton 1000 is supplemented with additional components to form an abatement system, a first misting array assembly may be inserted through the first side first misting array opening 1014A and a second misting array assembly may be inserted through the second side first misting array opening 1014B. When inserted, the first misting array assembly and second misting array assembly may collectively substantially span the abatement chamber between the two first misting array openings 1014A and 1014B and/or may produce a misting output that substantially covers the abatement system chamber between the two first misting array openings 1014A and 1014B. Similarly, a third misting array assembly may be inserted through the first side second misting array opening 1016A and a fourth misting array assembly may be inserted through the second side second misting array opening 1016B. When inserted, the third misting array assembly and the fourth misting array assembly may collectively substantially span that abatement chamber between the two second misting array openings 1016A and 1016B and/or may produce a misting output that substantially covers the abatement system chamber between the two second misting array openings 1016A and 1016B. In some alternative embodiments more or fewer misting array openings may be provided and/or misting array openings may only be provided on a single of first side 1001 and second side 1002.

Also, in some embodiments, when the field erected abatement system skeleton 1000 is supplemented with additional components to form an abatement system, a first condensing coil assembly may be inserted through the first side first condensing coil opening 1018A and a second condensing coil assembly may be inserted through the second side first condensing coil opening 1018B. When inserted, the first condensing coil assembly and the second condensing coil assembly may substantially cover the abatement system chamber between the two first condensing coil openings 1018A and 1018B. Similarly, a third condensing coil assembly may be inserted through the first side second condensing coil opening 1020A and a fourth condensing coil assembly may be inserted through the second side second condensing coil opening 1020B. When inserted, the third condensing coil assembly and the fourth condensing coil assembly may substantially cover the abatement system chamber between the two second condensing coil openings 1020A and 1020B. In some embodiments more or fewer condensing coil openings may be provided and/or condensing coil openings may only be provided through a single of the first side 1001 and second side 1002.

A first fan opening 1022A is provided in the first side 1001 and a second fan opening 1022B is provided in the second side 1002. Each of the fan openings 1022A and 1022B allow for a fan and optionally a fan motor to be inserted therethrough. Only one of the fan openings 1022A and 1022B may be provided in some embodiments. In some embodiments the fan openings 1022A and 1022B may be finished with a selectively movable barrier thereover to enable selective access to a fan chamber portion of the interior of the abatement system when the abatement system skeleton 1000 is supplemented with additional components to form an abatement system. In other embodiments the fan openings 1022A and/or 1022B may be sealed with a non-movable barrier thereover after insertion of the fan. In some embodiments fan openings 1022A and 1022B may both be omitted. In such embodiments the abatement system skeleton 1000 may be configured to not house a fan therein.

In some embodiments the first side 1001, second side 1002, top 1003, and bottom 1004 may be approximately twenty-four feet by thirty-six feet and the first end 1005 and the second end 1006 may be approximately twenty-four feet by twenty four-feet. In some embodiments the misting array openings 1014A, 1014B, 1016A, and 1016B may have a width of approximately four and three-eighths inches. In some embodiments the condensing coil openings 1018A, 1018B, 1020A, and 1020B may have a width of approximately nineteen inches. In some embodiments the fan openings 1022A and 1022B may each be approximately twelve feet by twelve feet. In some embodiments the manways 1024A-D may each be approximately two feet by two feet.

Figure 26:
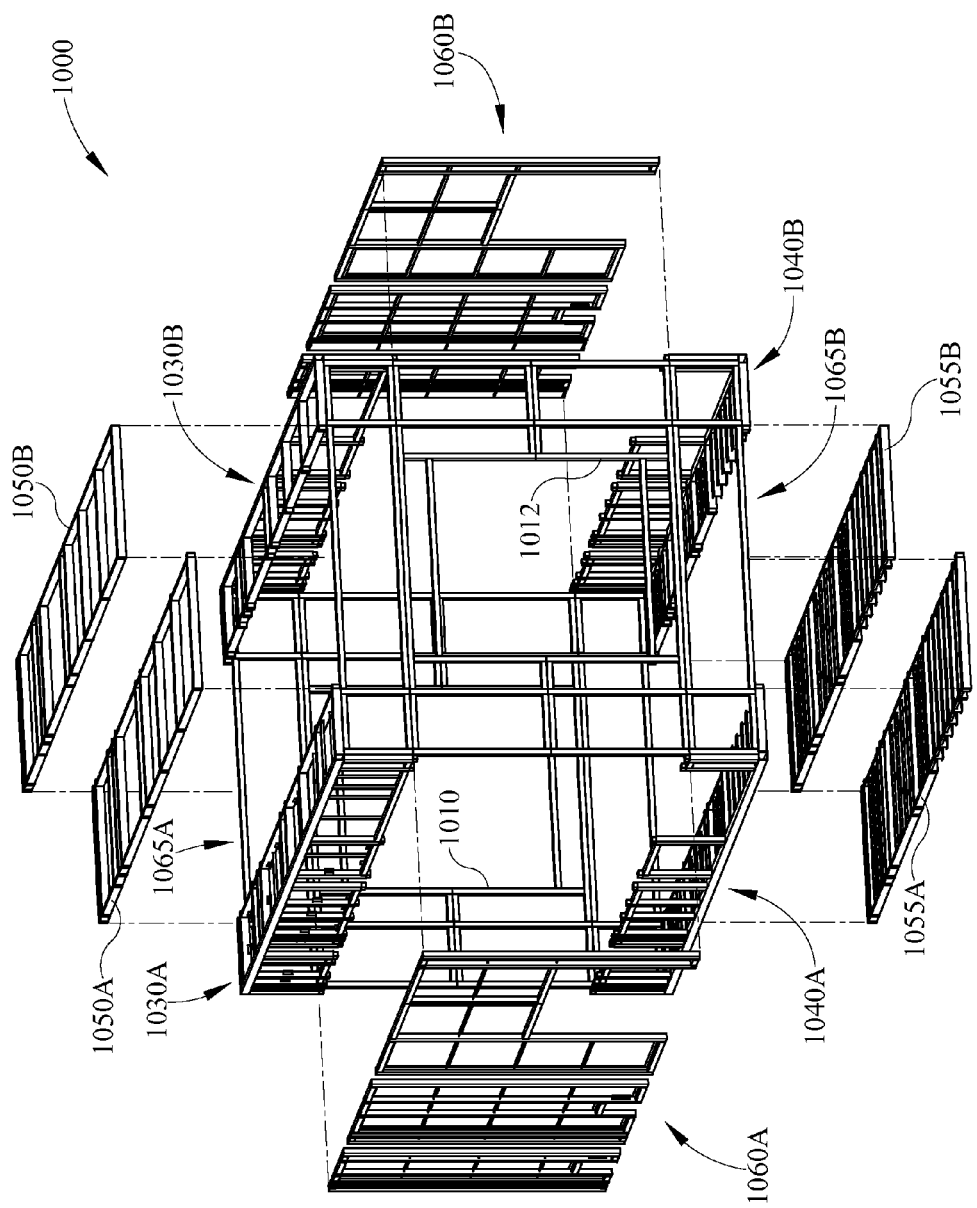
FIG. 26 illustrates an upper first side and exhaust side perspective view of the first embodiment of the field erectable abatement system skeleton; a first top segment, a second top segment, a plurality of first side segments, a plurality of second side segments, a first bottom segment, and a second bottom segment are shown exploded away.

Referring to FIG. 26, the field erected abatement system skeleton 1000 is shown with several modular segments exploded away. In particular, a first top segment 1050A, a second top segment 1050B, a plurality of first side segments 1060A, a plurality of second side segments 1060B, a first bottom segment 1055A, and a second bottom segment 1055B are shown exploded away. The first top segment 1050A and the second top segment 1050B each are a unitary piece and extend substantially the entire length of the abatement system skeleton 1000. The first top segment 1050A and second top segment 1050B each have a plurality of interconnected support structures. The first bottom segment 1055A and the second bottom segment 1055B are each also a unitary piece, extend substantially the entire length of the abatement system skeleton 100, and each have a plurality of interconnected support structures.

The first side segments 1060A and the second side segments 1060B each comprise a plurality of smaller segments that collectively extend substantially the entire length of the abatement system skeleton 1000. The first side segments 1060A and the second side segments 1060B each have a plurality of interconnected support structures. Some of the interconnected support structures of the first side segments 1060A define portions of the first side first misting array opening 1014A, the first side second misting array opening 1016A, the first side first condensing coil opening 1018A, the first side second condensing coil opening 1020a, the first manway 1024A, the second manway 1024B, and the first fan opening 1022A when the abatement system skeleton is assembled. Similarly, some of the interconnected support structures of the second side segments 1060B define portions of the second side first misting array opening 1014B, the second side second misting array opening 1016B, the second side first condensing coil opening 1018B, the second side second condensing coil opening 1020B, the third manway 1024C, the fourth manway 1024D, and the second fan opening 1022B when the abatement system skeleton is assembled.

Figure 30:
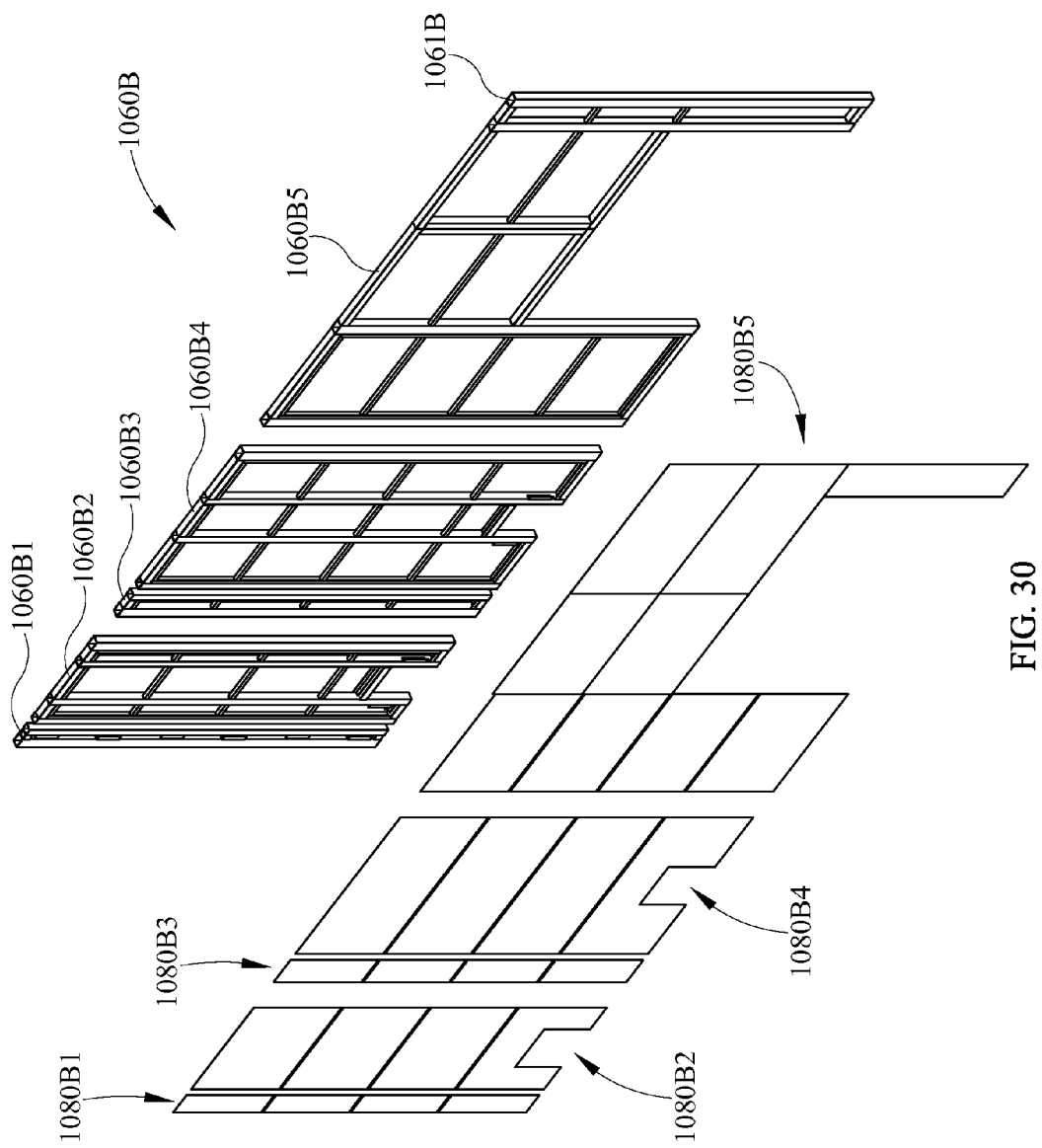
FIG. 30 illustrates the plurality of second side segments of the first embodiment of the field erectable abatement system skeleton; a plurality of second side interior skin segments are also illustrated.

Referring briefly to FIG. 30, the second side segments 1060B are shown in a closer view. The second side segments 1060B include five separate second side segment pieces: 1060B1, 1060B2, 1060B3, 1060B4, and 1060B5. In the depicted embodiment the first side segments 1060A share a substantially common configuration with the second side segments 1060B. When the abatement system skeleton 1000 is assembled, the opening between pieces 1060B1 and 1060B2 define a portion of the second side first misting array opening 1014B, the opening between pieces 1060B2 and 1060B3 define a portion of the second side first condensing coil opening 1018B, the opening between pieces 1060B3 and 1060B4 define a portion of the second side second misting array opening 1016B, and the opening between pieces 1060B4 and 1060B5 define a portion of the second side second condensing coil opening 1020B.

Figure 27:
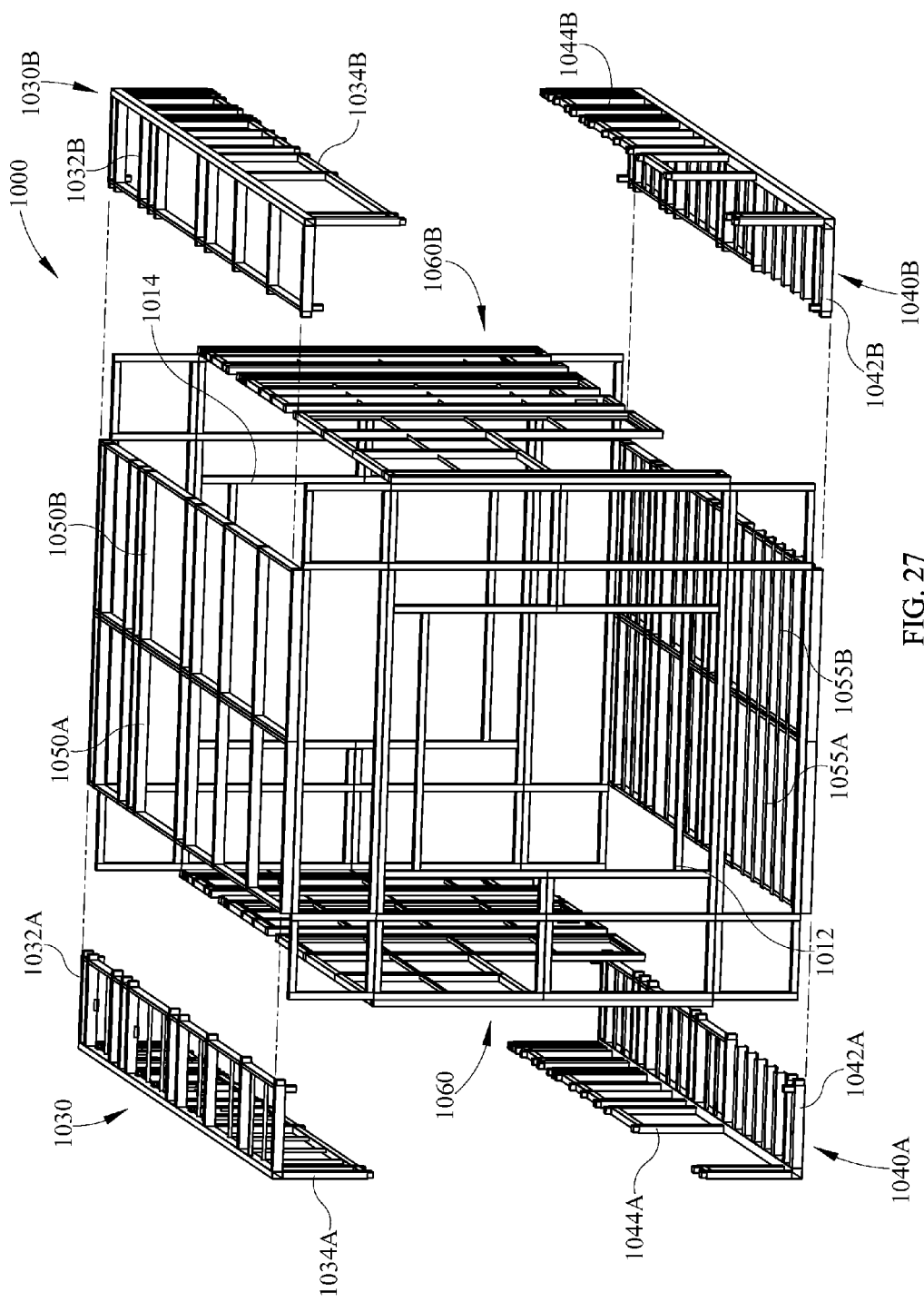
FIG. 27 illustrates an upper second side and exhaust side perspective view of the first embodiment of the field erectable abatement system skeleton; a first corner segment, a second corner segment, a third corner segment, and a fourth corner segment are shown exploded away.

Referring to FIG. 27, the field erected abatement system skeleton 1000 is shown with several modular segments exploded away. In particular, a first corner segment 1030A, a second corner segment 1040A, a third corner segment 1040B, and a fourth corner segment 1030B are shown exploded away. The first corner segment 1030A has a top portion 1032A and a first side portion 1034A. The second corner segment 1040A has a bottom portion 1042A and a first side portion 1044A. The third corner segment 1040B has a bottom portion 1042B and a second side portion 1044B. The fourth corner segment 1030B has a top portion 1032B and a second side portion 1034B. In the depicted embodiment the first corner segment 1030A and the fourth corner segment 1030B share a substantially similar configuration and the second corner segment 1040A and the third corner segment 1040B share a substantially similar configuration.

Some of the interconnected support structures of the first side portion 1044A of the second corner segment 1040A define portions of the first side first misting array opening 1014A, the first side second misting array opening 1016A, the first side first condensing coil opening 1018A, the first side second condensing coil opening 1020A, the first manway 1024A, the second manway 1024B, and the first fan opening 1022A when the abatement system skeleton 1000 is assembled. Similarly, some of the interconnected support structures of the second side portion 1044B of the third corner segment 1040B define portions of the second side first misting array opening 1014B, the second side second misting array opening 1016B, the second side first condensing coil opening 1018B, the second side second condensing coil opening 1020A, the third manway 1024C, the fourth manway 1024D, and the second fan opening 1022B when the abatement system skeleton is assembled.

Figure 31:
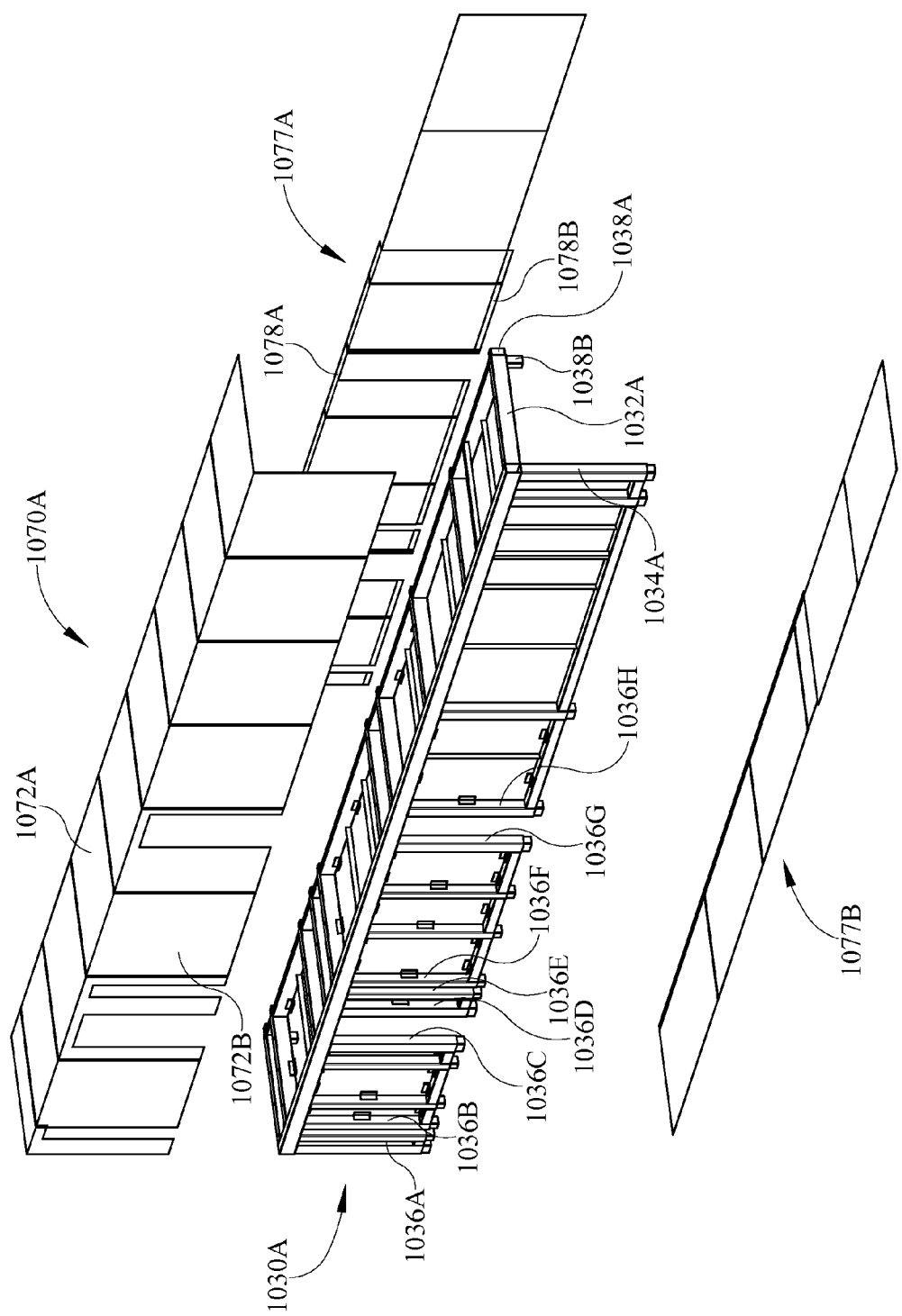
FIG. 31 illustrates the first corner segment of the first embodiment of the field erectable abatement system skeleton; a first corner interior top skin segment, a first corner interior side skin segment, and a first corner exterior skin segment are also illustrated.

Referring briefly to FIG. 31, the first corner segment 1030A is shown in a closer view. A first support structure 1036A and a second support structure 1036B on the first side portion 1034A define a portion of the first side first misting array opening 1014A. A third support structure 1036C and a fourth support structure 1036D define a portion of the first side first condensing coil opening 1018A. A fifth support structure 1036E and sixth support structure 1036F define a portion of the first side second misting array opening 1016A. A seventh support structure 1036G and eighth support structure 1036H define a portion of the first side second condensing coil opening 1020A.

Figure 28:
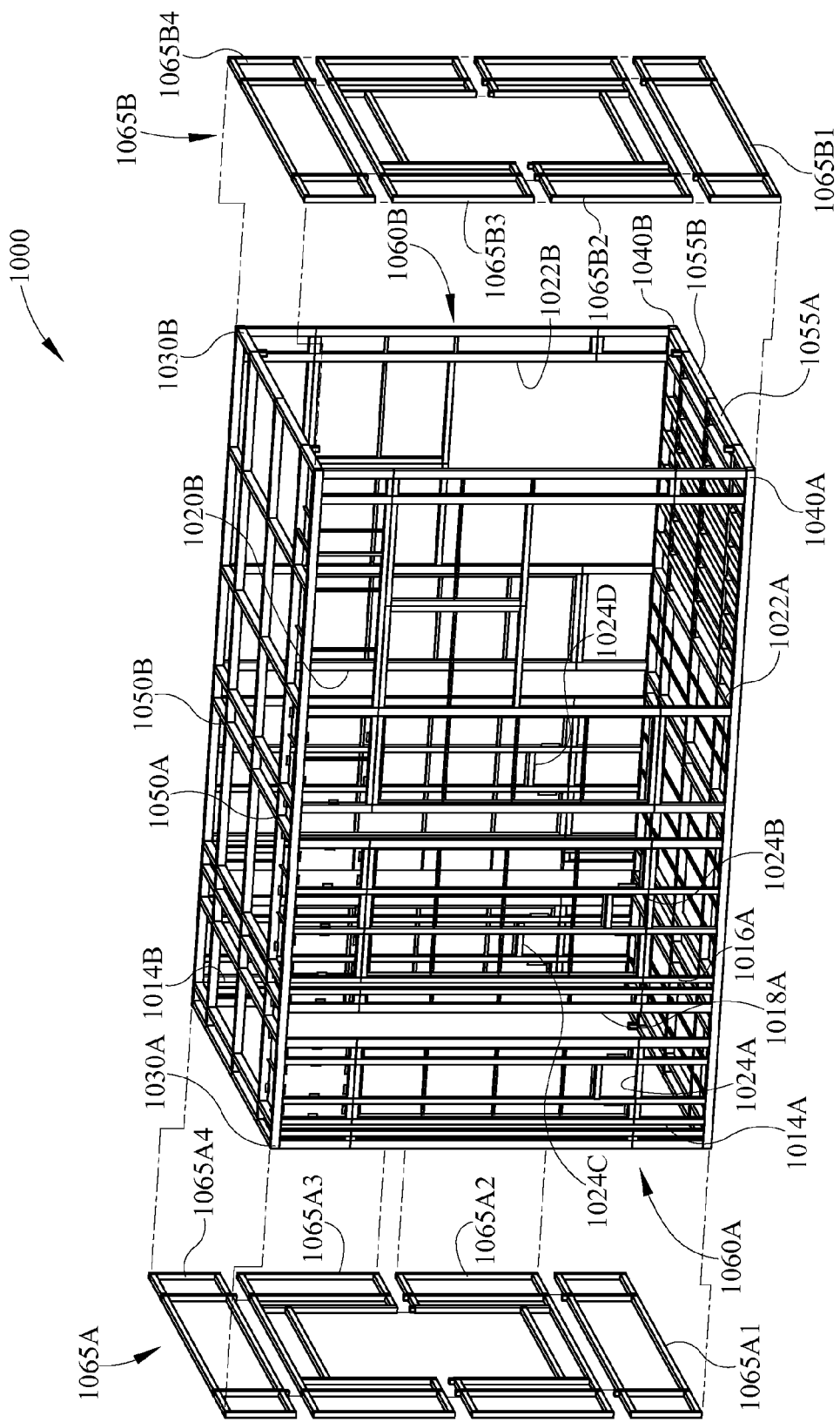
FIG. 28 illustrates an upper first side and exhaust side perspective view of the first embodiment of the field erectable abatement system skeleton; a plurality of first end segments and a plurality of second end segments are shown exploded away.

Referring to FIG. 28, the field erected abatement system skeleton 1000 is shown with several modular segments exploded away. In particular, first end segments 1065A and second end segments 1065B are exploded away. The first end segments 1065A include a lower first end segment 1065A1, a mid-lower first end segment 1065A2, a mid-upper first end segment 1065A3, and an upper first end segment 1065A4. The mid-lower first end segment 1065A2 and the mid-upper first end segment 1065A3 form a portion of the air inlet rough opening 1010 when the abatement system skeleton 1000 is assembled. The second end segments 1065B include a lower second end segment 1065B1, a mid-lower second end segment 1065B2, a mid-upper second end segment 1065B3, and an upper second end segment 1065B4. The mid-lower second end segment 1065B2 and the mid-upper second end segment 1065B3 form a portion of the air outlet rough opening 1012 when the abatement system skeleton 1000 is assembled.

Figure 29:
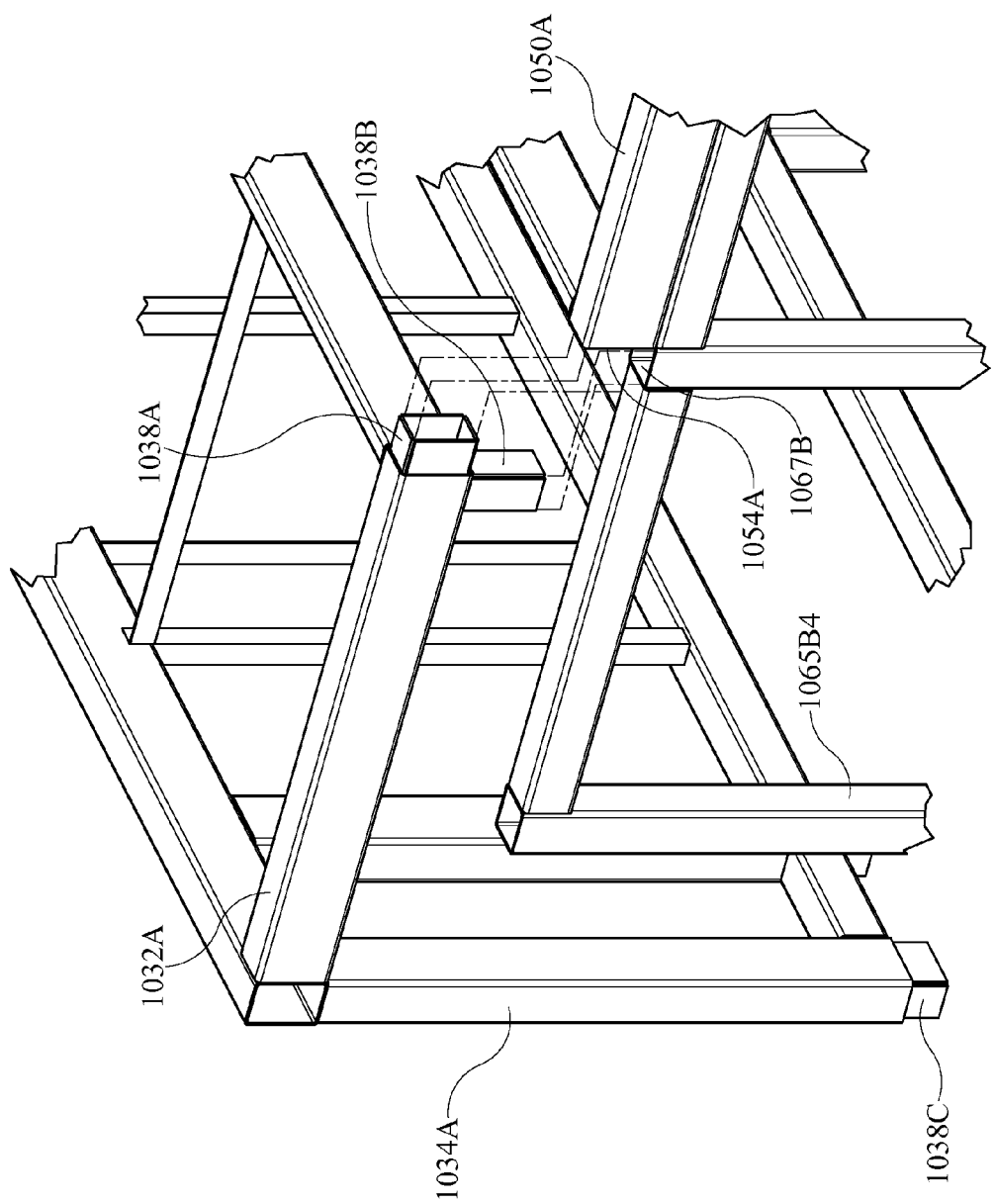
FIG. 29 illustrates a close up view of the first corner segment, the first top segment, and an upper first end segment; the first corner segment is shown exploded away.

Referring to FIG. 29, a close up view of portions of the first corner segment 1030A, the first top segment 1050A, and the upper first end segment 1065B4 is illustrated. The first corner segment 1030A is shown exploded away and three male connection members 1038A, 1038B, and 1038C of the first corner segment 1030A are visible. The male connection member 1038A is telescopically receivable in a female connection receptacle 1054A of the first top segment 1050A. The male connection member 1038B is telescopically receivable in a female connection receptacle 1067B of the upper first end segment 1065B4 and the male connection member 1038C is telescopically receivable in a female connection receptacle 1061B (visible in FIG. 30) of the second side piece 1060B5.

Each of the various modular segments depicted in FIG. 24 through FIG. 32 is provided with at least one of a male connection member and/or at least one of a female connection receptacle. The at least one male member and/or female receptacle is telescopically engageable with a corresponding female member or male member that is provided on a modular segment that will be adjacent thereto when the abatement system skeleton 1000 is assembled. For example, the second bottom segment 1055B has a plurality of female connection receptacles that telescopically receive corresponding male connection members extending from the first bottom segment 1055A. The second bottom segment 1055B also has a plurality of female connection receptacles that telescopically receive corresponding male connection members extending from the third corner segment 1040B. Also, for example, the second side segments 1060B include a plurality of female connection receptacles that receive corresponding male connection members extending from the first corner segment 1030A and the second corner segment 1040A.

After the connection members of adjacent modular segments have been mated with one another, the modular segments may optionally be further coupled to one another. For example, in some embodiments the modular segments may be additionally welded and/or gusset plated to one another. In other embodiments, connection members having alternative configurations may additionally or alternatively be provided. In yet other embodiments no connection members may be provided, but the various modular segments may still be configured for connection to adjacent modular segments via, for example, welding and/or use of a gusset plate. In some embodiments the support structures of the various modular segments may comprise carbon steel.

Although a modular system field erectable into an abatement system skeleton is described in detail herein, one of ordinary skill in the art, having had the benefit of the present disclosure will recognize that variations of the modular system may be utilized in other embodiments. For example, in some embodiments one or more misting array openings and/or condensing coil openings may be provided through the top of the abatement system skeleton for insertion and/or removal of one or more misting arrays from the top of the abatement system skeleton. In such embodiments side misting array openings and/or side condensing coil openings may optionally be omitted. Also, for example, in some embodiments a field erected abatement system skeleton may be provided without a fan chamber. In such embodiments one or more fan, such as, for example, an inducement fan and/or a forced draft fan may be provided exteriorly of the abatement system skeleton when the abatement skeleton is supplemented with additional components to thereby form an abatement system. Also, for example, in some embodiments space and/or one or more openings may provided within the abatement system skeleton to enable insertion of one or more reheat coils and/or heat exchangers. When the abatement system skeleton is supplemented with additional items to create an abatement system the reheat coils and/or heat exchangers may be placed in the airflow through the abatement system. Optionally, the heat exchangers may be placed in the airflow downstream of the last condensing coil to reheat the airflow to sufficient buoyancy prior to releasing the airflow into the atmosphere. Also, for example, in some embodiments one or more of the support structures in a given modular skeleton segment may be provided at a non-perpendicular angle with respect to one or more other of the support structures. Also, for example, in some embodiments one or more of the modular skeleton segments may comprise one or more non-planar sections. For example, in some embodiments the corner segments may be rounded. Also, for example, in some embodiments more or fewer modular skeleton segments may be provided. Also, for example, as will be described in additional detail herein, in some embodiments one or more modular skeleton segments may be provided with interior and/or exterior skin coupled thereto to thereby form a modular shell segment.

Referring to FIG. 30, the second side segments 1060B described herein are shown with a plurality of second side interior skin segments 1080B1, 1080B2, 1080B3, 1080B4, and 1080B5. The second side interior skin segments 1080B1, 1080B2, 1080B3, 1080B4, and 1080B5 generally correspond to respective of second side pieces 1060B1, 1060B2, 1060B3, 1060B4, and 1060B5. The second side interior skin segments 1080B1, 1080B2, 1080B3, 1080B4, and 1080B5 may be coupled to respective of second side pieces 1060B1, 1060B2, 1060B3, 1060B4, and 1060B5. The second side interior skin segments 1080B2, 1080B4, and 1080B5 contain openings therein that generally correspond to openings through respective of second side segments 1060B2, 1060B4, and 1060B5. In some embodiments one or more of the interior skin segments 1080B1, 1080B2, 1080B3, 1080B4, and 1080B5 may be stitch welded to non-corrosive (e.g., stainless steel) angles that have been welded to respective of the second side segments 1060B1, 1060B2, 1060B3, 1060B4, and 1060B5. Accordingly, in embodiments where the interior skin segments 1080B1, 1080B2, 1080B3, 1080B4, and 1080B5 are non-corrosive they may be coupled to non-corrosive angles that have been coupled to corrosive support structure of the skeleton segments. The interior skin segments 1080B1, 1080B2, 1080B3, 1080B4, and optionally portions of 1080B5 will form part of an abatement chamber when the field erected abatement system 1000 is supplemented with additional components to form an abatement system. At least a portion of skin segment 1080B5 will form part of the fan chamber when the abatement system is formed.

Each of the second side interior skin segments 1080B1, 1080B2, 1080B3, 1080B4, and 1080B5 includes a plurality of interior skin panels that are welded to one another. In some embodiments the interior skin panels are lapped with any adjacent panels and then seam welded to create a substantially leak proof seal therebetween. In some embodiments each of the interior skin panels are lapped with any adjacent panels by approximately one inch. Optionally, the interior skin panels are welded on an exterior surface thereof to create a weld free interior surface. As described in additional detail herein, the interior skin segments 1080B1, 1080B2, 1080B3, 1080B4, and 1080B5 may also be sized to extend beyond portions of the periphery of respective of the second side segments 1060B to thereby enable lapping with other adjacent interior skin segments coupled to other skeleton segments.

In some embodiments the interior skin segments 1080B1, 1080B2, 1080B3, 1080B4, and 1080B5 where they are adjacent to openings (e.g., misting array openings, condensing coil openings, fan openings, and manway openings) may extend through the openings and wrap around and be coupled to the exterior of respective portions of second side pieces 1060B1, 1060B2, 1060B3, 1060B4, and 1060B5. For example, interior skin segment 1080B1 may extend through the opening between second side pieces 1060B1 and 1060B2 and wrap around to the exterior of side piece 1060B1. In some embodiments the second side interior skin segments 1080B1, 1080B2, 1080B3, 1080B4, and 1080B5 may be coupled to respective of the second side segments 1060B prior to being delivered for field erection.

Referring to FIG. 31, the first corner segment 1030A described herein is shown with a side portion interior skin segment 1077A and a top portion interior skin segment 1077B. The side portion interior skin segment 1077A may be coupled to the side portion 1034A of the first corner segment 1030A and the top portion interior skin segment 1077B may be coupled to the top portion 1032A of the first corner segment 1030A. The side portion interior skin segment 1077A has openings therethrough that generally correspond to openings through the side portion 1034A of the first corner segment 1030A. In some embodiments all or portions of the interior skin segments 1077A and 1077B may be stitch welded to non-corrosive (e.g., stainless steel) angles that have been welded to the first corner segment 1030A.

The top portion interior skin segment 1077B and the side portion interior skin segment 1077A both include a plurality of interior skin panels that are welded to one another. In some embodiments the interior skin panels are lapped with any adjacent panels and then seam welded to create a substantially leak proof seal. In some embodiments each of the interior skin panels are lapped with any adjacent panels by approximately an inch. The side portion interior skin segment 1077B includes lap portions 1078A and 1078B for lapping with adjacent interior skin segments coupled to adjacent skeletal segments. The lap portion 1078A may be lapped with the top portion interior skin segment 1077B and a seal weld created between the top portion interior skin segment 1077B and the side portion interior skin segment 1077A to create a substantially air tight seal therebetween. The lap portion 1078B may be lapped with one or more interior skin segments coupled to the first side segments 1060A. In some embodiments the lap portions 1078A and/or 1078B may be laps of approximately one inch. Two panels in the side portion interior skin segment 1077A do not have a lap portion. In some embodiments those two panels may be in the fan chamber and may not necessitate an air tight seal. The non-fan chamber portions of the panels may form part of the abatement chamber of a completed abatement system.

An exterior skin 1070A is also illustrated in FIG. 31. The exterior skin 1070A includes a top portion 1072A that may exteriorly cover the top portion 1032A of the first corner segment 1030A and a side portion 1072B that may exteriorly cover the side portion 1034A of the first corner segment 1030A. The side portion 1072B has openings therethrough that generally correspond to openings through the first side portion 1034A of the first corner segment 1030A. In some embodiments the exterior skin 1070A may be coupled to the first corner segment 1030A using fasteners such as, for example, screws that may be received in support structure of first corner segment 1030A. In some embodiments the exterior skin 1070A may be made of mild steel that is optionally painted.

In some embodiments the top portion interior skin segment 1077A and the side portion interior skin segment 1077B may optionally be coupled to the first corner segment 1030A prior to the first corner segment 1030A being delivered for field erection. Exterior skin 1070A may also optionally be coupled to the first corner segment 1030A prior to the first corner segment 1030A being delivered for field erection. In some embodiments each of the modular skeleton segments described herein may have interior and/or exterior skin segments coupled thereto prior to being delivered for field erection. In some embodiments insulation may be interposed between the interior skin segments and exterior skin segments. Optionally, the insulation may be high temperature insulation such as, for example, high temperature mineral wool insulation.

It will be appreciated that in some embodiments the interior skin segments may be coupled to substantially the entire interior surface (e.g., at least the abatement chamber portion thereof) of the field erected abatement system skeleton 1000 utilizing the teachings hereof to thereby create a field erected abatement system shell. It will further be appreciated that some or all of the modular skeleton segments described herein may be provided with interior skin segments coupled thereto prior to being delivered for field erection, thereby creating modular shell segments field erectable into an abatement system shell. Moreover, it will further be appreciated that in some embodiments exterior skin segments also may be coupled to the exterior surface of the field erected abatement system skeleton 1000 utilizing the teachings hereof. In some embodiments some or all of the modular skeleton segments described herein may be provided with exterior skin segments coupled thereto prior to being delivered for field erection.

In some embodiments the interior skin segments in the abatement chamber section of the abatement system skeleton described herein may comprise a non-corrosive metal. The abatement chamber section of the abatement system skeleton generally corresponds to the portion that will constitute the abatement chamber when the abatement system skeleton is supplemented to become a functioning abatement system. In some embodiments the non-corrosive metal may comprise stainless steel, Hastelloy, and/or Inconel. In some embodiments the non-corrosive metal may comprise a corrosive metal sufficiently coated with a substance to make the metal substantially non-corrosive. For example, in some embodiments the non-corrosive metal may comprise a corrosive metal coated with a substance such as Teflon or Polyvinylidene Fluoride (PVDF) to make the metal substantially non-corrosive. In some embodiments the interior skin segments in the abatement chamber section of the abatement system skeleton described herein may be approximately 16 gauge. In some embodiments the interior skin segments in the fan chamber section of the abatement system skeleton described herein may comprise galvanized steel and may be secured to support structure in the fan chamber section using a fastener such as a screw. In some embodiments the exterior skin segments of the abatement system skeleton described herein may comprise galvannealed steel.

Although interior and exterior skin segments have been described in detail herein, one of ordinary skill in the art, having had the benefit of the present disclosure will recognize that variations of the skin segments may be utilized in other embodiments. For example, in some embodiments one or more of the skin segments may comprise a single non-welded unitary panel. Also, for example, in some embodiments differing amounts and/or locations of laps between panels on a skin segment and/or between panels on adjacent skin segments may be utilized. Also, for example, in some embodiments the exterior skin may be permeable. For example, in some embodiments the exterior skin may comprise a mesh wiring material such as, for example, chicken wire. Insulating material may optionally be provided in between the interior skin and the permeable exterior skin. Also, optionally, in some embodiments a substantially non-permeable structure may be placed around the exterior skin of the abatement system shell. For example, in some embodiments sheet metal may be coupled to or erected around the abatement system shell.

Figure 32:
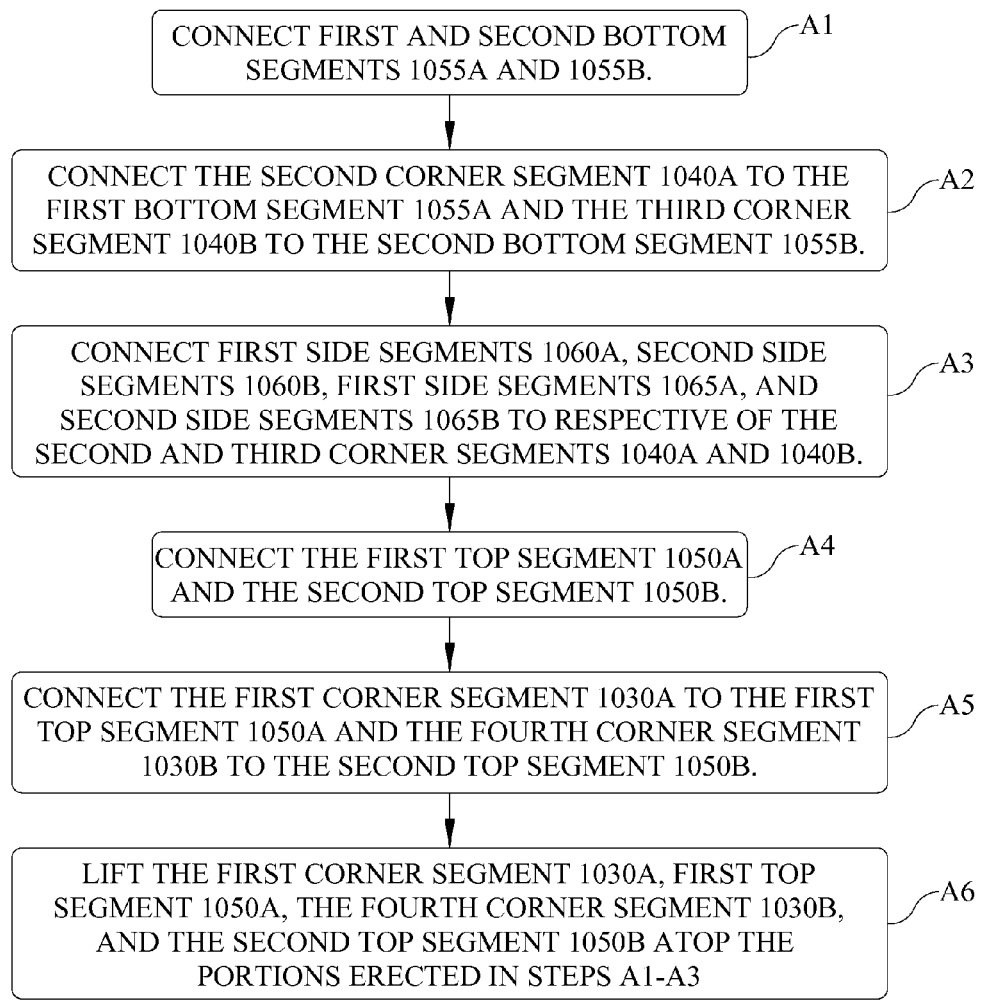
FIG. 32 illustrates an upper second side and exhaust side perspective view of the first embodiment of the field erectable abatement system skeleton with skin segments coupled to portions of the exterior and interior surfaces of the abatement field erectable abatement system skeleton.

Referring to FIG. 32, a flow chart is provided showing an embodiment of a method of field erecting a plurality of modular prefabricated skeleton segments into an abatement system skeleton. The method is described in conjunction with the modular prefabricated skeleton segments shown in FIG. 24-31. In the first step A1 the first bottom segment 1055A and the second bottom segment 1055B are fixedly connected to one another. Optionally, the first bottom segment 1055A and the second bottom segment 1055B may first be connected to one another through telescopic engagement of the connection members thereof, then further connected to one another through welding. In the second step A2 the second corner segment 1040A is coupled to the first bottom segment 1055A and the third corner segment 1040B is coupled to the second bottom segment 1055B. Optionally, the second corner segment 1040A and the first bottom segment 1055A and the third corner segment 1040B and the second bottom segment 1055B may first be connected to one another through telescopic engagement of the connection members thereof, then further connected to one another through welding.

In the third step A3 the first side segments 1060A, the second side segments 1060B, the first end segments 1065A, and the second end segments 1065B are coupled to the second and third corner segments 1040A and 1040B and optionally to the bottom segments 1055A and 1055B. Optionally, the first lower segment 1065A1, the second lower segment 1065B1, one or more of the first side segments 1060A, and/or one or more of the second side segments 1060B may first be connected to the corner segments 1040A and 1040B through telescopic engagement of the connection members thereof, then further connected thereto through welding.

In the fourth step A4, the first top segment 1050A and the second top segment 1050B are fixedly connected to one another. Optionally, the first top segment 1050A and the second top segment 1050B may first be connected to one another through telescopic engagement of the connection members thereof, then further connected to one another through welding. In the fifth step A5 the first corner segment 1030A is coupled to the first top segment 1050A and the fourth corner segment 1030B is coupled to the second top segment 1050B. Optionally, the first corner segment 1030A and the first top segment 1050A and the fourth corner segment 1030B and the second top segment 1050B may first be connected to one another through telescopic engagement of the connection members thereof, then further connected to one another through welding.

In the fifth step A6, the first top segment 1050A, the second top segment 1050B, the first corner segment 1030A, and the fourth corner segment 1030B are lifted as an integral unit and placed atop those portions of the abatement system skeleton erected in steps A1 through A3. Optionally, the first top segment 1050A and the first corner segment 1030A may first be connected to the first side segments 1060A, the first end upper piece 1065A4, and/or the second end upper piece 1065B4 through telescopic engagement of the connection members thereof, then further connected thereto through welding. Also, optionally, the second top segment 1050B and the third corner segment 1030B may first be connected to the second side segments 1060B, the first end upper piece 1065A4, and/or the second end upper piece 1065B4 through telescopic engagement of the connection members thereof, then further connected thereto through welding.

Although a method of field erecting a plurality of modular prefabricated skeleton segments into an abatement system skeleton has been described in detail herein, one of ordinary skill in the art, having had the benefit of the present disclosure will recognize that variations of the method may be utilized in other embodiments. For example, in some embodiments the first top segment 1050A, the second top segment 1050B, the first corner segment 1030A, and the fourth corner segment 1030B may not be assembled as an integral unit prior to being placed atop those portions of the abatement system skeleton erected in steps A1 through A3. Also, for example, in some embodiments all of the modular segments may be coupled to one another using only telescopic connection between connection members thereof before any supplemental connection (e.g., welding and/or gusset plating) takes place. Also, for example, in some embodiments one or more of the first end segments 1065A and/or the second end segments 1065B may be coupled to the first corner segment 1030A and the fourth corner segment 1030B in step A5 instead of being coupled to the second and third corner segments 1040A and 1040B in step A3.

Figure 33:
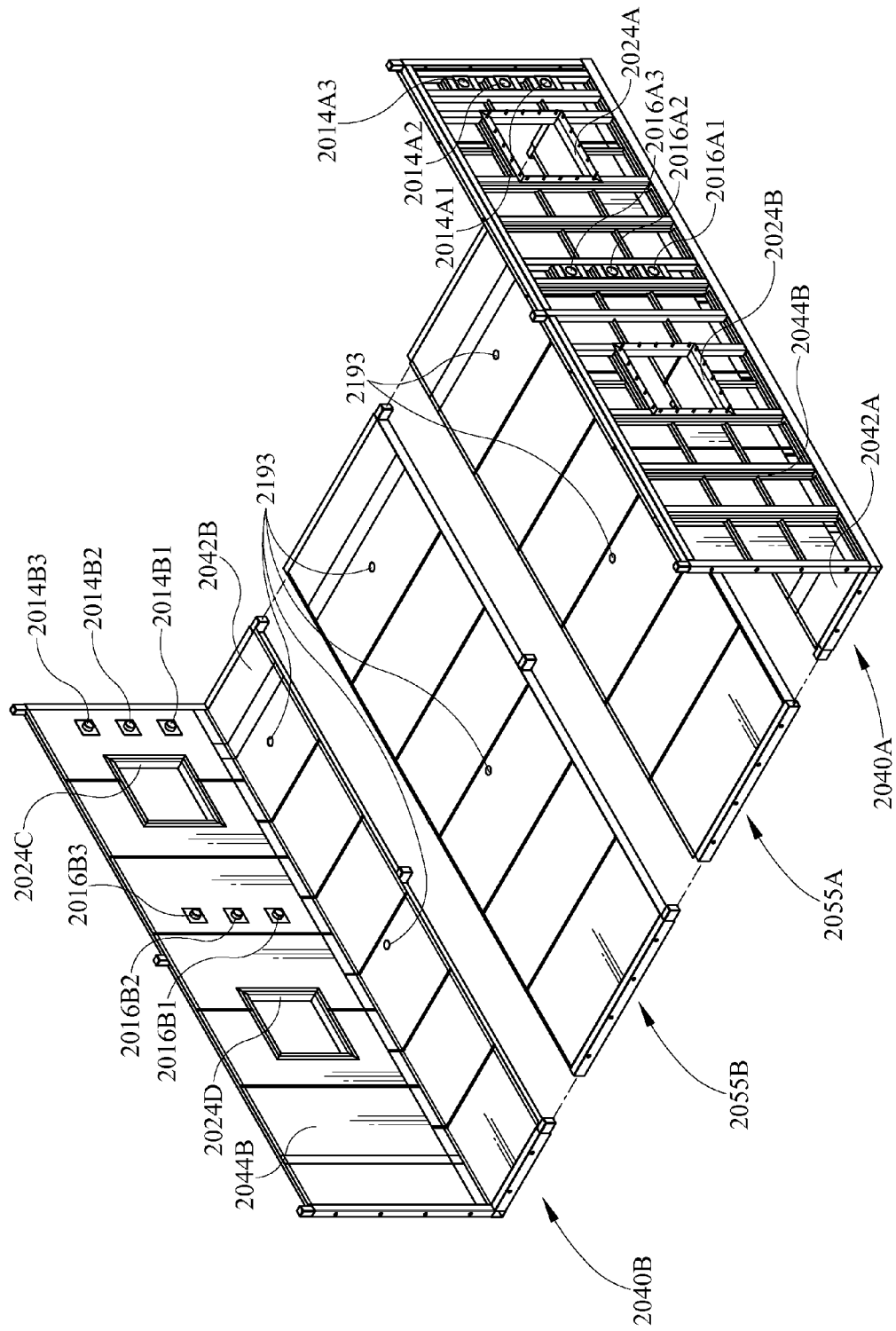
FIG. 33 illustrates an upper first side and exhaust side perspective view of portions of a second embodiment of a field erectable abatement system shell; a first corner segment, a second corner segment, a first bottom segment, and a second bottom segment are shown exploded away from one another.

Referring now to FIG. 33 through FIG. 39, several aspects of a second embodiment of a field erectable abatement system shell 2000 are illustrated in detail. Referring initially to FIG. 33, a first bottom segment 2055A, a second bottom segment 2055B, a first corner segment 2040A and a second corner segment 2040B are shown exploded away from one another. The segments 2055A, 2055B, 2040A, and 2040B all include a skeleton having a plurality of interconnected support structures and also include an interior skin coupled to the skeleton thereof. The interior skin may comprise a plurality of individual interior skin segments that are coupled to one another and coupled to the interconnected support structures. In some embodiments the interior skin segments may be overlapped with adjacent interior skin segments and seam welded to adjacent interior skin segments. Optionally, the interior skin segments may be seam welded on an exterior facing surface thereof to create a substantially weld free interior surface. The interior skin segments may optionally be welded, directly or indirectly, to the interconnected support structures. For example, the interior skin segments may be welded to angles (such as the horizontally extending angles visible on first corner segment 2040A in FIG. 33) that extend between support structure of segments 2055A, 2055B, 2040A, and 2040B.

Each of the various modular segments 2055A, 2055B, 2040A, and 2040B depicted in FIG. 33 is provided with at least one of a male connection member and/or at least one of a female connection receptacle. The at least one male member and/or female connection receptacle is telescopically engageable with a corresponding female member or male member that is provided on a modular segment that will be adjacent thereto when the abatement system shell 2000 is assembled. For example, the first bottom segment 2055A has a plurality of female connection receptacles that telescopically receive corresponding male connection members extending from the second bottom segment 2055B. The second bottom segment 2055B also has a plurality of female connection receptacles that telescopically receive corresponding male connection members extending from the second corner segment 2040B.

With continuing reference to FIG. 33, first corner shell segment 2040A has a bottom portion 2042A and a first side portion 2044A. The second corner shell segment 2040B also has a bottom portion 2042B and a second side portion 2044B. Provided through the first side portion 2044A is a first manway 2024A and a second manway 2024B that are defined by portions of the interconnected support structure of the first side portion 2044A. Interior skin segments extend from an interior side of first side portion 2044A, through the first and second manways 2024A and 2024B, and are coupled to an exterior side of first side portion 2044A. Similarly, provided though the second side portion 2044B is a third manway 2024C and a fourth manway 2024D defined by portions of interconnected support structure. Interior skin segments extend from an interior side of second side portion 2044B, through the third and fourth manways 2024C and 2024D, and are coupled to an exterior side of second side portion 2044B. The manways 2024A-D may be finished with a hatch or other sealable and selectively movable barrier thereover to enable selective access to a portion of the abatement chamber when the abatement system shell 2000 is supplemented with additional components to form an abatement system.

The first side portion 2044A also includes three first misting array openings 2014A1-3 and three second misting array openings 2016A1-3 extending therethrough. As described in additional detail herein, the misting array openings 2014A1-3 and 2016A1-3 may each receive a misting array nozzle section therethrough. The misting array nozzle section may include one or more misting array nozzles and form a row of a first misting array (openings 2014A1-3) or a second misting array (openings 2016A1-3). The second side portion 2044B includes first misting array openings 2014B1-3 and second misting array openings 2016B1-3. As described in additional detail herein the misting array openings 2014B1-3 and 2016B1-3 may each receive a misting array nozzle section therethrough. The misting array nozzle section may include one or more misting array nozzles and form a row of a first misting array (openings 2014B1-3) or a second misting array (openings 2016B1-3). The misting array nozzle sections received through openings 2014B1-3 may be separate from those received through openings 2014A1-3 in some embodiments. Likewise, the misting array nozzle sections received through openings 2016B1-3 may be separate from those received through openings 2016A1-3 in some embodiments.

Provided through bottom portion 2042B are two drain inlets 2193. Two drain inlets 2193 are also provided in each of first bottom segment 2055A, second bottom segment 2055B, and, although not visible, in bottom portion 2042A. Drain inlets 2193 may allow liquid to pass therethrough to drain pipes, storage tanks, or elsewhere.

Figure 34:
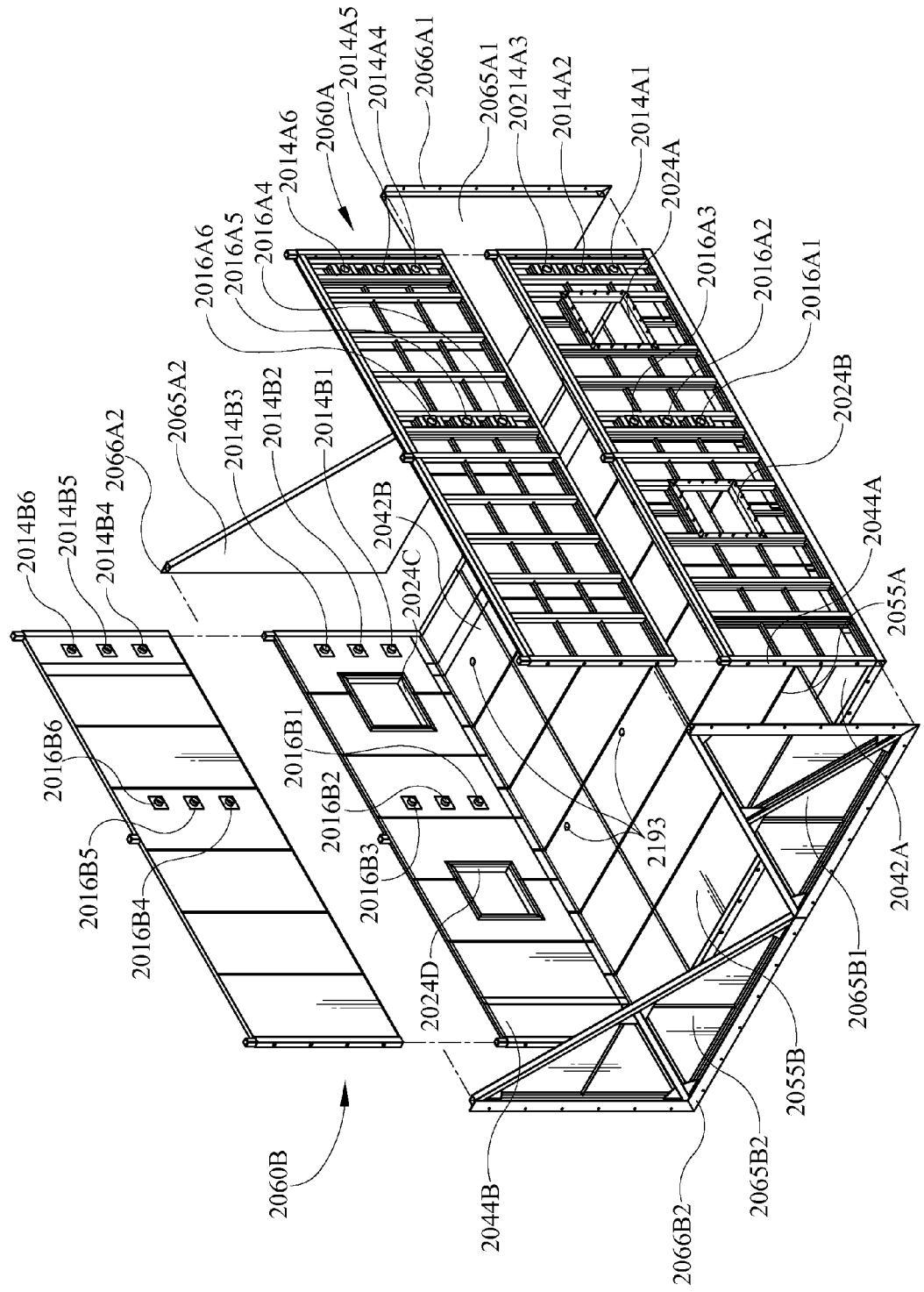
FIG. 34 illustrates an upper first side and exhaust side perspective view of portions of the second embodiment of a field erectable abatement system shell; the first corner segment, the second corner segment, the first bottom segment, and the second bottom segment are shown coupled to one another; a lower first side segment, a lower second side segment, a lower first end first side segment, a lower first end second side segment, a lower second end first side segment, and a lower second end second side segment are shown exploded away.

Referring now to FIG. 34, segments 2055A, 2055B, 2040A, and 2040B are shown coupled to one another. As can be seen with additional reference to FIG. 33, the interior skin of second corner segment 2040B has an overlap portion that will overlap interior skin of second bottom segment 2055B when second corner segment 2040B is coupled to second bottom segment 2055B. Similarly, the interior skin of first bottom segment 2055A has an overlap portion that will overlap the interior skin of second bottom segment 2055B when they are coupled to one another. Similarly, the interior skin of first corner segment 2040A has an overlap portion that will overlap interior skin of second bottom segment 2055B when they are coupled to one another.

In FIG. 34 a lower first side segment 2060A, a lower second side segment 2060B, a lower first end first side segment 2065A1, a lower first end second side segment 2065A2, a lower second end first side segment 2065B1, and a lower second end second side segment 2065B2 are shown exploded away. The end segments 2065A1, 2065A2, 2065B1, and 2065B2 each form a right triangle, are each generally symmetrical with one another, and each contain a respective flange 2066A1, 2066A2, 2066B1 and 2066B2 on the legs of the triangle. Each flange 2066A1, 2066A2, 2066B1, and 2066B2 contains a plurality of openings therethrough that may receive a fastener for coupling respective of the end segments 2065A1, 2065A2, 2065B1, and 2065B2 to other structure of the abatement system shell 2000. For example, the lower first end first side segment 2065A1 has a flange 2066A1 with a bottom portion having a plurality of openings that are alignable with a plurality of openings in first corner segment 2040A and first bottom segment 2055A. The flange 2066A1 also has a side portion having a plurality of openings that are alignable with a plurality of openings in first corner segment 2040A and lower first side segment 2060A. Bolts or other fasteners may be inserted through the openings in the flanges 2066A1, 2066A2, 2066B1, and 2066B2 of segments 2065A1, 2065A2, 2065B1, and 2065B2 and received in corresponding openings of other structure of abatement system shell 2000. The segments 2065A1, 2065A2, 2065B1, and 2065B2 may additionally or alternatively be welded to other structure of abatement system shell 2000.

The lower first side segment 2060A includes three first misting array openings 2014A4-6 and three second misting array openings 2016A4-6 extending therethrough. The misting array openings 2014A4-6 and 2016A4-6 may receive a misting array nozzle section therethrough. The misting array nozzle section may include one or more misting array nozzles and form a row of a first misting array (openings 2014A4-6) or a second misting array (openings 2016A4-6). The second side portion 2044B includes first misting array openings 2014B4-6 and second misting array openings 2016B4-6. As described in additional detail herein the misting array openings 2014B4-6 and 2016B4-6 may each receive a misting array nozzle section therethrough. The misting array nozzle section may include one or more misting array nozzles and form a row of a first misting array (openings 2014B4-6) or a second misting array (openings 2016B4-6). The misting array nozzle sections received through openings 2014B4-6 may be separate from those received through openings 2014A4-6 in some embodiments. Likewise, the misting array nozzle sections received through openings 2016B4-6 may be separate from those received through openings 2016A4-6 in some embodiments.

Each of the modular segments 2055A, 2055B, 2040A, 2040B, 2060A, and 2060B depicted in FIG. 34 is provided with at least one of a male connection member and/or at least one of a female connection receptacle. The at least one male member and/or female connection receptacle is telescopically engageable with a corresponding female member or male member that is provided on a modular segment that will be adjacent thereto when the abatement system shell 2000 is assembled. For example, the first corner segment 2040A is provided with male connection members that are received in female connection receptacles of lower first side segment 2060A. The end segments 2065A1, 2065A2, 2065B1, and 2065B2 are not provided with male connection members or female connection receptacles in the depicted embodiment.

Figure 35:
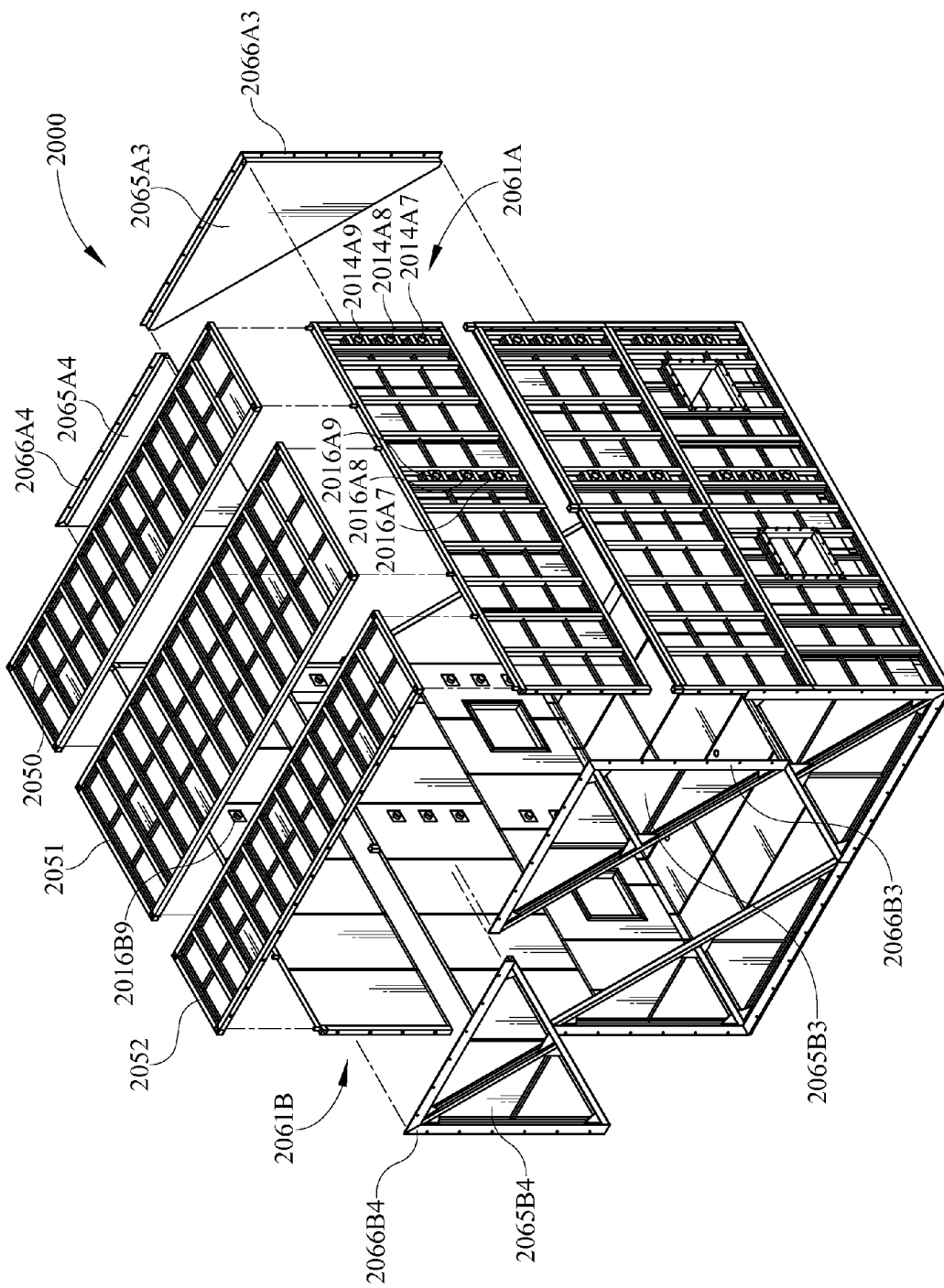
FIG. 35 illustrates an upper first side and exhaust side perspective view of portions of the second embodiment of a field erectable abatement system shell; all segments shown in FIG. 34 are shown coupled to one another; an upper first side segment, an upper second side segment, an upper first end first side segment, an upper first end second side segment, an upper second end first side segment, an upper second end second side segment, an upper first side segment, an upper second side segment, and top segments are shown exploded away.

Referring now to FIG. 35 segments 2060A, 2060B, 2065A3, 2065A4, 2065B3, and 2065B4 are each shown coupled to one or more of segments 2055A, 2055B, 2040A, and 2040B. Numbering in FIG. 35 related to segments 2060A, 2060B, 2065A3, 2065A4, 2065B3, 2065B, 2055A, 2055B, 2040A, and 2040B is omitted for clarity. As can be seen with additional reference to FIG. 34, the interior skin of first corner segment 2040A and second corner segment 2040B have overlap portions that will overlap interior skin of respective of lower first side segment 2060A and lower second side segment 2060B. In FIG. 35 an upper first side segment 2061A, an upper second side segment 2061B, an upper first end first side segment 2065A3, an upper first end second side segment 2065A4, an upper second end first side segment 2065B3, an upper second end second side segment 2065B4, a first top segment 2050, a second top segment 2051, and a third top segment 2053 are shown exploded away.

Each of modular segments 2055A, 2055B, 2040A, 2040B, 2060A, 2060B, 2061A, 2061B, 2050, 2051, and 2052 depicted in FIG. 35 is provided with at least one of a male connection member and/or at least one of a female connection receptacle. The at least one male member and/or female connection receptacle is telescopically engageable with a corresponding female member or male member that is provided on a modular segment that will be adjacent thereto when the abatement system shell 2000 is assembled. For example, the upper first side segment 2061A is provided with male connection members that are received in female connection receptacles of top segments 2050, 2051, and 2052. The end segments 2065A3, 2065A4, 2065B3, and 2065B4 are not provided with male connection members or female connection receptacles in the depicted embodiment.

The end segments 2065A3, 2065A4, 2065B3, and 2065B4 each form a right triangle, are each generally symmetrical with one another, and each contain a respective flange 2066A3, 2066A4, 2066B3, and 2066B4 on the legs of the triangle. Each flange 2066A3, 2066A4, 2066B3, and 2066B4 contains a plurality of openings therethrough that may receive a fastener for coupling the respective of the end segments 2065A3, 2065A4, 2065B3, and 2065B4 to other structure of the abatement system shell 2000. For example, the upper first end first side segment 2065A3 has a top portion of flange 2066A3 that has a plurality of openings that are alignable with a plurality of openings in first top segment 2050. The upper first end first side segment 2065A3 also has a side portion of flange 2066A3 having a plurality of openings that are alignable with a plurality of openings in upper first side segment 2061A and lower first side segment 2060A. Bolts or other fasteners may be inserted through the openings in the flanges 2066A3, 2066A4, 2066B3, and 2066B4 and received in corresponding openings of other structure of abatement system shell 2000. The segments 2065A3, 2065A4, 2065B3, and 2065B4 may additionally or alternatively be welded to other structure of abatement system shell 2000. In some embodiments the segments 2065A3, 2065A4, 2065B3, and 2065B4 may be the last of the segments placed and coupled in the abatement system shell 2000.

The upper first side segment 2061A includes three first misting array openings 2014A7-9 and three second misting array openings 2016A7-9 extending therethrough. The misting array openings 2014A7-9 and 2016A7-9 may receive a misting array nozzle section therethrough. The misting array nozzle section may include one or more misting array nozzles and form a row of a first misting array (openings 2014A7-9) or a second misting array (openings 2016A7-9). The lower second side segment 2061B includes three first misting array openings opposite of misting array openings 2014A7-9 and in line with misting array openings 2014B1-6. The upper second side segment 2061B also includes three second misting array openings (opening 2016B9 is visible in FIG. 35) that are opposite of misting array openings 2016A7-9 and in line with misting array openings 2016B1-7. As described in additional detail herein the misting array openings may each receive a misting array nozzle section therethrough.

Figure 36:
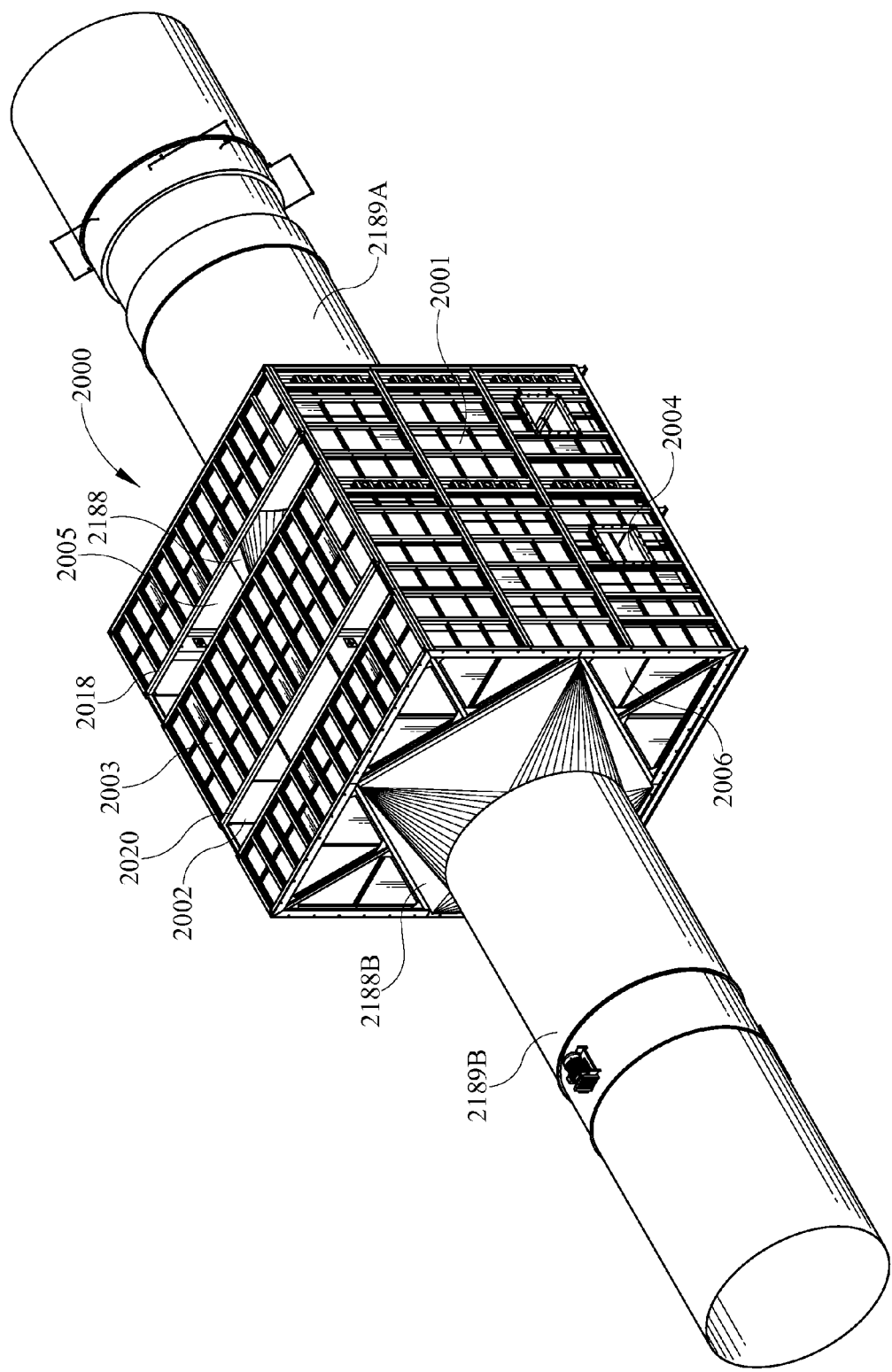
FIG. 36 illustrates an upper first side and exhaust side perspective view of the second embodiment of a field erectable abatement system shell; all segments shown in FIG. 35 are shown coupled to one another. A first transition piece and downstream tubing are shown coupled to a first end of the field erectable abatement system shell and a second transition piece and downstream tubing are shown coupled to a second end of the field erectable abatement system shell.

The top segments 2050, 2051, and 2052 are placeable and coupleable atop upper first side segment 2061A and upper second side segment 2061B. The top segments 2050, 2051, and 2052 will extend between upper first side segment 2061A and upper second side segment 2061B when coupled thereto. With reference to FIG. 36, the top segments 2050, 2051, and 2052 are shown coupled to the first side segment 2061A and the upper second side segment 2061B. Formed between the first top segment 2050 and the second top segment 2051 is a first condensing coil opening 2018. As described in additional detail herein, the first condensing coil opening 2018 allows for one or more condensing coils to pass therethrough and be positioned within the field erectable abatement system shell 2000. Likewise, formed between the first top segment 2050 and the second top segment 2051 is a second condensing coil opening 2020. The second condensing coil opening 2020 allows for one or more condensing coils to pass therethrough and be positioned within the field erectable abatement system shell 2000.

Continuing to refer to FIG. 36, all the various segments of the abatement system shell 2000 are shown coupled to one another. When formed, the abatement system shell 2000 includes a first side 2001, a second side 2002, a top 2003, a bottom 2004, a first end 2005, and a second end 2006. Numbering relating to the individual segments of the abatement system shell 2000 is omitted in FIG. 36 through FIG. 39 for clarity. In some embodiments the first side 2001, second side 2002, top 2003, and bottom 2004 may be approximately twenty-four feet by twenty-six feet and the first end 2005 and the second end 2006 may be approximately twenty-four feet by twenty four-feet.

Also shown in FIG. 36 is a second transition piece 2188B that has a large opening end that has been coupled over an air outlet opening 2012 (FIG. 38) formed by the first end segments 2065B1-4. The transition piece 2188B also has a small opening end that is coupled to downstream tubing 2189B. The downstream tubing 2189BB may be in communication with a downstream fan that draws air through the abatement chamber of the abatement system shell 2000 when it is supplemented with additional parts to form an abatement system. The depicted abatement system shell 2000 is not sized to house a fan therein. Rather, it is contemplated that with the depicted embodiment the fan may be separate from the abatement system shell 2000 and placed in flow communication with the abatement system shell 2000 via transition piece 2188B and downstream tubing 2189B. Portions of a first transition piece 2188A are also shown. The transition piece 2188A has a large opening end that has been coupled over an air inlet opening 2011 (FIG. 38) formed by the first end segments 2065A1-4. The transition piece 2188A also has a small opening end that is coupled to upstream tubing 2189A. The upstream tubing 2189A may be in communication with a flue gas discharge or other stream of gas. The upstream tubing 2189A may also optionally be in communication with an Ozone generator in some embodiments.

In some embodiments the abatement system shell 2000 may be assembled by first coupling the segments 2055A, 2055B, 2040A, and 2040B to one another. The segments 2060A and 2060B may then be coupled atop respective of segments 2040A and 2040B. The end segments 2065A1, 2065A2, 2065B1, and 2065B2 may then be added. Next, the segments 2061A sand 2061B may be coupled atop respective of segments 2060A and 2060B. Segments 2050, 2051, and 2052 may then be coupled atop segments 2061A and 2061B. Finally, end segments 2065A3, 2065A4, 2065B3, and 2065B4 may be attached.

Figure 37:
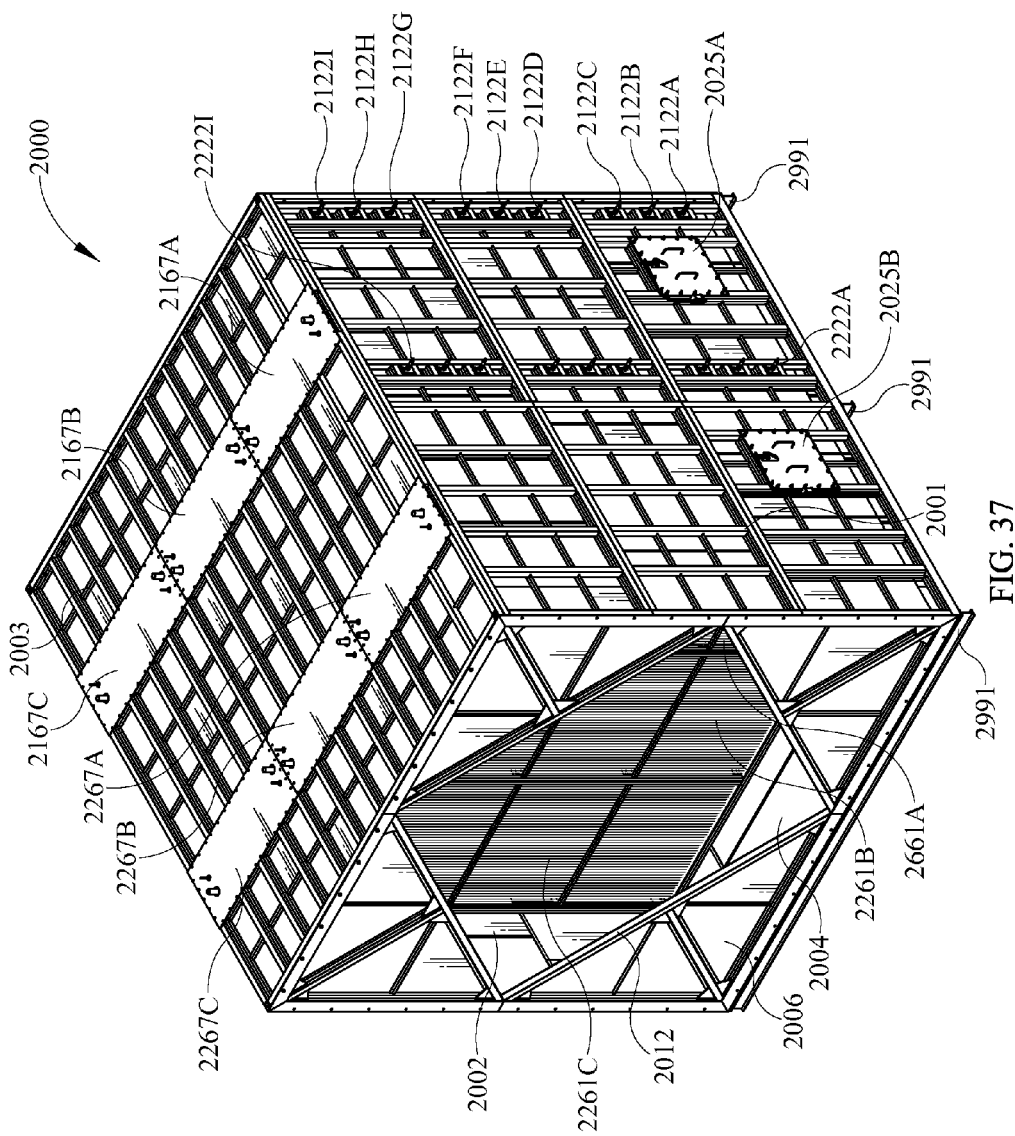
FIG. 37 illustrates an upper first side and exhaust side perspective view of the second embodiment of a field erectable abatement system shell supplemented with additional components to thereby form an abatement system.
Figure 38:
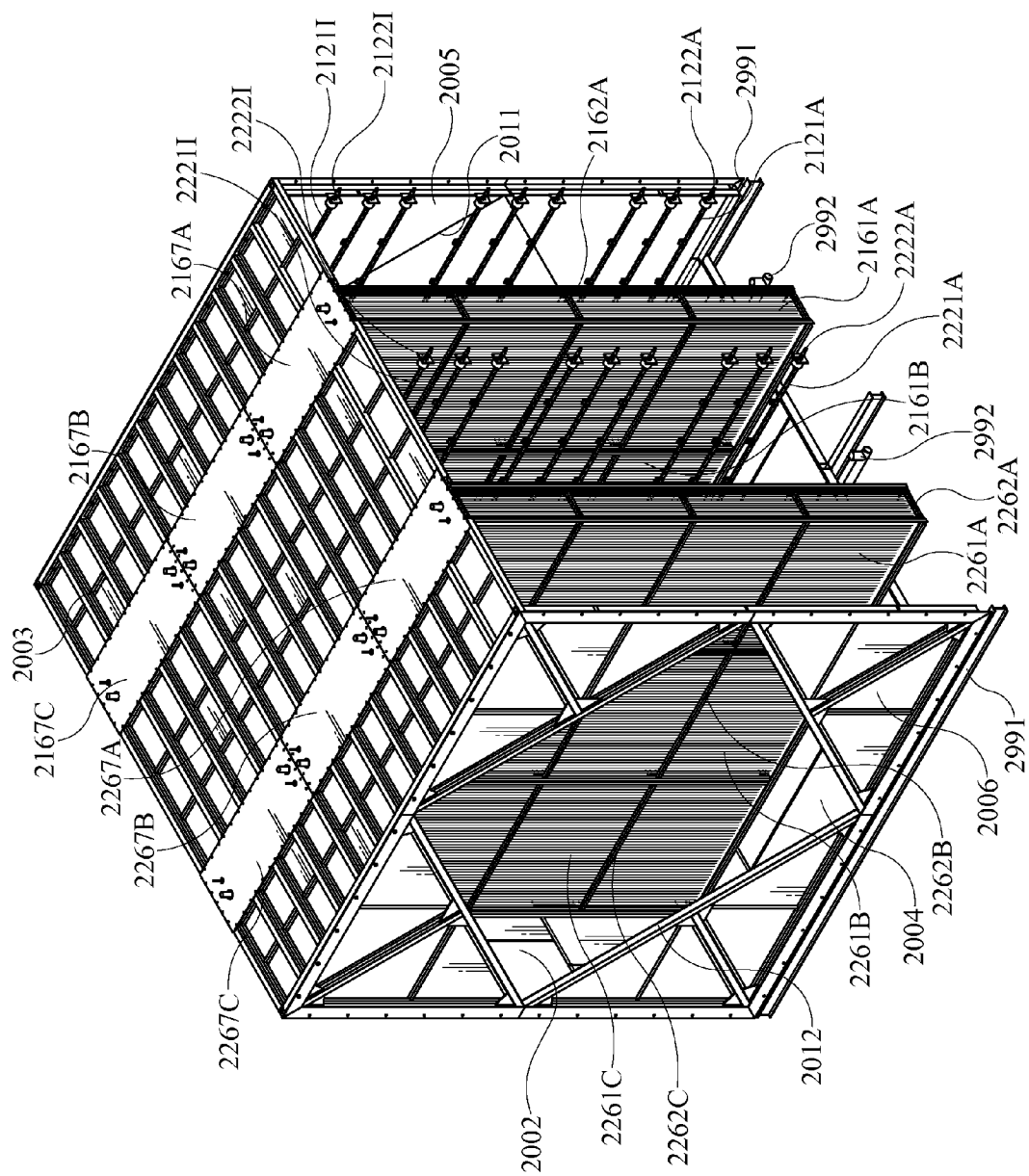
FIG. 38 illustrates an upper first side and exhaust side perspective view of the second embodiment of a field erectable abatement system shell supplemented with additional components to thereby form an abatement system; the first corner segment, the lower first side segment, and the upper first side segment have been removed to provide a better view of various internal components of the abatement system.
Figure 39:
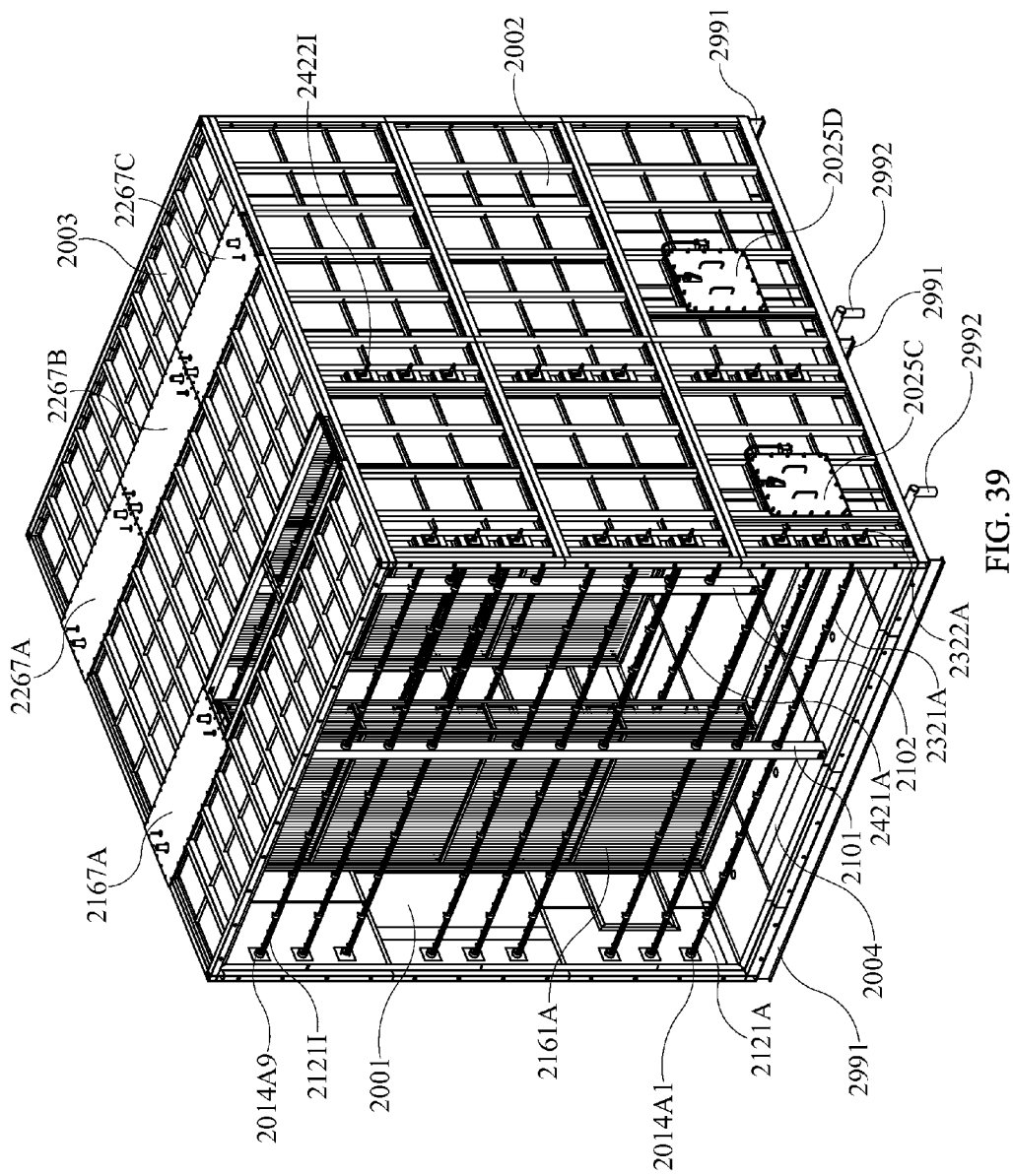
FIG. 39 illustrates an upper second side and intake side perspective view of the second embodiment of field erectable abatement system shell supplemented with additional components to thereby form an abatement system; the first end segments have been removed to provide a better view of various internal components of the abatement system; two condensing coil segments have also been removed.
Figure 44:
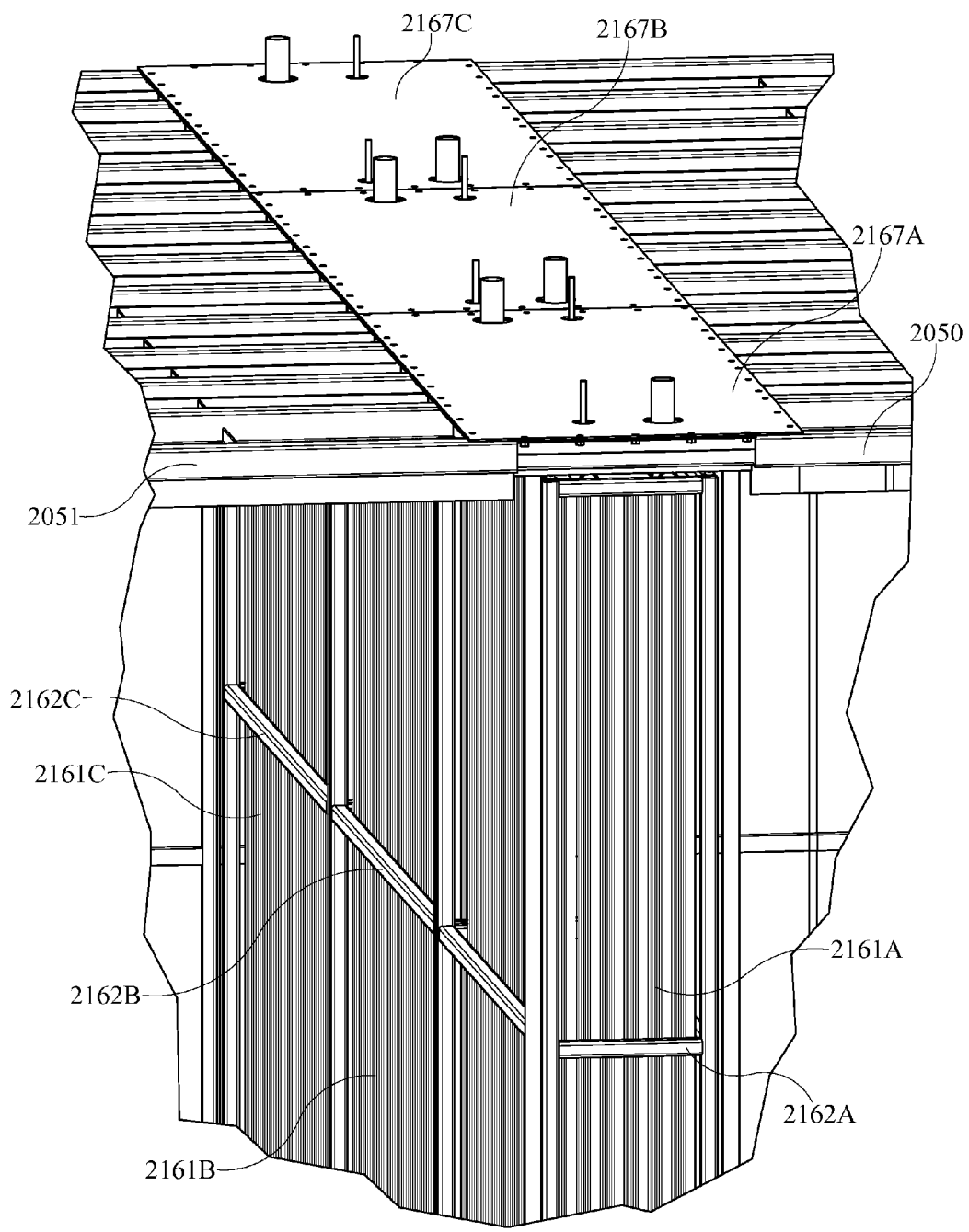
FIG. 44 illustrates a close up view of three of the condensing coil segments of a first condensing coil array assembly shown in FIGS. 37, 38, and 39.

Referring now to FIGS. 37, 38, and 39 the abatement system shell 2000 is shown with various other components to thereby form an abatement system. In FIG. 38 the first corner segment 2040A, the lower first side segment 2060A, and upper first side segment 2061A have been removed to provide a better view of various internal components of the abatement system. Visible through air outlet opening 2012 in FIG. 38 are three separate condensing coil segments 2261A, 2261B, and 2261C that collectively form a second condensing coil assembly. The condensing coil segments 2261A, 2261B, and 2261C may be individually inserted through second condensing coil opening 2020 (FIG. 36) and each has a respective sealing plate 2267A, 2267B, and 2267C coupled thereto that sealingly engages structure surrounding the second condensing coil opening 2020. Upstream of the condensing coil segments 2261A, 2261B, and 2261C are condensing coil segments 2161A, 2161B, and 2161C (FIG. 44). The condensing coil segments 2161A, 2161B, and 2161C are downstream of air inlet opening 2011 (FIG. 38), upstream of condensing coil segments 2261A, 2261B, and 2261C, collectively form a first condensing coil assembly, and may be individually inserted through first condensing coil opening 2018. The condensing coil segments 2161A, 2161B, and 2161C are coupled to respective sealing plates 2167A, 2167B, and 2167C that sealingly engage structure surrounding the first condensing coil opening. In FIG. 39 the first end segments 2065A1-4, the condensing coil segments 2161B and 2161C, and the sealing plates 2167B and 2167C have been removed to provide a better view of various internal components of the abatement system.

Also visible in FIGS. 37, 38, and 39 is first side first array nozzle tubing and second side first array nozzle tubing. The first side first array nozzle tubing includes first side first array nozzle sections 2121A-I and second side first array nozzle tubing includes second side first array nozzle sections 2321A-I that are disposed upstream of condensing coil segments 2161A-C. The first side first array nozzle tubing and the second side first array nozzle tubing collectively form a first misting array assembly. The first side first array nozzle tubing and the second side second array nozzle tubing have respective liquid source couplings 2122A-I and 2322A-I. Also visible in FIGS. 37, 38, and 39 is first side second array nozzle tubing and second side second array nozzle tubing. First side second array nozzle tubing includes first side second array nozzle sections 2221A-I and second side second array nozzle tubing includes second side second array nozzle sections 2421A-I. The second nozzle sections 2421A-I are downstream of condensing coil segments 2161A-C and are interposed between condensing coil segments 2161A-C and condensing coil segments 2261A-C. The first side second array nozzle tubing and the second side second array nozzle tubing collectively form a second misting array assembly. The first side second array nozzle tubing and the second side second array nozzle tubing have respective liquid source couplings 2222A-I and 2422A-I.

Each of the first side first array nozzle sections 2121A-I may be individually inserted into and removed from the abatement system shell via respective of openings 2014A1-9. Each of the second side first array nozzle sections 2321A-I may also be individually inserted into and removed from the abatement system shell via respective of openings 2014B1-9. Each of the nozzle sections 2121A-I and 2321A-I may extend at least partially through and be supported by a vertically extending support bar 2101 (FIG. 39) having a plurality of openings therethrough. Each of the first side second array nozzle sections 2221A-I may also be individually inserted into and removed from the abatement system shell via respective of openings 2016A1-9 and each of the second side second array nozzle sections 2421A-I may be individually inserted into and removed from the abatement system shell via respective of openings 2016B1-9. Similarly, each of the second nozzle sections 2221A-I and 2421A-I may extend at least partially through and be supported by a vertically extending support bar 2102 (FIG. 39) having a plurality of openings therethrough.

Numbering is omitted from various portions of first nozzle tubing and second nozzle tubing in FIGS. 37, 38, and 39 for purposes of clarity. However, it is understood that unnumbered portions of first nozzle tubing and second nozzle tubing have similar and sequential numbering to corresponding portions of first and/or second nozzle tubing that are numbered. For example, a lowermost first side first array nozzle section 2121A and an uppermost first side first array nozzle section 2122I are numbered in FIG. 38. It is understood that the nozzle section above nozzle section 2121A will be numbered 2121B and the nozzle section below nozzle section 2121I will be numbered 2121H. Also, for example, a lowermost second side first array nozzle section 2321A is numbered in FIG. 39. It is understood that the nozzle sections sequentially above nozzle section 2321A will be numbered 2321B, 2321C, 2321D, etc.

Visible in FIG. 38 and FIG. 39 are portions of drain tubing 2992 that may be in communication with one or more drain inlets 2193. The drain tubing 2992 is optionally provided exteriorly of abatement system shell 2000. The drain tubing 2992 may direct liquids captured through drain inlets 2193 to an external tank, external treatment areas, or elsewhere. Optionally, the abatement system shell 2000 may be elevated to a sufficient height such that the drain tubing 2992 may gravity feed liquids to a remote waste water treatment area. Visible in FIG. 37 and FIG. 39 are manway covers 2025A, 2025B, 2025C, and 2025D that selectively and movably sealingly engage respective of manway openings 2024A, 2024B, 2024C, and 2024D. Visible in FIGS. 37 through 39 are support structures 2991 supporting and elevating the abatement system shell 2000.

Figure 40:
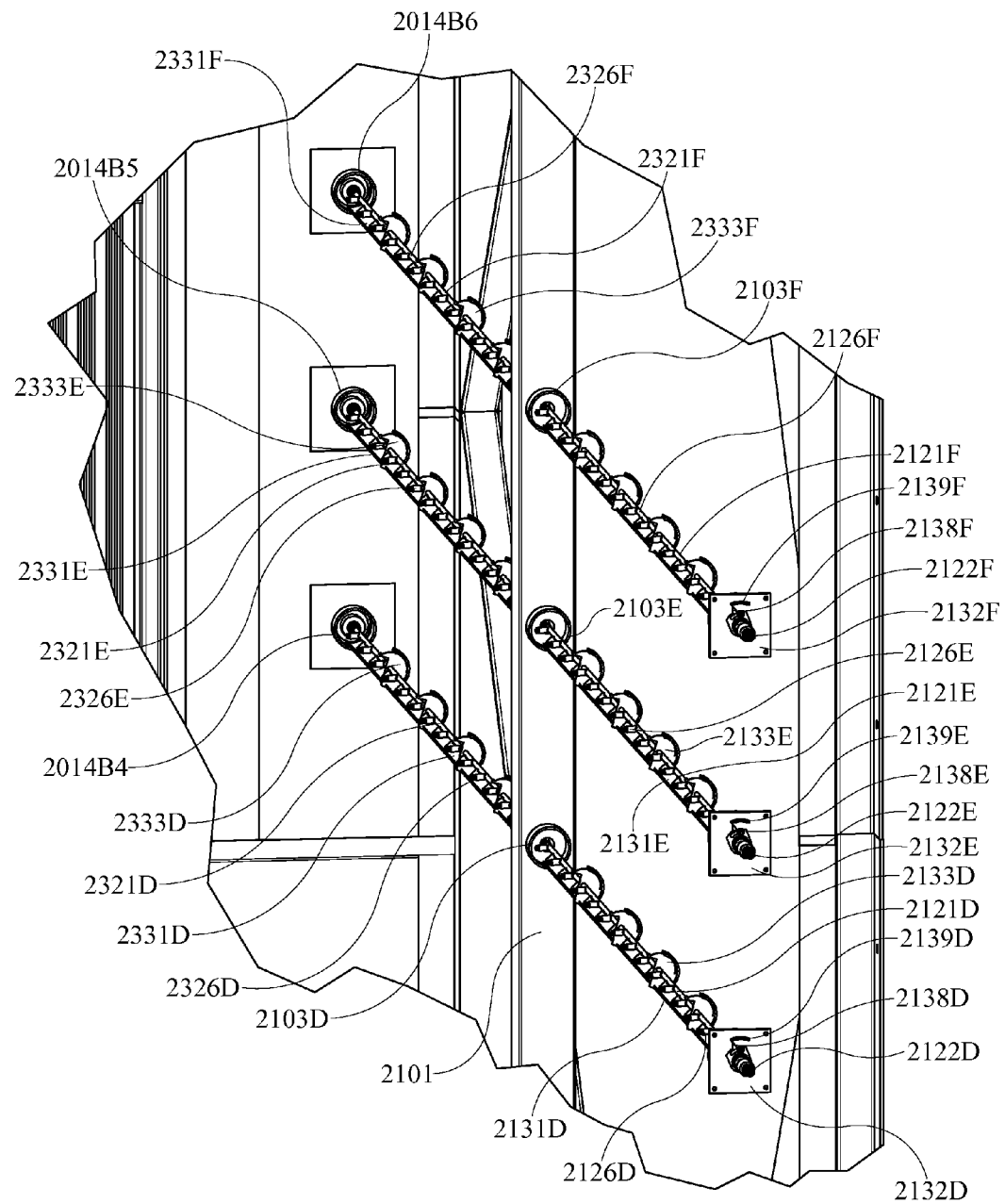
FIG. 40 illustrates a close up view of six nozzle tubing of a first misting array assembly shown in FIG. 38 and FIG. 39; the lower first side segment and the upper first side segment have been removed to provide a better view of the nozzle tubing.

Referring now to FIG. 40, three of the first side first array nozzle tubing and three of the first side second array nozzle tubing are shown in a close up view. The three first side first array nozzle tubing includes a fourth nozzle section 2121D, a fifth nozzle section 2121E, and a sixth nozzle section 2121F. Each of the nozzle sections 2121D, 2121E, and 2121F each have a plurality of respective nozzles 2126D, 2126E, and 2126F on an interior side of respective sealing plates 2132D, 2132E, and 2131F. The nozzles 2126D, 2126E, and 2126F on each of the nozzle sections 2121D, 2121E, and 2121F are at a substantially similar orientation as the other nozzles 2126D, 2126E, and 2126F on the respective nozzle sections 2121D, 2121E, and 2121F. For example, each of the nozzles 23226D are at a substantially similar orientation. In other embodiments one or more of the nozzles on a given nozzle section 2121D, 2121E, and/or 2121F may be at a unique orientation. For example, in some embodiments the nozzles 2126D may be offset nozzles with some being upwardly disposed and some being downwardly disposed. The nozzles 2126D, 2126E, and 2126F on each of the nozzle sections 2121D, 2121E, and 2121F are each oriented within the abatement system shell 2000 such that the output thereof will be directed with the direction of the gas flow when the abatement system shell 2000 functions as an abatement system. In other embodiments the nozzles 2126D, 2126E, and 2126F may each be oriented within the abatement system shell 2000 such that the output thereof will be directed counter to the direction of the gas flow.

The sealing plates 2132D, 2132E, and 2131F may be removably sealingly engaged over respective of openings 2014A4, 2014A5, and 2014A6 and include respective fiducial markings 2139D, 2139E, and 2139F. The fiducial markings 2139D, 2139E, and 2139F interface with respective of indicators 2138D, 2138E, and 2138F coupled to respective nozzle tubing to provide a visual indication of the rotational orientation of the respective nozzle sections 2121D, 2121E, and 2121F. Each of the nozzle tubings has a plurality of respective nozzle section flanges 2133D, 2133E, and 2133F that each surround and are rotationally fixed to a portion of a respective nozzle section 2121D, 2121E, and 2121F. The nozzle section flanges 2133D, 2133E, and 2133F are at least partially surrounded by and optionally contact a respective frame structure support trough 2131D, 2131E, and 2131F. As described in additional detail herein, the nozzle section flanges 2133D, 2133E, and 2133F may interact with a respective support trough 2131D, 2131E, and 2131F to only allow rotation of a respective nozzle tubing over a certain rotational range. The support troughs 2131D, 2131E, and 2131F extend into respective openings 2103D, 2103E, and 2103F of vertical support structure 2101 and contact corresponding structure. The support troughs 2131D, 2131E, and 2131F may help provide increased structural support to respective nozzle tubing via contact with respective nozzle section flanges 2133D, 2133E, and 2133F.

The three second side first array nozzle tubing includes a fourth nozzle section 2321D, a fifth nozzle section 2321E, and a sixth nozzle section 2321F. The nozzle sections 2321D, 2321E, and 2321F each have a plurality of respective nozzles 2326D, 2326E, and 2326F on an interior side of respective sealing plates (which are located exteriorly of the abatement system shell and not visible in FIG. 40). The nozzles 2326D, 2326E, and 2326F on each of the nozzle sections 2321D, 2321E, and 2321F are at a substantially similar orientation as the other nozzles 2326D, 2326E, and 2326F on the respective nozzle sections 2321D, 2321E, and 2321F. For example, each of the nozzles 2326D are at a substantially similar orientation. In other embodiments one or more of the nozzles on a given nozzle section 2321D, 2321E, and/or 2321F may be at a unique orientation. For example, in some embodiments the nozzles 2326D may be offset nozzles with some being upwardly disposed and some being downwardly disposed. The nozzles 2326D, 2326E, and 2326F on each of the nozzle sections 2321D, 2321E, and 2321F are each oriented within the abatement system shell 2000 such that the output thereof will be directed with the direction of the gas flow when the abatement system shell 2000 functions as an abatement system. In other embodiments the nozzles 2326D, 2326E, and 2326F may each be oriented within the abatement system shell 2000 such that the output thereof will be directed counter to the direction of the gas flow.

Each of the nozzle tubing has a plurality of respective nozzle section flanges 2333D, 2333E, and 2333F that each surrounds a portion of a respective nozzle section 2321D, 2321E, and 2321F. The nozzle section flanges 2333D, 2333E, and 2333F are at least partially surrounded by and optionally contact a respective frame structure support trough 2331D, 2331E, and 2331F. As described in additional detail herein, the nozzle section flanges 2333D, 2333E, and 2333F may interact with a respective support trough 2331D, 2331E, and 2331F to only allow rotation of a respective nozzle tubing over a certain rotational range. The support troughs 2131D, 2331E, and 2331F extend into and contact corresponding structure of vertical support structure 2101 and may help provide increased structural support to respective nozzle tubing via contact with respective nozzle section flanges 2333D, 2333E, and 2333F. In some embodiments the support troughs 2331D, 2331E, and 2331F may be omitted and the nozzle tubing may be self supporting. In other embodiments the support troughs 2331D, 2331E, and 2331F may be omitted and other support structure may be utilized.

In some embodiments the nozzle tubing of FIG. 37-40 may extend through and/or seal with the abatement system shell in a similar manner as depicted and described with respect to the fifth embodiment of a misting array of FIG. 20 through FIG. 23. Moreover, in some embodiments the nozzle tubing of FIG. 37-40 also be rotatable in a similar manner as depicted and described with respect to the fifth embodiment of a misting array of FIG. 20 through FIG. 23. For example, the nozzle tubing of FIG. 37-40 may utilize the same structure to enable rotation as the structure depicted and described with respect to the fifth embodiment of a misting array of FIG. 20 through FIG. 23

Figure 41:
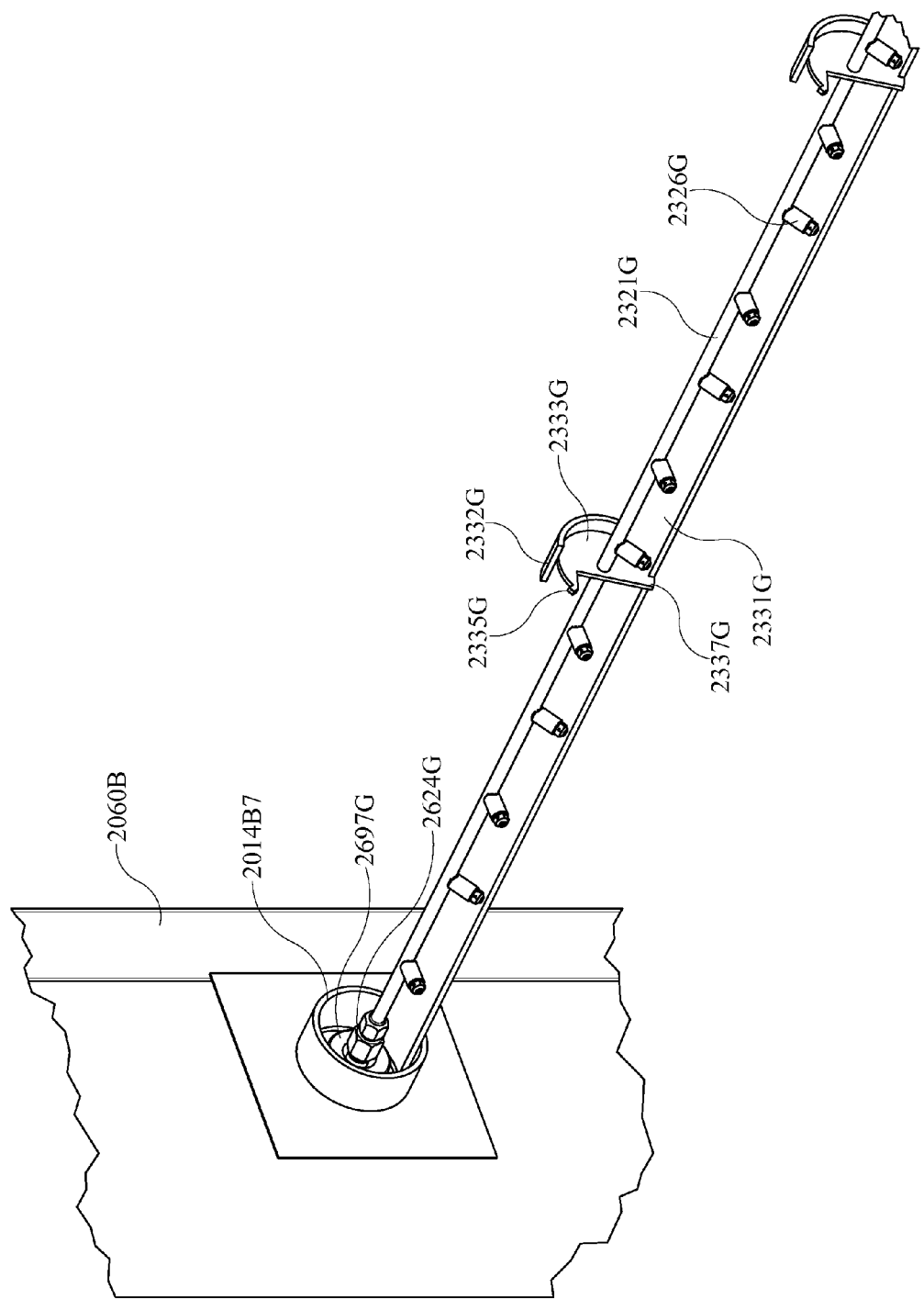
FIG. 41 illustrates a close up view of one nozzle tubing of FIG. 38 and FIG. 39; the nozzle tubing is shown extending through a portion of the field erectable abatement system shell and the nozzle tubing is shown adjusted to a first rotational orientation.
Figure 42:
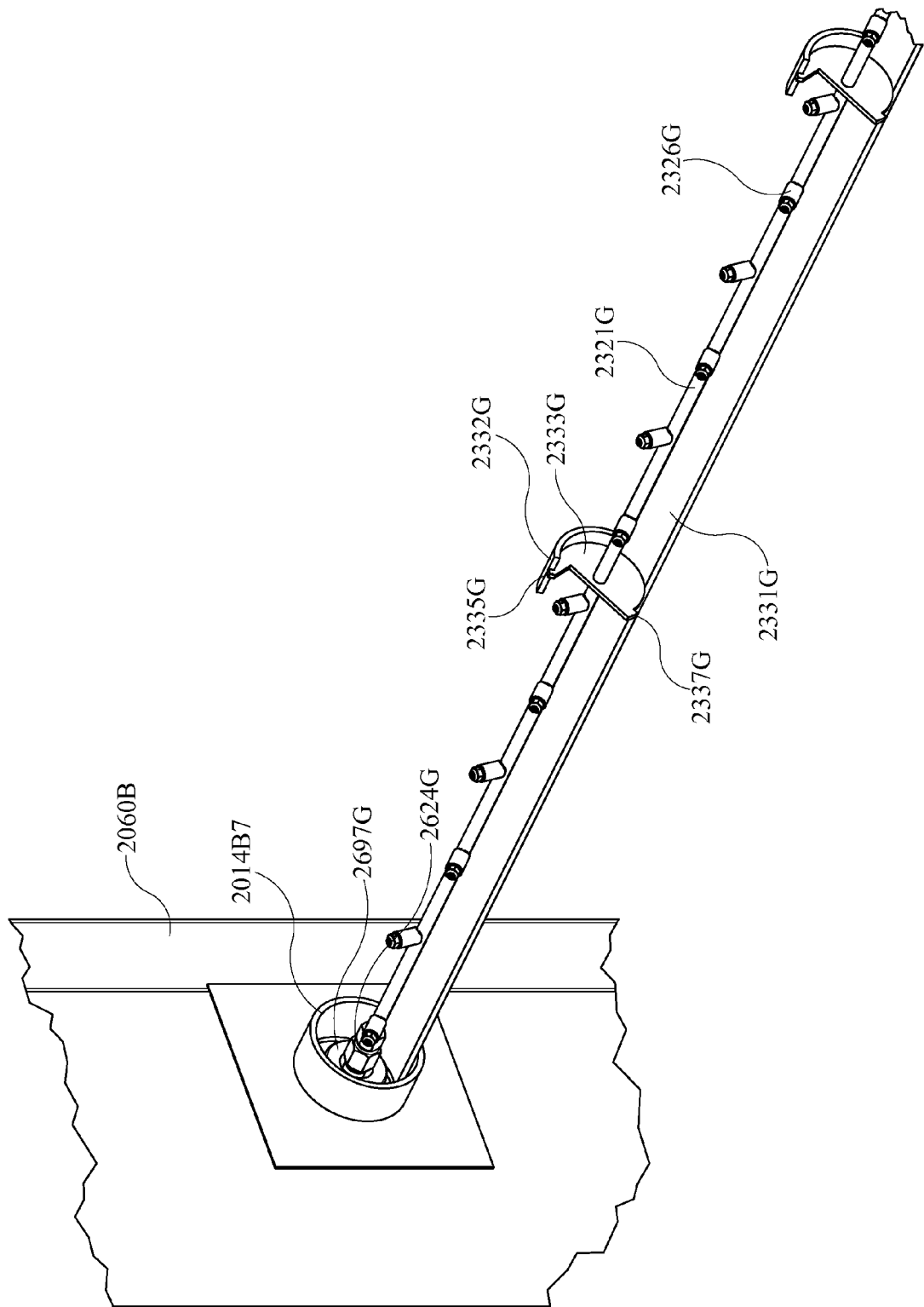
FIG. 42 illustrates the same components as FIG. 41, with the nozzle tubing of FIG. 41 adjusted to a second rotational orientation.
Figure 43:
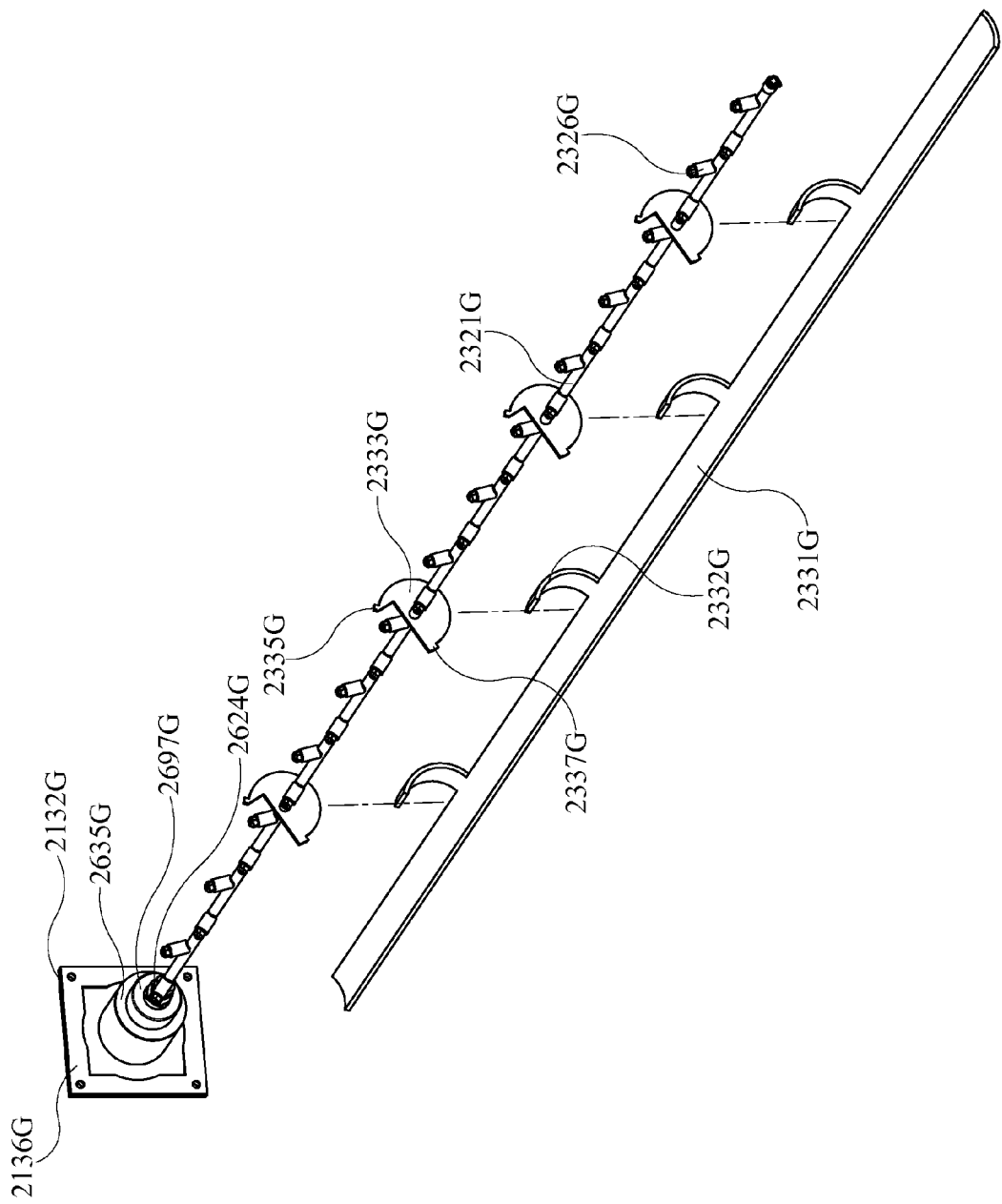
FIG. 43 illustrates a close up view of the nozzle tubing of FIG. 41, with a support trough shown exploded away from the nozzle tubing.

Referring now to FIGS. 41 through 43, a single second side first array nozzle tubing illustrated in FIG. 38 and FIG. 39 is depicted in additional detail. The nozzle tubing and associated support and sealing structure of FIGS. 41 through 43 is similar in all respects to those depicted in FIG. 40, with the exception that the nozzles 2326G in FIGS. 41 through 43 are alternatingly offset from one another. Like numbering between FIG. 40 and FIGS. 41 through 43 refers to like parts. The support trough 2331G extends from within the cylinder that surrounds opening 2014B7 to within an opening of vertical support structure 2101. The support trough 2331G may optionally be coupled (welded or otherwise) in position and/or may interact with other structure of the abatement system to be substantially maintained in position. For example, the support trough 2331G may optionally be coupled to and/or interact with structure within opening 2014B7 and/or structure within an opening of vertical support structure 2101. The support trough 2331G is substantially semi-cylindrical in shape and contains a plurality of semi-cylindrical trough extensions 2332G extending therefrom. The trough extensions 2332G are spaced so as to be aligned with a nozzle section flange 2333G extending radially from and rotationally fixed to nozzle section 2321G. The nozzle section flange 2333G may be in substantially conforming fit with all or portions of support trough 2331G and/or support trough extensions 2332G. The interaction between nozzle section flanges 2333G, nozzle section 2321G, and support troughs 2331G may help support nozzle section 2321G.

The nozzle section flanges 2333G each have a first stop projection 2337G and a second stop projection 2335G. A generally arcuate perimeter extends between each first stop projection 2337G and second stop projection 2335G and interfaces with the support trough 2331G and a corresponding support trough extension 2332G. In FIG. 41 the nozzle section 2321G and nozzles 2326G are rotated to a first orientation and in FIG. 42 they are rotated to a second orientation. The nozzle section 2321G and nozzles 2326G may be fixedly adjusted to any desired orientation between the first orientation and the second orientation, but are prohibited from rotating beyond the first orientation by virtue of first stop projection 2337G contacting support trough 2331G (as in FIG. 41) and prohibited from rotating beyond the second orientation by virtue of second stop projection 2335G contacting trough extension 2332G (as in FIG. 42). Accordingly, the range of rotation of nozzle section 2321G and nozzles 2326G is restrained by the interaction of first stop projection 2337G and second stop projection 2335G with support trough 2331G and support trough extension 2332G. In alternative embodiments the range of rotation may be altered by changing the circumferential distance between upper stop and lower stop and/or the circumferential distance between distal edges of support trough 2331G and support trough extension 2332G. In alternative embodiments the trough extension 2332G may be omitted and second stop projection 2335G may interact with support trough 2331G. In such embodiments the support trough 2331G may be extended and/or the circumferential position of the second stop projection 2335G may be altered. In alternative embodiments the support trough 2331G, trough extensions 2332G, and/or the nozzle section flanges 2333G may have different geometries than those depicted herein.

The nozzle section 2321G is coupled to a pipe nipple via female tube fitting 2624G. The pipe nipple extends through a first inline swivel 2697G (FIG. 43), may also extend through a second inline swivel (not shown), and be coupled to a liquid source coupling 2322G (FIG. 39) located exteriorly of the abatement system. The connection between the nozzle section 2321G and the liquid source coupling 2322G may be similar to the connection of similar parts described with respect to the fifth embodiment of a misting array of FIG. 20 through FIG. 23. Also, other nozzle tubing of FIGS. 37-40 may utilize similar connections. The first inline swivel 2697G and optionally at least some of the second inline swivel may be surrounded by a sealing piece 2635G extending from sealing plate 2132G. The sealing plate 2132G includes a gasket 2136G on an interior facing surface thereof. The sealing plate 2132G may be removably coupled over the opening 2014B7 provided through the abatement system shell 2000 to enable the nozzle section 2321G and nozzles 2326G to be sealingly insertable into and removable from within the abatement system shell 2000. The various parts depicted in FIG. 43 may be cohesively integrated with and/or removed from the abatement system. For example, the nozzle section 2321G, the nozzles 2326G, and the nozzle section flanges 2333G may be inserted through opening 2014B7 in the abatement system shell 2000 and into the abatement chamber of the abatement system shell 2000. The sealing plate 2332G may then be sealingly coupled exteriorly over the opening 2014B7 in the abatement system shell. Optionally, the support trough 2333G may be maintained in the abatement system (e.g., coupled to the cylinder surrounding opening 2014B7 and/or coupled to vertical support structure 2101) to help guide the nozzle section 2121G during insertion and removal thereof. Optionally, the support trough 2333G may be coupled to the sealing plate 2132G, the sealing piece 2635G, or other structure and cohesively removed and inserted with the nozzle section 2321G.

Referring now to FIG. 44, portions of the condensing coil segments 2161A, 2161B, and 2161C that form the first condensing coil assembly are shown in a close up view. Each of the condensing coil segments 2161A, 2161B, and 2161C is surrounded by respective support structure 2162A, 2162B, and 2162C. The support structure 2162A, 2162B, and 2162C may be coupled to respective of sealing plates 2167A, 2167B, and 2167C and may provide increased rigidity as compared to condensing coil segments 2161A, 2161B, and 2161C. The support structure 2162A, 2162B, and 2162C run substantially the entire length of respective condensing coil segments 2161A, 2161B, and 2161C. The support structure 2162A, 2162B, and 2162C may be helpful in inserting condensing coil segments 2161A, 2161B, and 2161C into first condensing coil opening 2018 and/or for removing them therefrom. In FIGS. 37 and 38 it can be seen that condensing coil segments 2261A, 2261B, and 2261C likewise have respective support structure 2262A, 2262B, and 2262C. A plurality of openings are provided around the periphery of each of sealing plates 2167A-C. The openings may receive fasteners that engage corresponding fastener openings through first top piece 2050, second top piece 2051, or other structure (such as an exterior skin) that may be coupled to the first top piece 2050 and/or second top piece 2051. Optionally, a gasket may be interposed between sealing plates 2167A-C and any structure that they engage.

Although an exterior skin is not shown in combination with abatement system shell 2000, it is understood that an exterior skin may be added thereto before, during, or after erecting the abatement system shell 2000. For example, in some embodiments a solid non-permeable exterior skin may be added such as, for example, a metallic exterior skin. Also, for example, in other embodiments, a permeable exterior skin may be added such as, for example, a chicken wire type metal exterior skin. Optionally, an insulating material may be interposed between the interior skin and the exterior skin. Optionally, the insulating material may be applied over the exterior of the interior skin without an exterior skin being provided. In some embodiments the abatement system shell 2000 may be installed and then a structure erected around the abatement system shell 2000. For example, in some embodiments a chicken wire type exterior skin and non-permeable interior skin may sandwich insulating material. After erecting the abatement system shell 2000, a sheet metal structure may be erected around, and optionally coupled to, the abatement system shell 2000. Such a separate structure may inhibit water or other items from reaching, inter alia, the exterior skin and/or the insulating material. For example, in some embodiments a barn type structure may be erected around the abatement system shell 2000.

Figure 45:
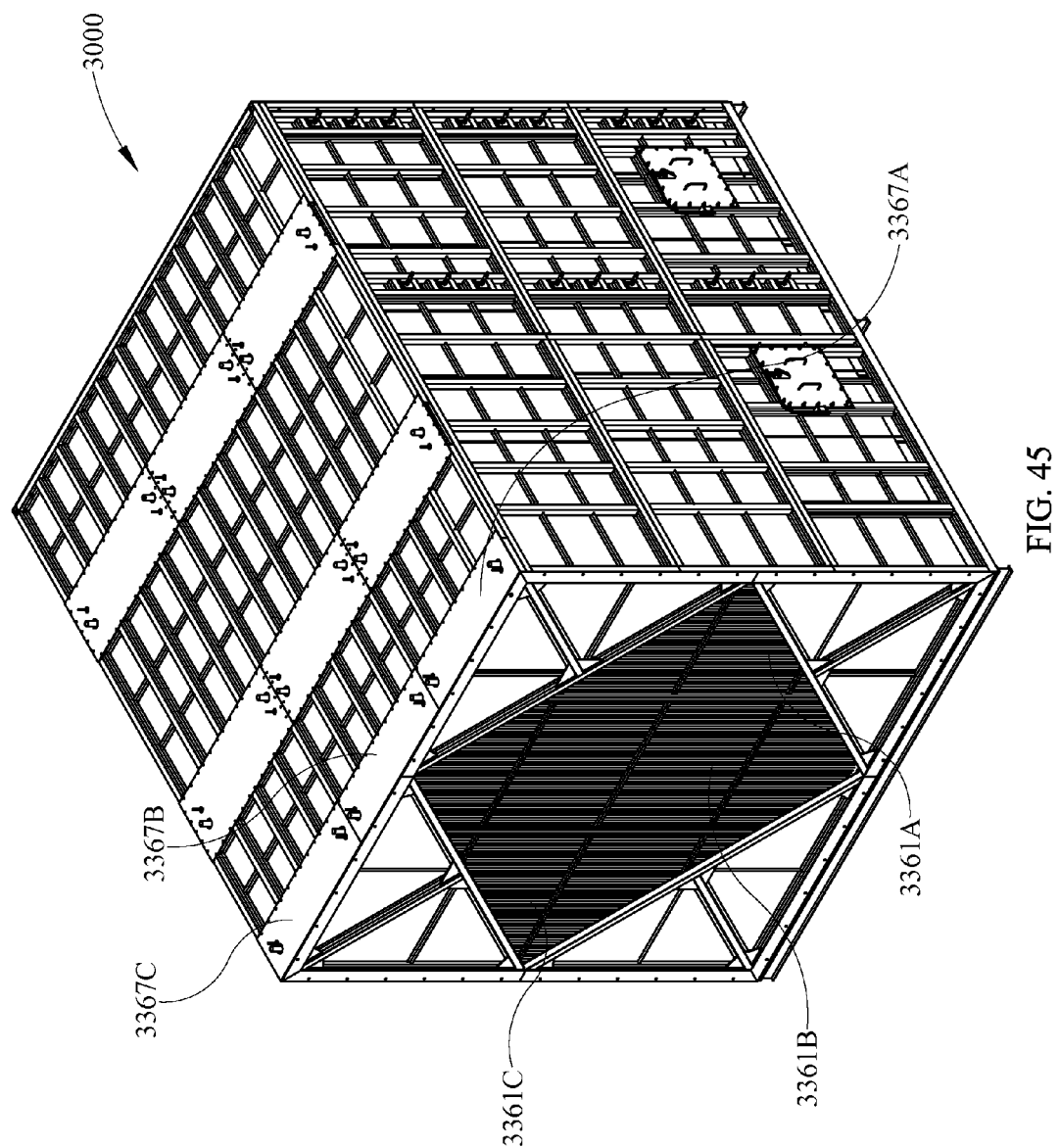
FIG. 45 illustrates a third embodiment of an abatement system shell supplemented with additional components to thereby form an abatement system

Referring now to FIG. 45, a third embodiment of an abatement system shell 3000 is illustrated with other components to thereby form an abatement system. The abatement system shell 3000 is similar to the abatement system shell 2000 described in detail herein. Accordingly, numbering and description of much of abatement system shell 3000 is omitted herein for brevity. The main distinction between the abatement system shell 3000 and the abatement system shell 2000 is the addition of an opening and extra space for a reheat coil assembly. In some embodiments the abatement system shell 3000 may be increased in longitudinal length (e.g., from air inlet to air outlet) by approximately two feet as compared to abatement system shell 2000 to accommodate the reheat coil assembly. The reheat coil assembly is formed by three separate reheat coil segments 3261A, 3261B, and 3261C. The reheat coil segments 3261A, 3261B, and 3261C may each be insertable through an opening of abatement system shell 3000 and each include a respective sealing plate 3267A, 3267B, and 3267C coupled thereto. The sealing plates 3267A, 3267B, and 3267C may sealingly engage structure surrounding the additional opening provided for insertion and/or removal of reheat coil segments 3261A, 3261B, and 3261C. The reheat coil segments 3261A, 3261B, and 3261C may be coupled to a heat source and heat pumped therethrough to thereby increase the heat of the gas flowing downstream to reheat coil segments 3261A, 3261B, and 3261C from upstream condensing coil segments. Utilizing reheat coil segments 3261A, 3261B, and 3261C to increase the heat of the gas may help to facilitate gas flow through the abatement system shell 3000 when it functions as an abatement system.

One or more temporary replacement pieces may be utilized in combination with the abatement systems formed by the abatement system shell 2000 and/or 3000. For example, in some embodiments one or more temporary replacement pieces may be provided, each being sized to sealingly cover a single of the misting array openings such as, for example, a single of misting array openings 2014A1-9. Also, for example, in some embodiments one or more temporary replacement pieces may be provided, each being sized to sealingly cover multiple of the misting array openings such as, for example, all of misting array openings 2014A1-9.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An abatement system, said abatement system comprising:
    a gas flow inlet;
    an abatement chamber downstream of said gas flow inlet, said abatement chamber having an abatement chamber misting section;
    an abatement chamber gas flow outlet downstream of said abatement chamber misting section;
        wherein said abatement chamber has a gas flow extending from said gas flow inlet to said gas flow outlet;
    a misting array assembly received in said abatement chamber misting section, said misting array assembly comprising a nozzle tubing and a plurality of nozzles coupled to said nozzle tubing, said nozzle tubing sealingly extending from exterior of said abatement chamber into said abatement chamber misting section;
        wherein at least a portion of said nozzle tubing is fixedly rotationally adjustable from exteriorly of said abatement system to a plurality of positions, whereby adjusting said nozzle tubing correspondingly adjusts said nozzles coupled thereto.

2. The abatement system of claim 1 wherein said nozzle tubing is rotationally adjustable to a plurality of fixed preselected positions.

3. The abatement system of claim 1 wherein said nozzle tubing is linearly extending.

4. The abatement system of claim 1 wherein said nozzle tubing is rotationally adjustable between at least a first position and a second position that are rotationally offset at least ten degrees from one another.

5. The abatement system of claim 1 wherein said misting array assembly comprises a second nozzle tubing and a plurality of second nozzles coupled to said second nozzle tubing, said second nozzle tubing sealingly extending from exterior of said abatement chamber and into said abatement chamber misting section.

6. The abatement system of claim 1 wherein said first nozzle tubing extends through a first sealing plate sealingly engaged over a first opening through said abatement chamber and a second nozzle tubing extends through a second sealing plate sealingly engaged over a second opening through said abatement chamber.

7. The abatement system of claim 1 wherein said first nozzle tubing extends through a first sealing plate sealingly engaged over a first opening through said abatement chamber and a second nozzle tubing also extends through said first sealing plate.

8. The abatement system of claim 1 wherein some of said nozzles are upwardly extending and some of said nozzles are downwardly extending.

9. An abatement system, said abatement system comprising:
- a gas flow inlet;
- an abatement chamber downstream of said gas flow inlet, said abatement chamber having an abatement chamber misting section having at least one opening therethrough, said at least one opening extending through said abatement chamber and into said abatement chamber misting section;
- an abatement chamber gas flow outlet downstream of said abatement chamber misting section;
- wherein said abatement chamber has a gas flow extending from said gas flow inlet to said gas flow outlet;
- a misting array assembly received in said abatement chamber misting section, said misting array assembly comprising a sealing plate blocking said opening, a nozzle tubing extending through said sealing plate and into said abatement chamber misting section, and at least one nozzle coupled to said nozzle tubing;
  - wherein at least a portion of said nozzle tubing is fixedly rotationally adjustable from exteriorly of said abatement system to a plurality of positions, whereby adjusting said nozzle tubing correspondingly adjusts said nozzles.

10. The abatement system of claim 9 wherein said misting array assembly further comprises a second nozzle tubing and a plurality of second nozzles coupled to said second nozzle tubing, said second nozzle tubing sealingly extending from exterior of said abatement chamber and into said abatement chamber misting section.

11. The abatement system of claim 10 wherein said second nozzle tubing extends through a second sealing plate covering a second opening of said at least one opening through said abatement chamber.

12. The abatement system of claim 10 wherein said second nozzle tubing also extends through said sealing plate.

13. The abatement system of claim 9 wherein said nozzle tubing is rotationally adjustable between at least a first position and a second position that are rotationally offset at least five degrees from one another.

14. The abatement system of claim 9 wherein said misting array assembly further comprises at least one first stop protrusion rotationally fixed to said nozzle tubing within said abatement chamber mixing section, said first stop protrusion at a first rotational orientation with respect to said nozzle tubing.

15. The abatement system of claim 14 wherein said misting array assembly further comprises at least one second stop protrusion rotationally fixed to said nozzle tubing within said abatement chamber mixing section, said second stop protrusion at a second rotational orientation with respect to said nozzle tubing, said second rotational orientation offset from said first rotational orientation at least five degrees.

16. The abatement system of claim 15 further comprising structure located peripherally of said nozzle tubing within said abatement chamber, said structure having a first edge selectively contacting said first stop and a second edge selectively contacting said second stop.

\* \* \* \* \*